United States Patent [19]

Harmon, Jr.

[11] Patent Number: 4,557,317
[45] Date of Patent: Dec. 10, 1985

[54] TEMPERATURE CONTROL SYSTEMS WITH PROGRAMMED DEAD-BAND RAMP AND DRIFT FEATURES

[76] Inventor: Kermit S. Harmon, Jr., 9449 Briar Forrest #5111, Houston, Tex. 77063

[21] Appl. No.: 539,371

[22] Filed: Oct. 5, 1983

Related U.S. Application Data

[63] Continuation-in-part of Ser. No. 236,177, Feb. 20, 1981, abandoned.

[51] Int. Cl.⁴ .......................... F25B 13/00; F23N 5/20
[52] U.S. Cl. ............................................ 165/2; 165/12; 236/44 C; 236/46 R
[58] Field of Search ................. 165/21, 12, 2; 62/157; 236/46 R, 44 C

[56] References Cited

U.S. PATENT DOCUMENTS

| | | | |
|---|---|---|---|
| 3,913,344 | 10/1975 | Holloway et al. | 165/21 X |
| 3,979,059 | 9/1976 | Davis et al. | 62/157 X |
| 4,136,732 | 1/1979 | Demaray | 165/16 |
| 4,156,502 | 5/1979 | Day | 236/46 R |
| 4,200,910 | 4/1980 | Hall | 236/46 R |
| 4,206,872 | 6/1980 | Levine | 236/46 R |
| 4,228,511 | 10/1980 | Simcoe | 364/506 |
| 4,410,132 | 10/1983 | Levine | 236/46 R X |

Primary Examiner—William E. Wayner
Attorney, Agent, or Firm—Carwell & Helmreich

[57] ABSTRACT

Energy saving temperature and humidity sensing and control processes, system and apparatuses operate effectively in response to signals received from occupants and to dynamic responses of building and its heating, ventilating and air conditioning system. The disclosed processes, apparatuses and system utilize thermostats equipped with a drift ramping and hold time to save energy; the thermostats only need resetting to a neutral/comfort set point which is accomplished by means of a push button or touch plate.

The disclosed systems are pre-programmed and set so that occupants will be confortable although the temperature within the building drifts because the rate of drift is controlled to a gradual and normally unnoticed change.

53 Claims, 44 Drawing Figures

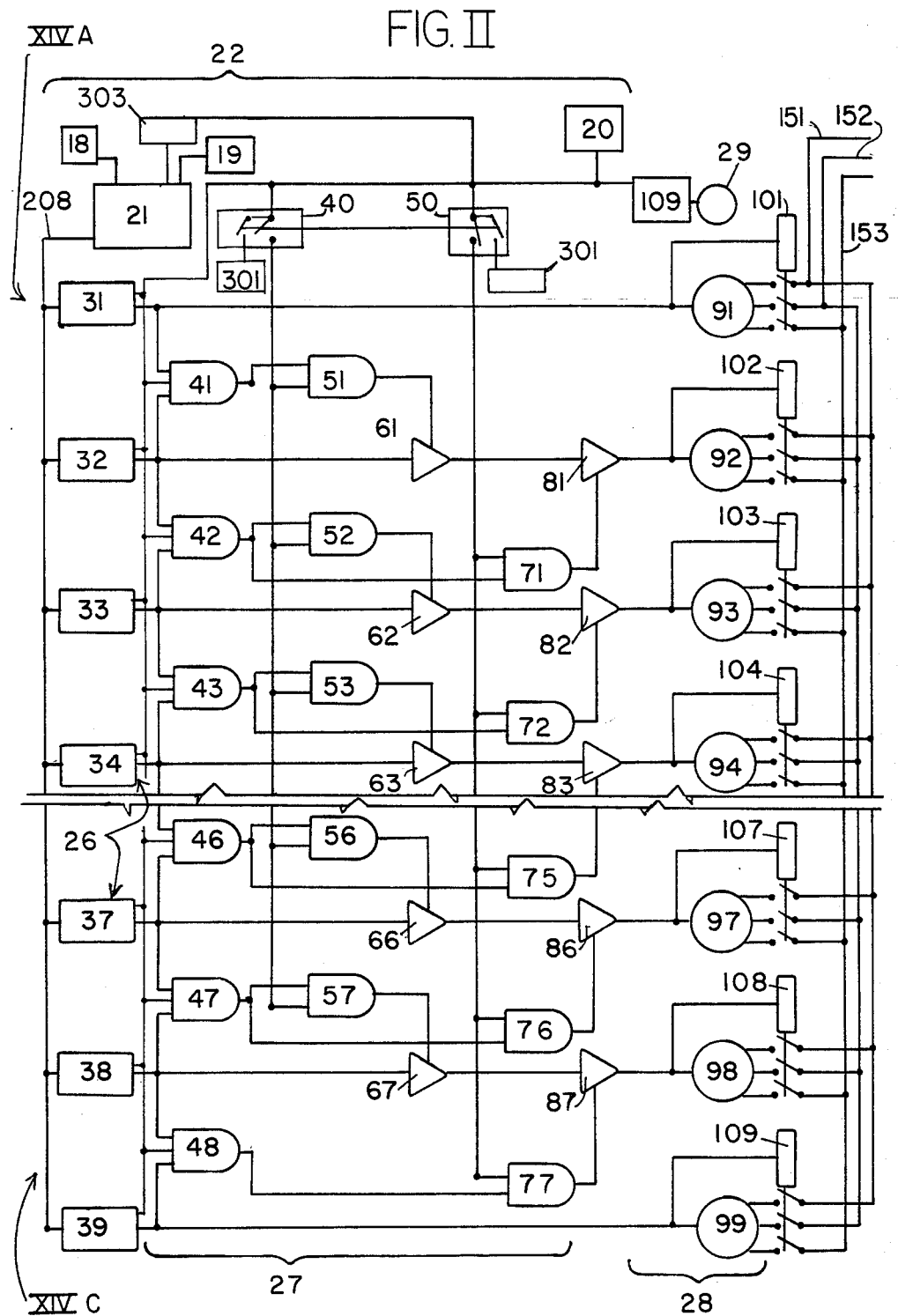
FIG. II

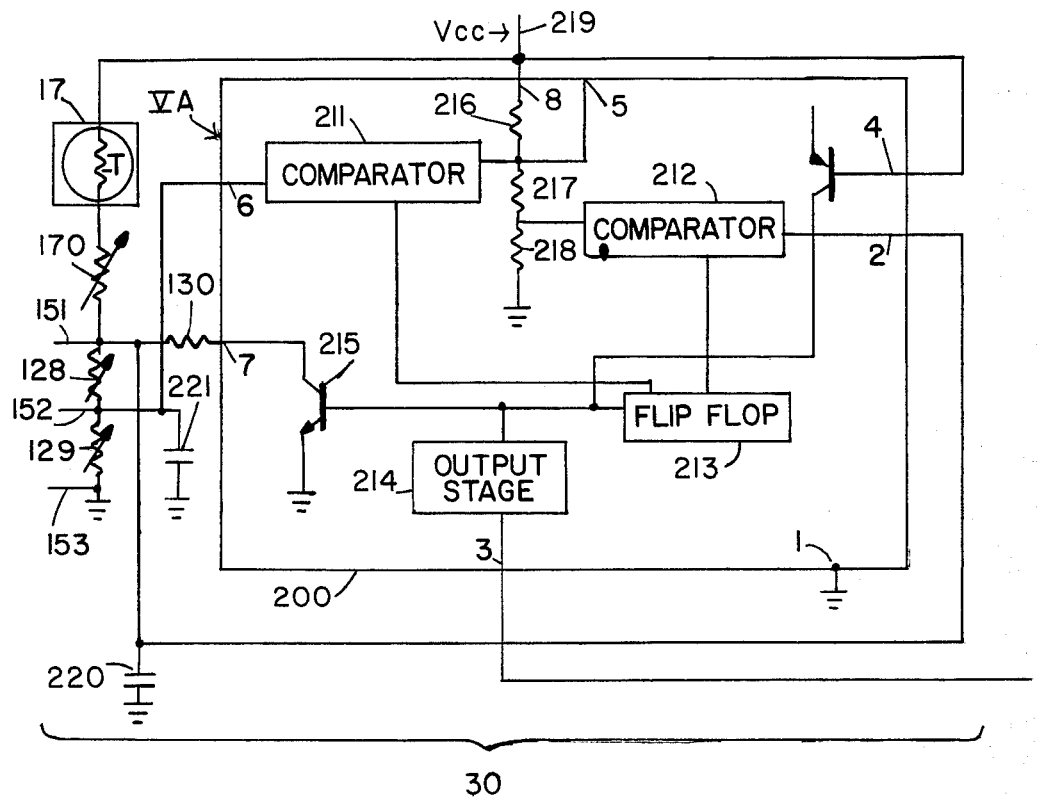
FIG. III
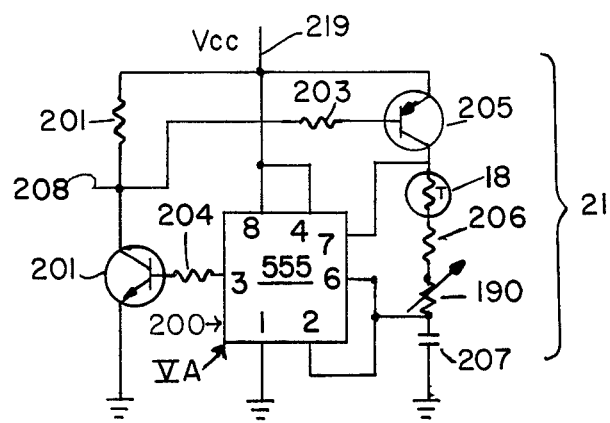
FIG. IV

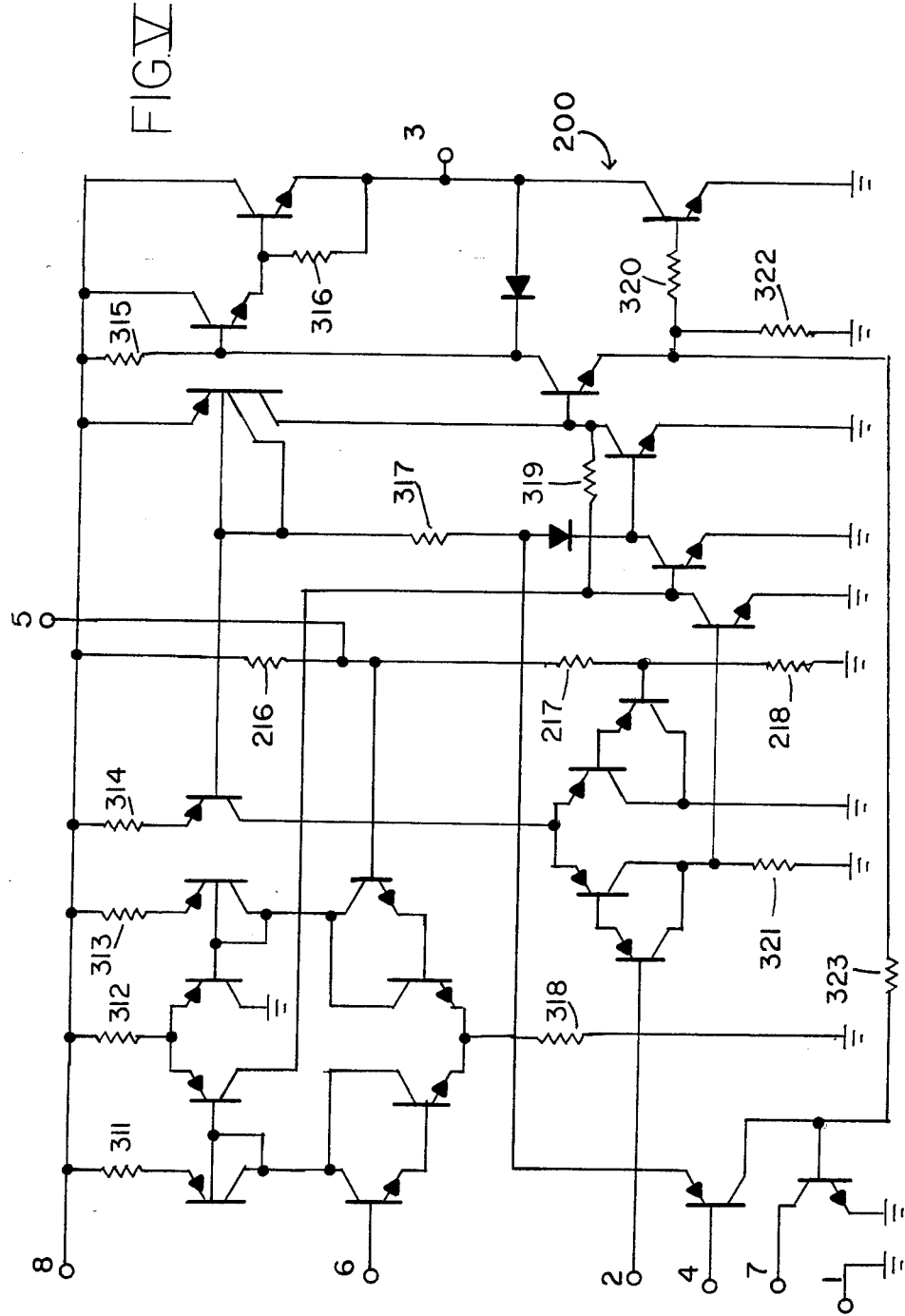
FIG V

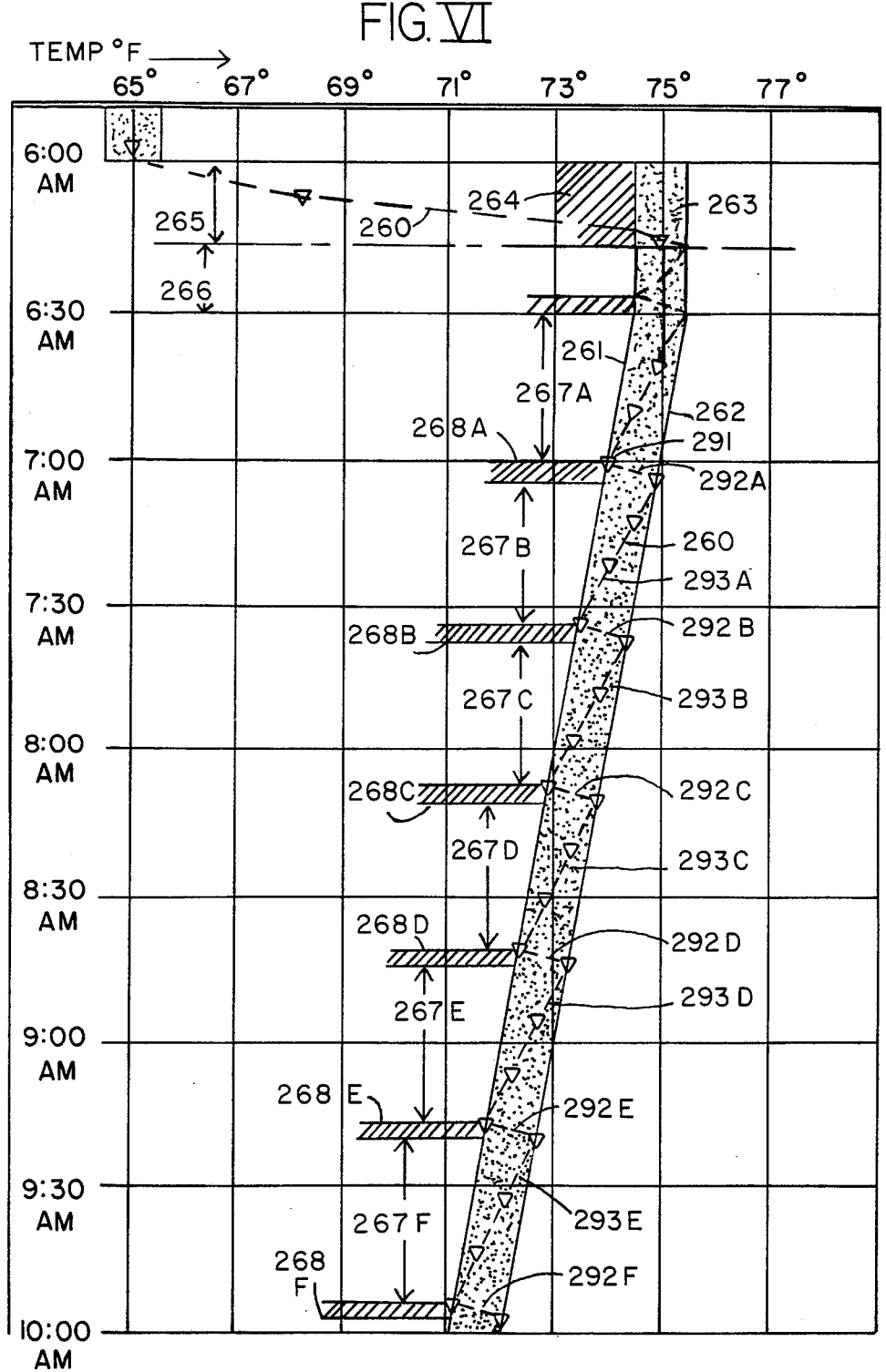
FIG. VI

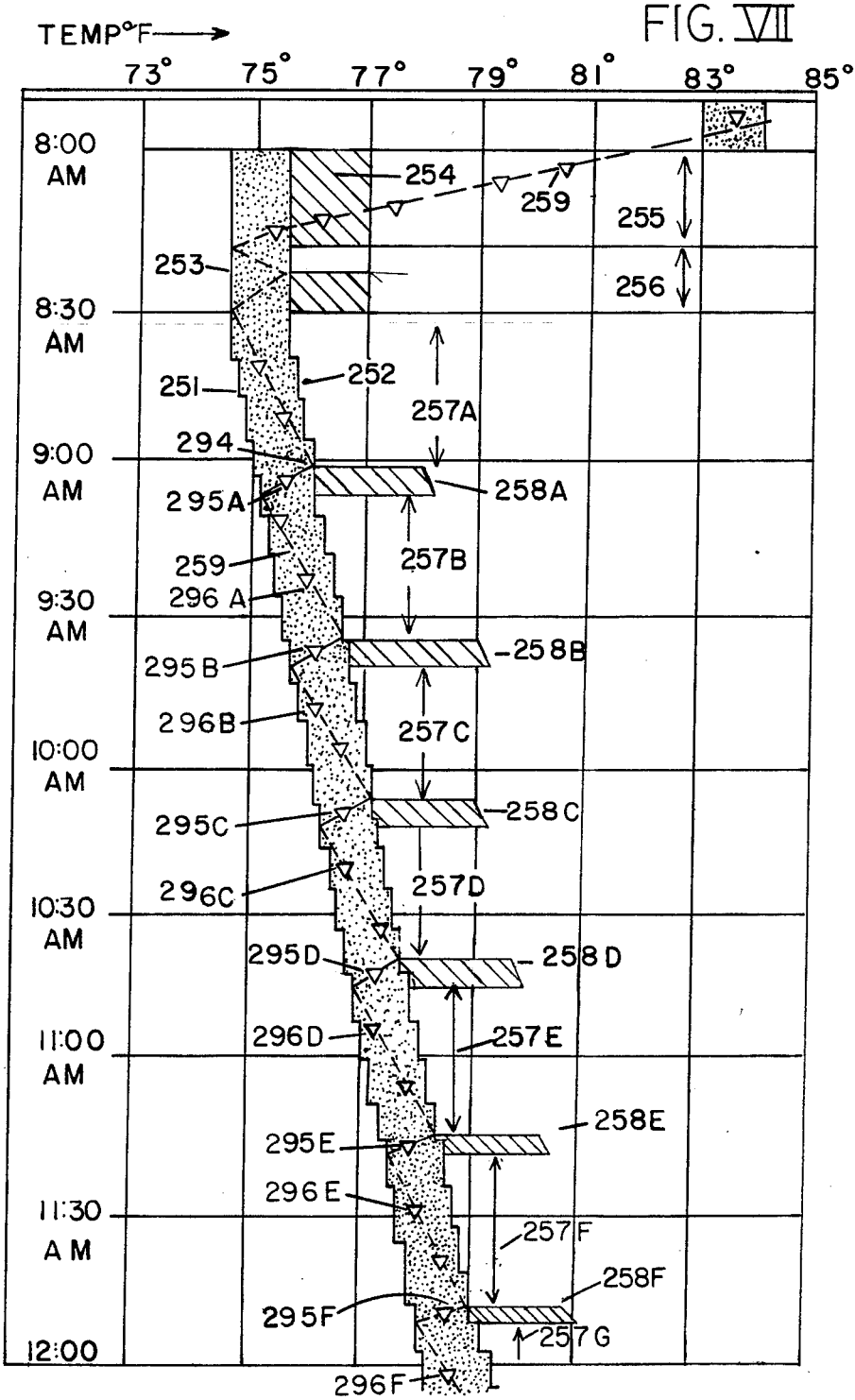
FIG. VII

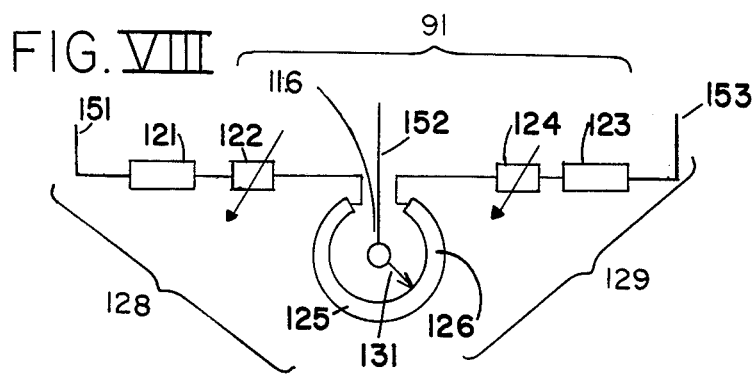
FIG. VIII
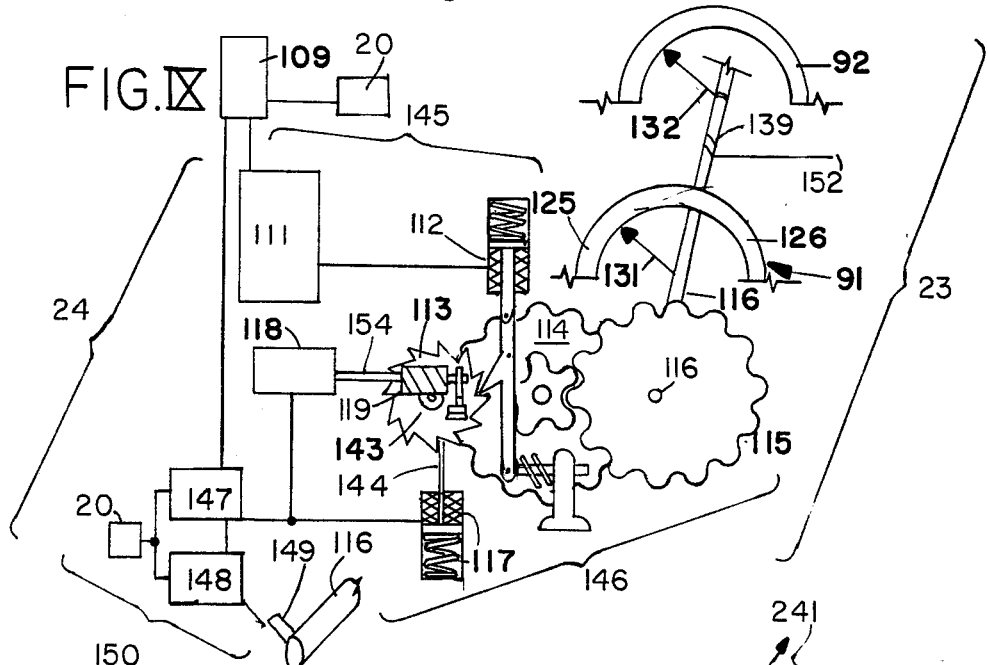
FIG. IX
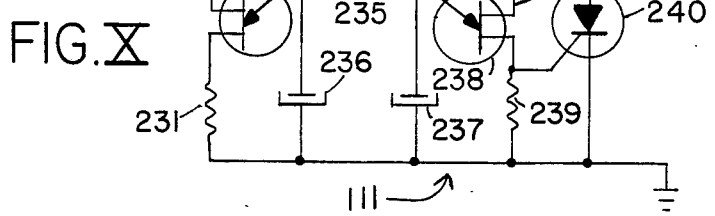
FIG. X

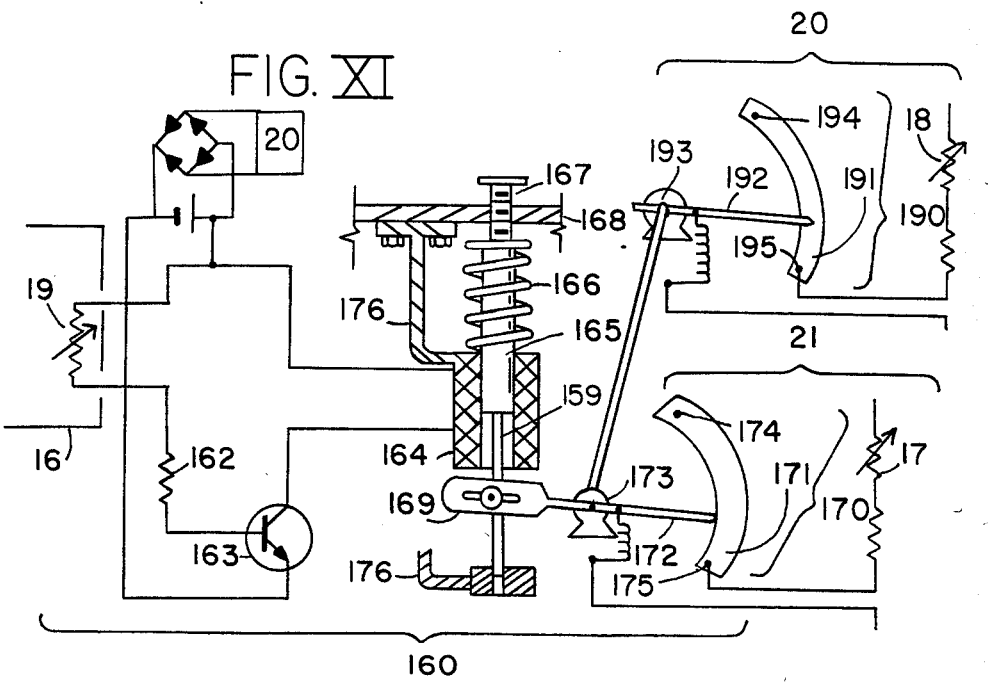
FIG. XI
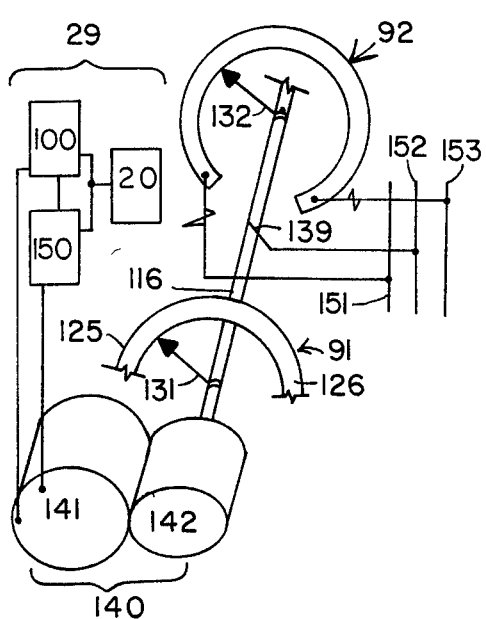
FIG. XII
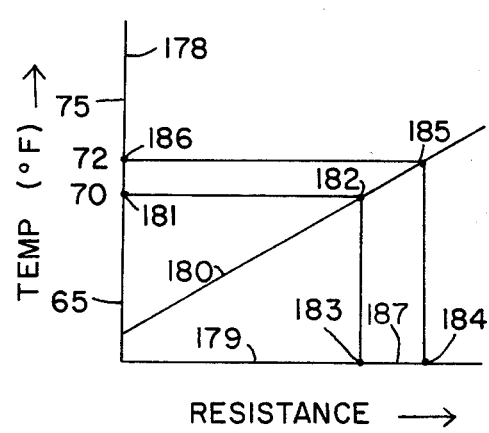
FIG. XIII
FIG. XIV

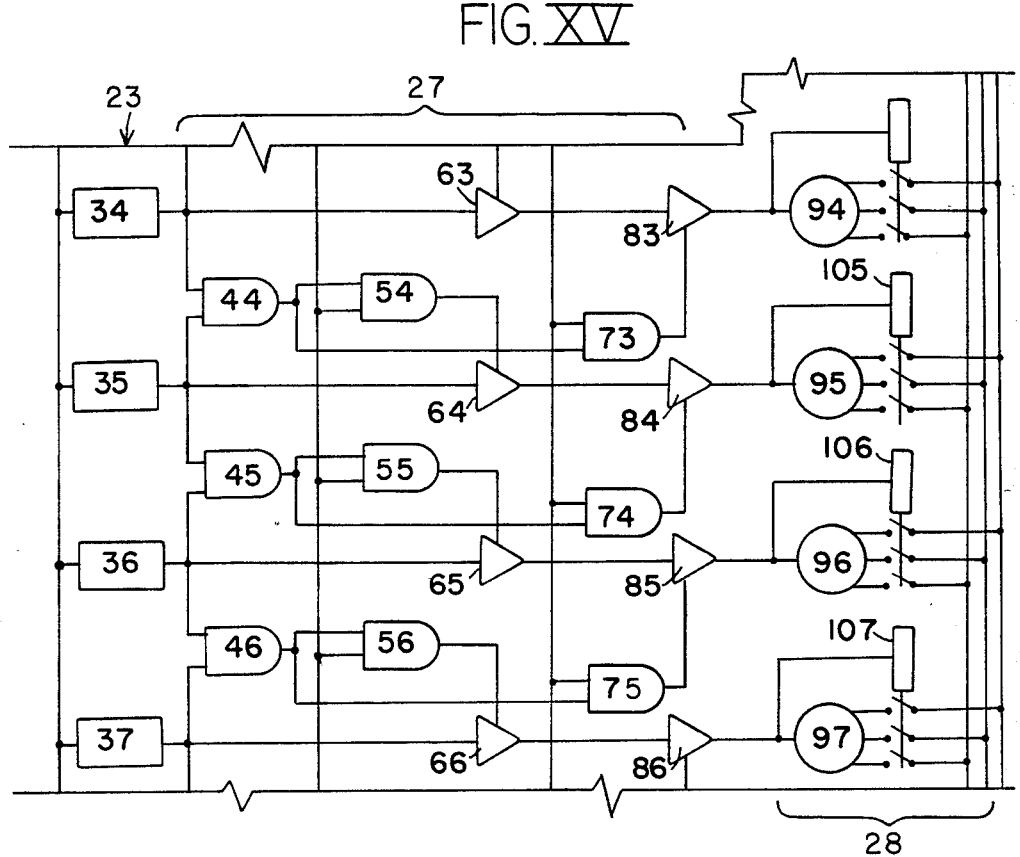
FIG. XV
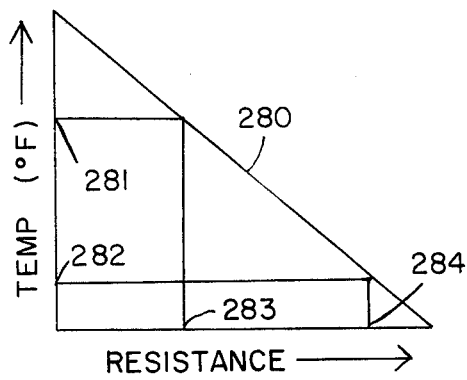
FIG. XVI
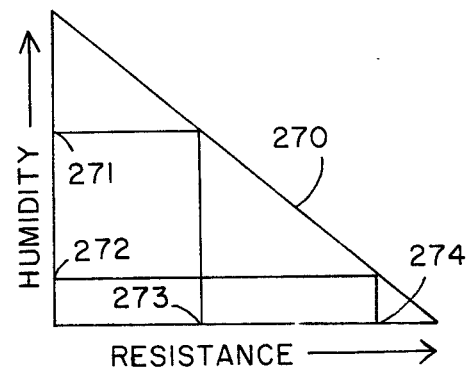
FIG. XVII

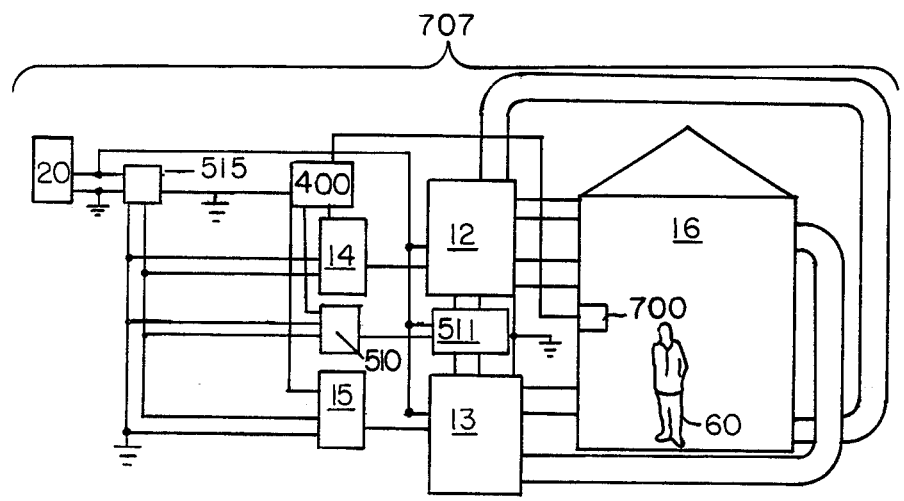
FIG. XVIII
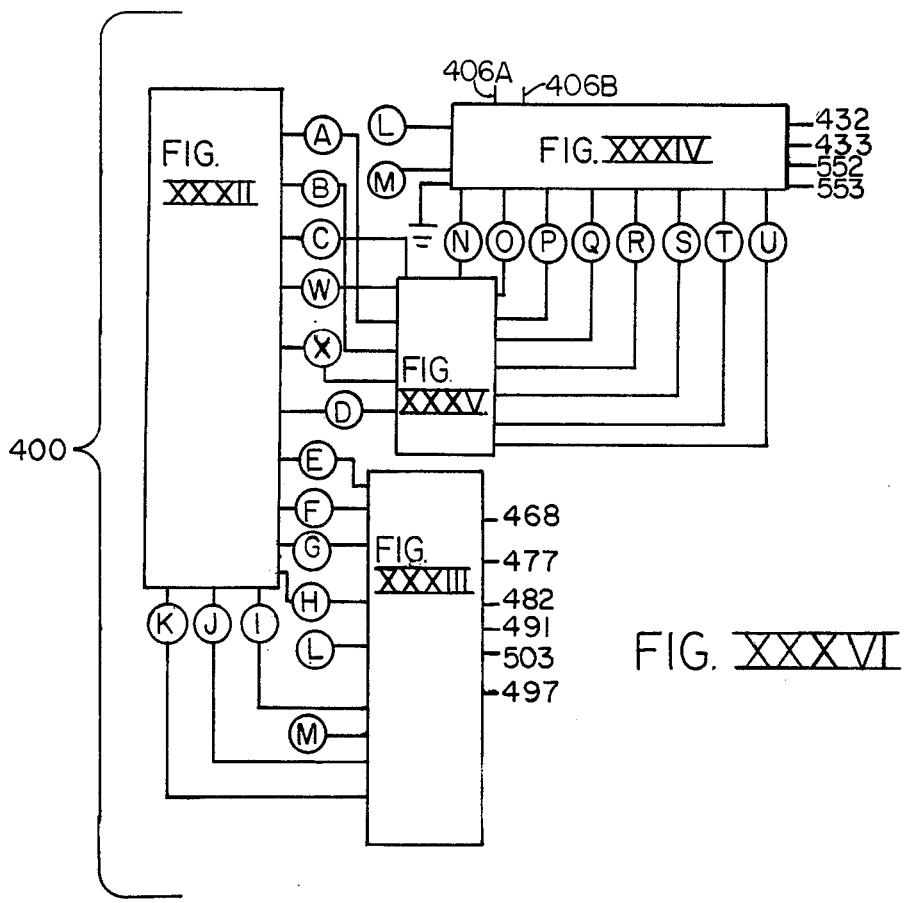
FIG. XXXVI

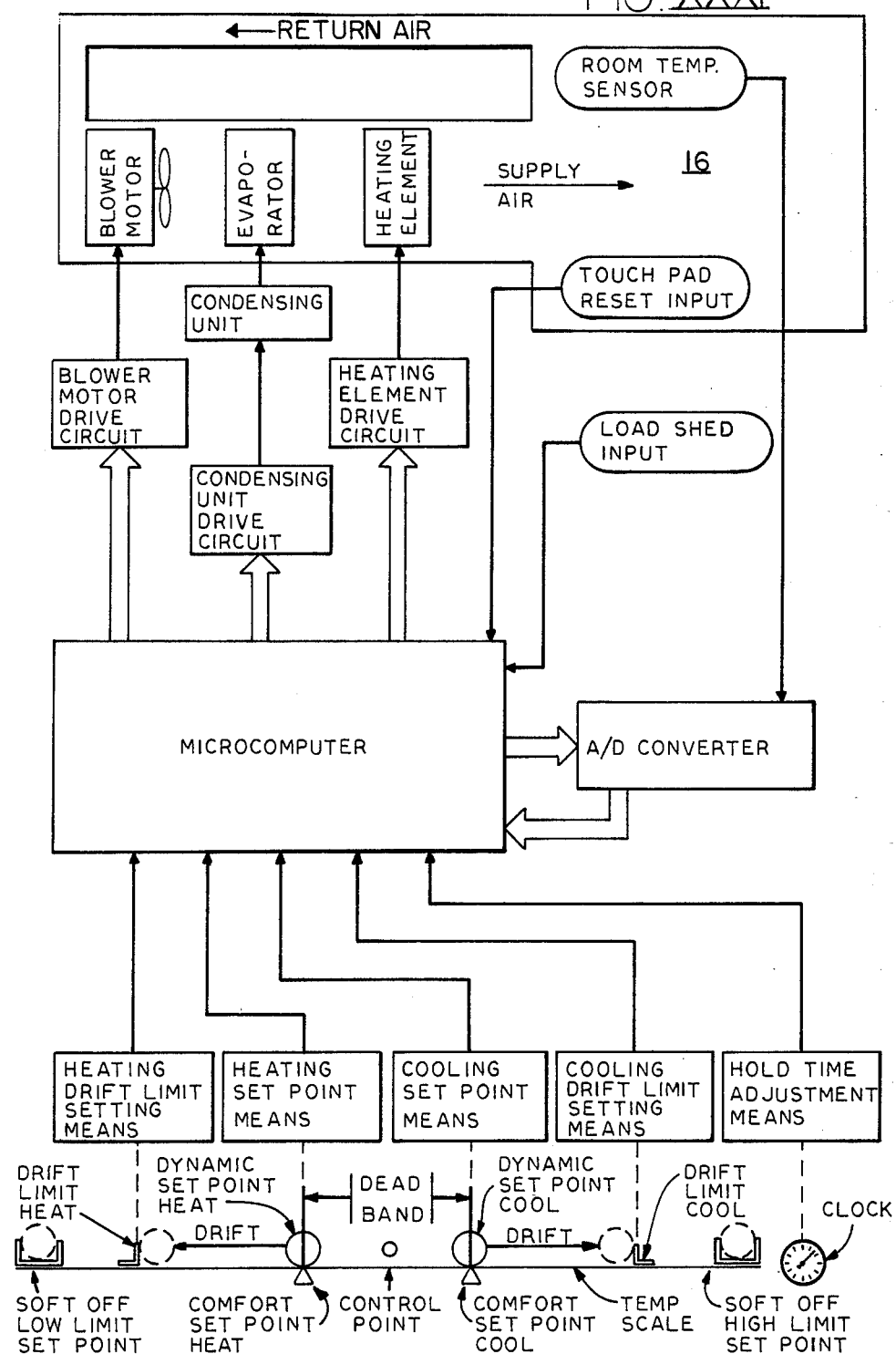
FIG. XXXI

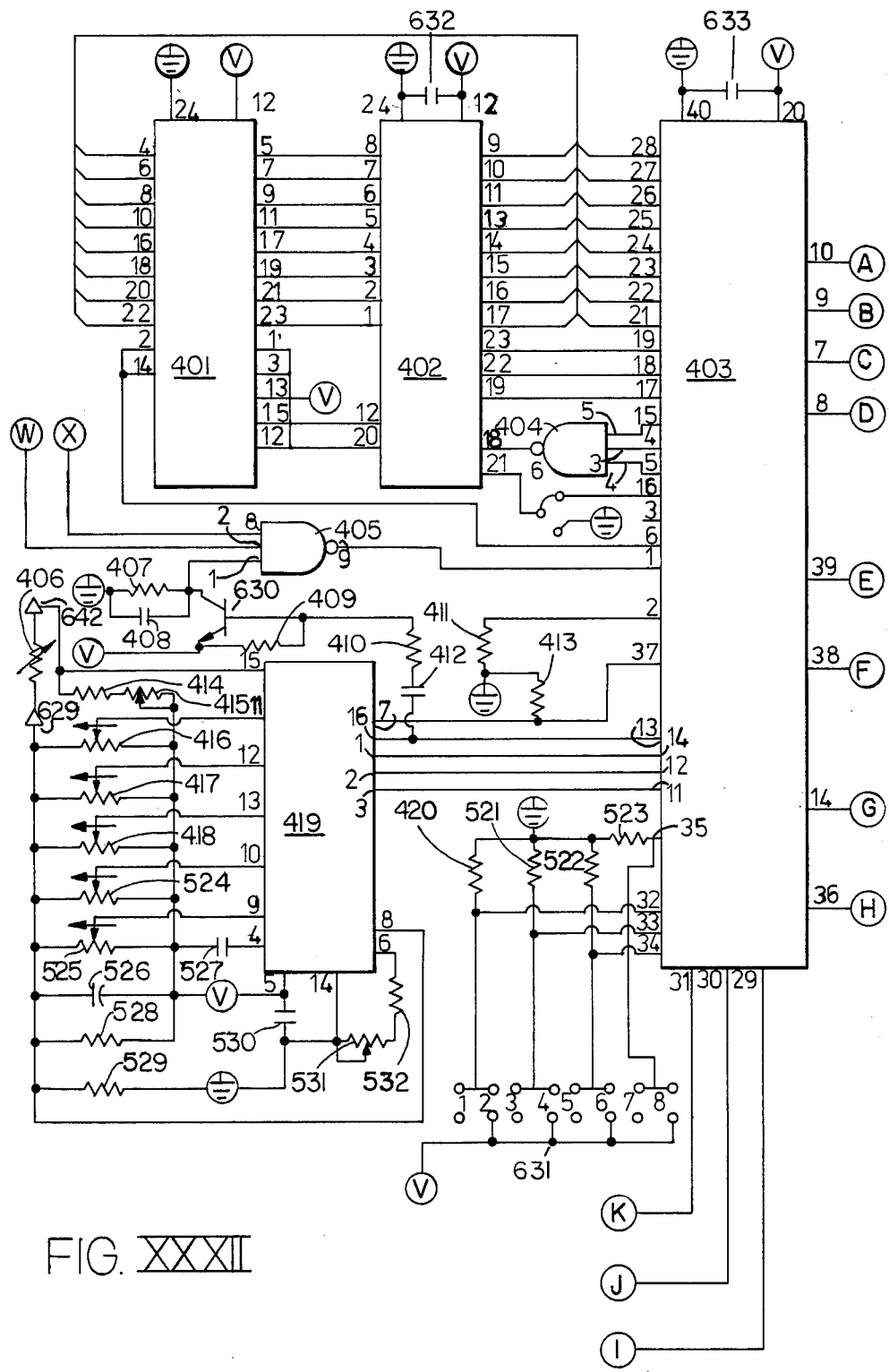
FIG. XXXII

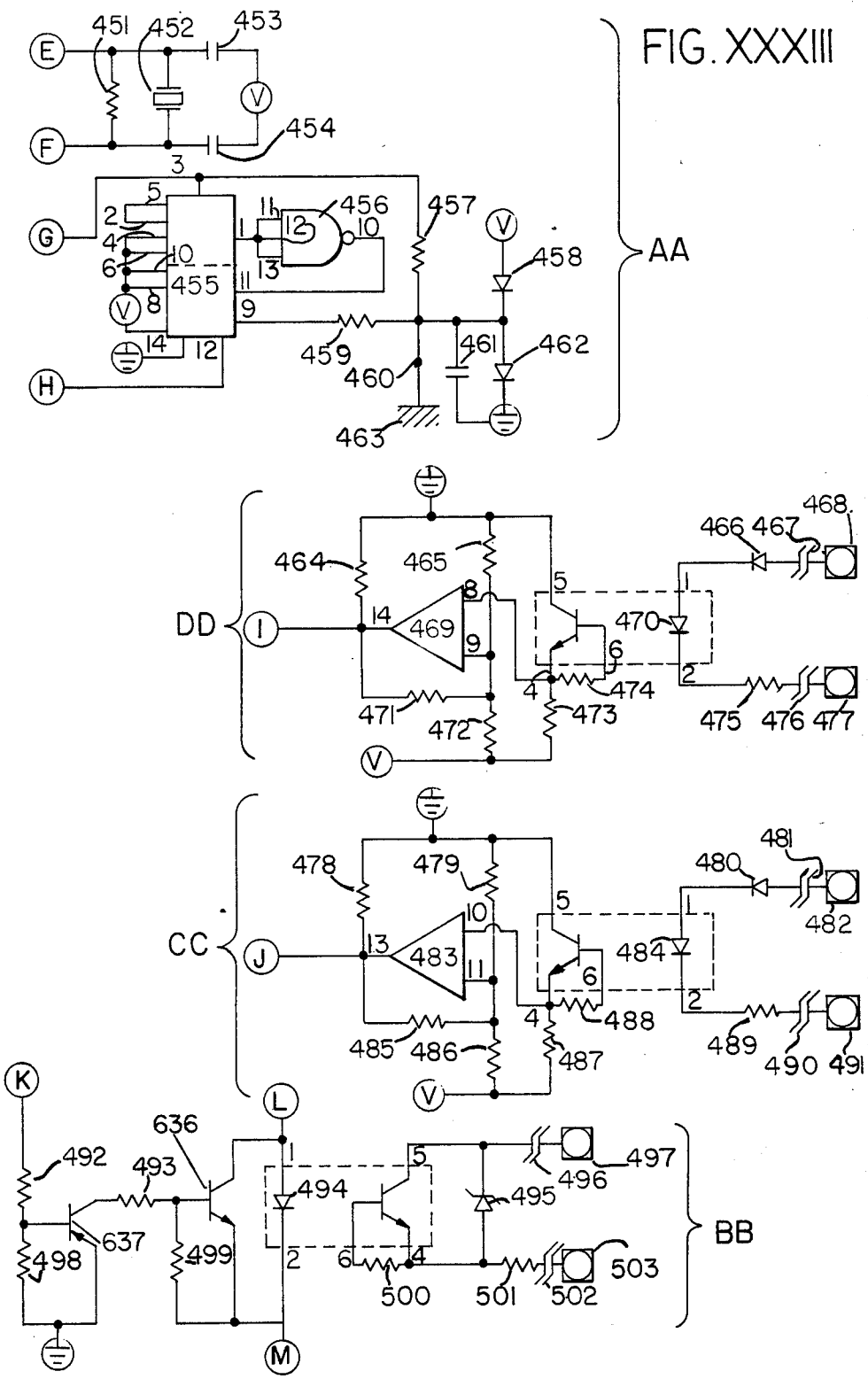
FIG. XXXIII

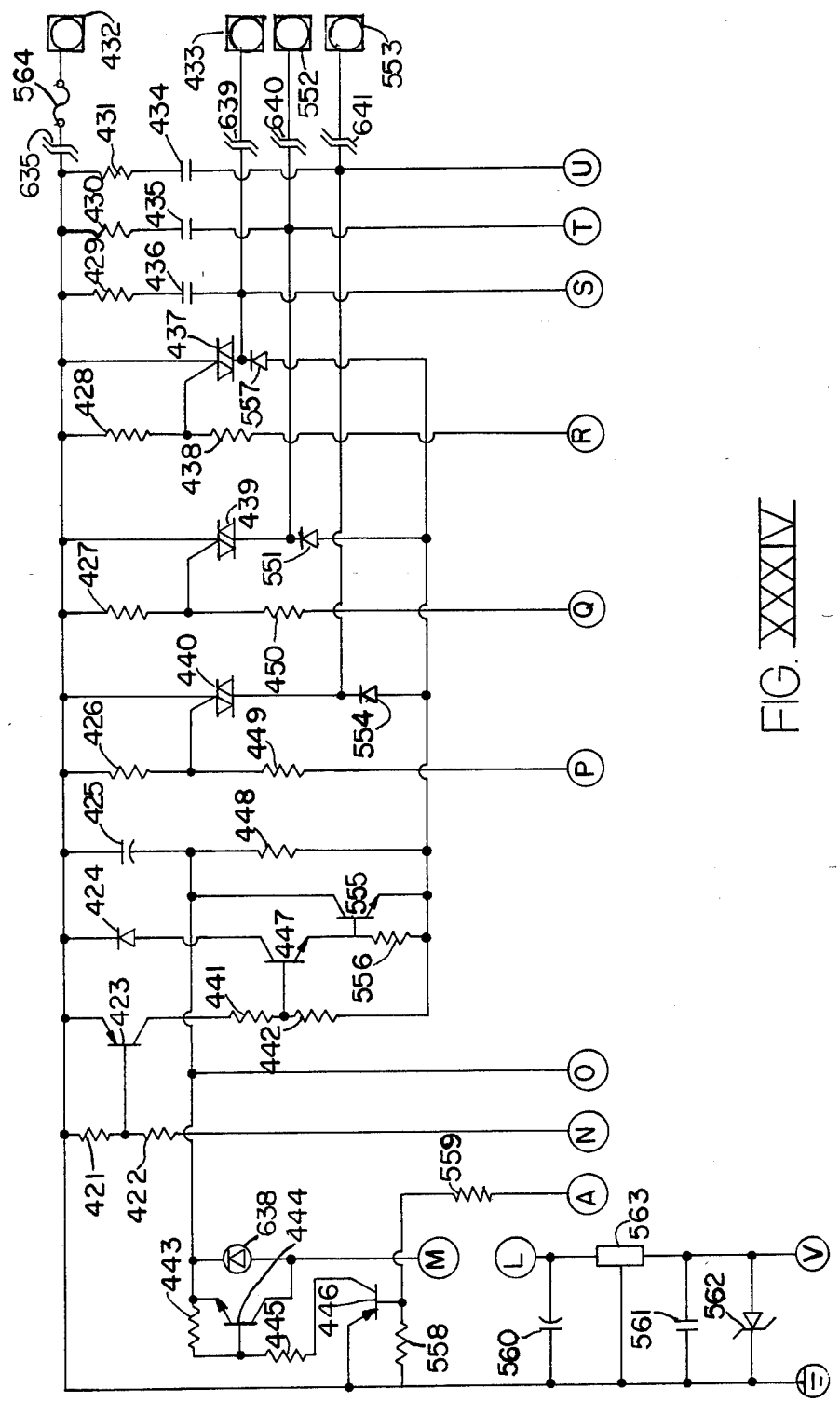
FIG. XXXIV

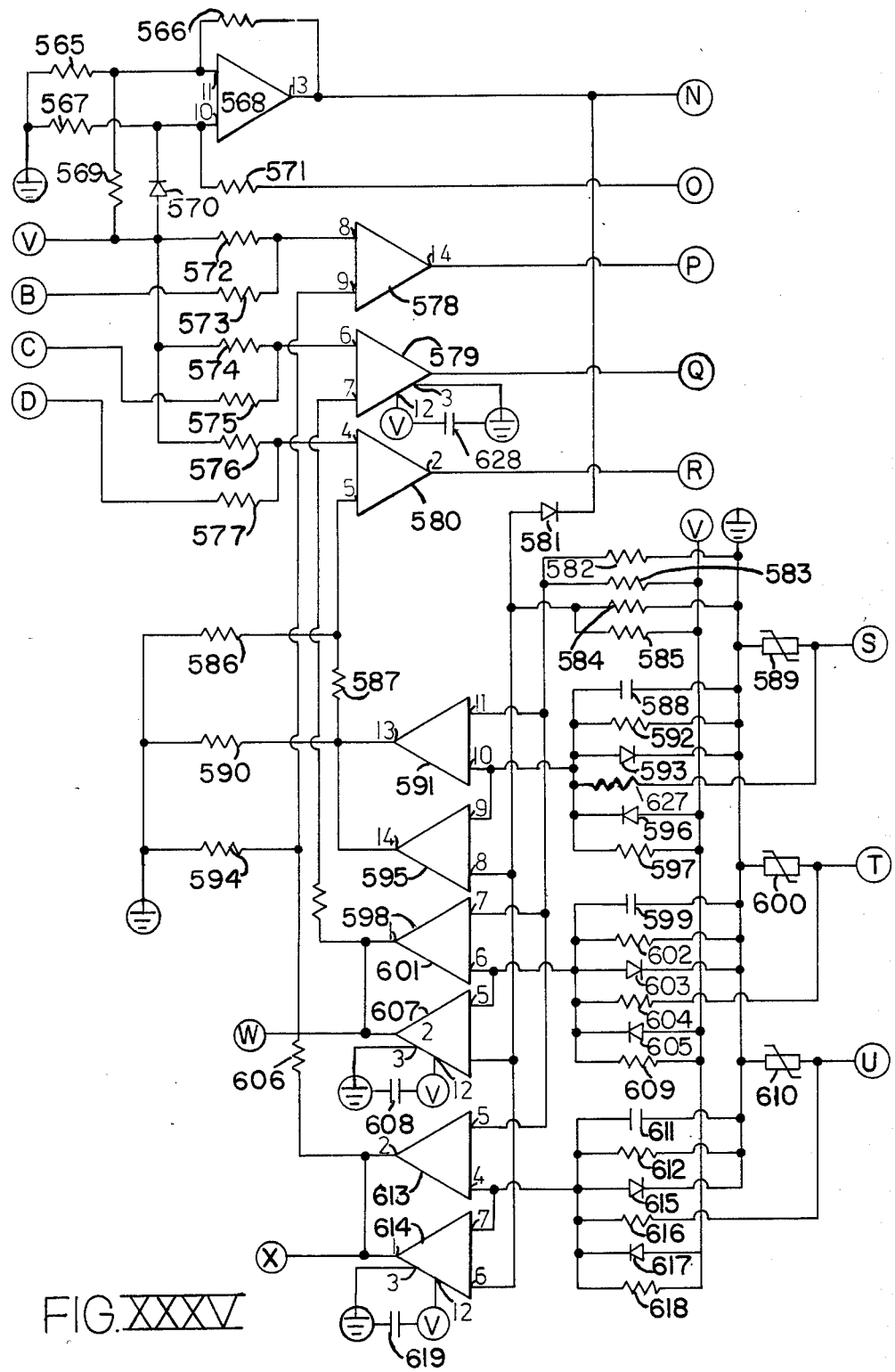
FIG. XXXV

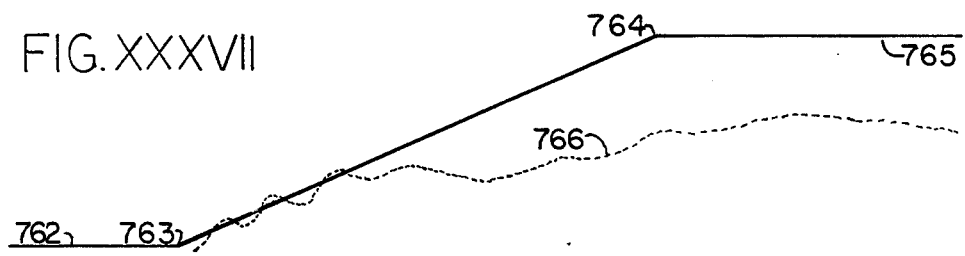
FIG. XXXVII
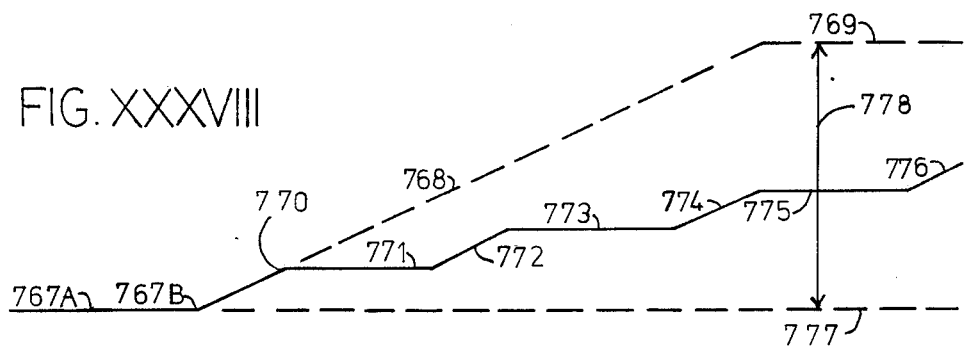
FIG. XXXVIII
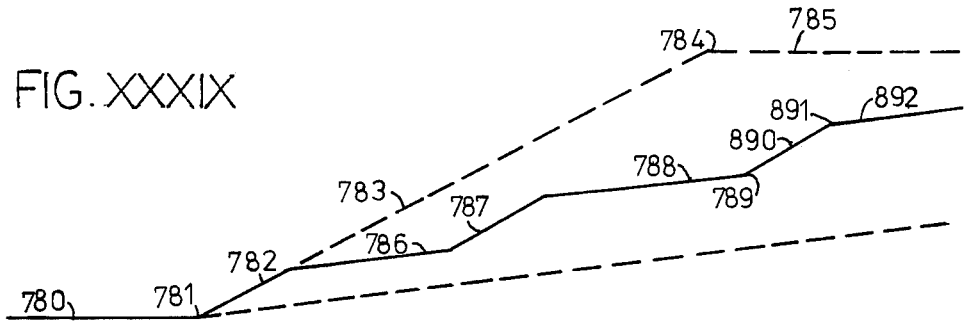
FIG. XXXIX

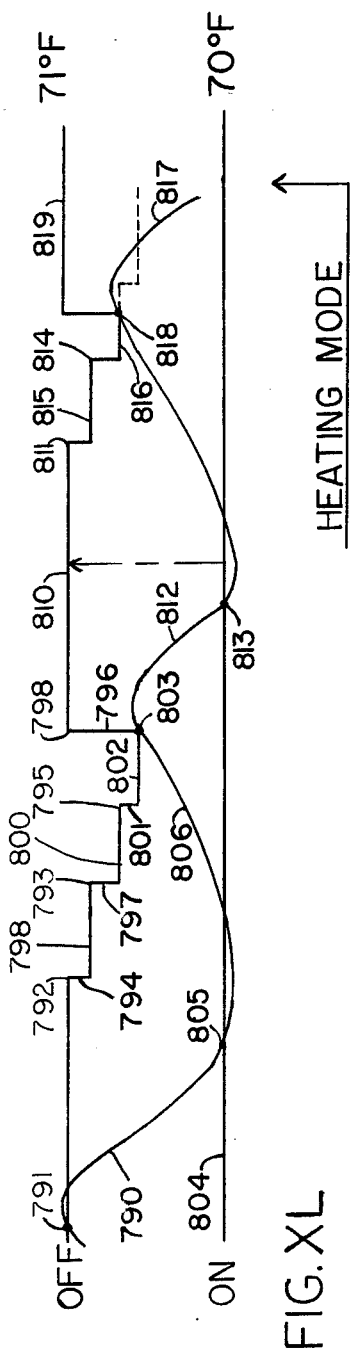
FIG. XL
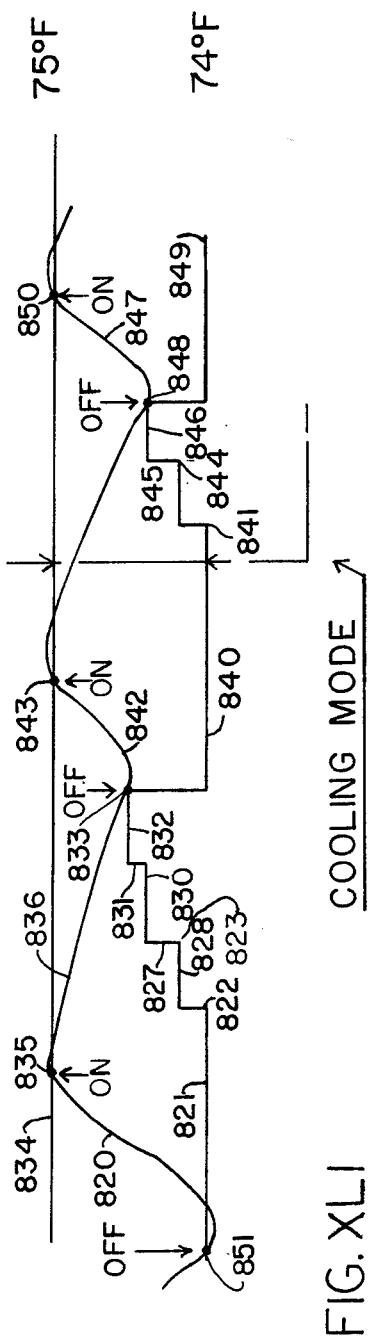
FIG. XLI

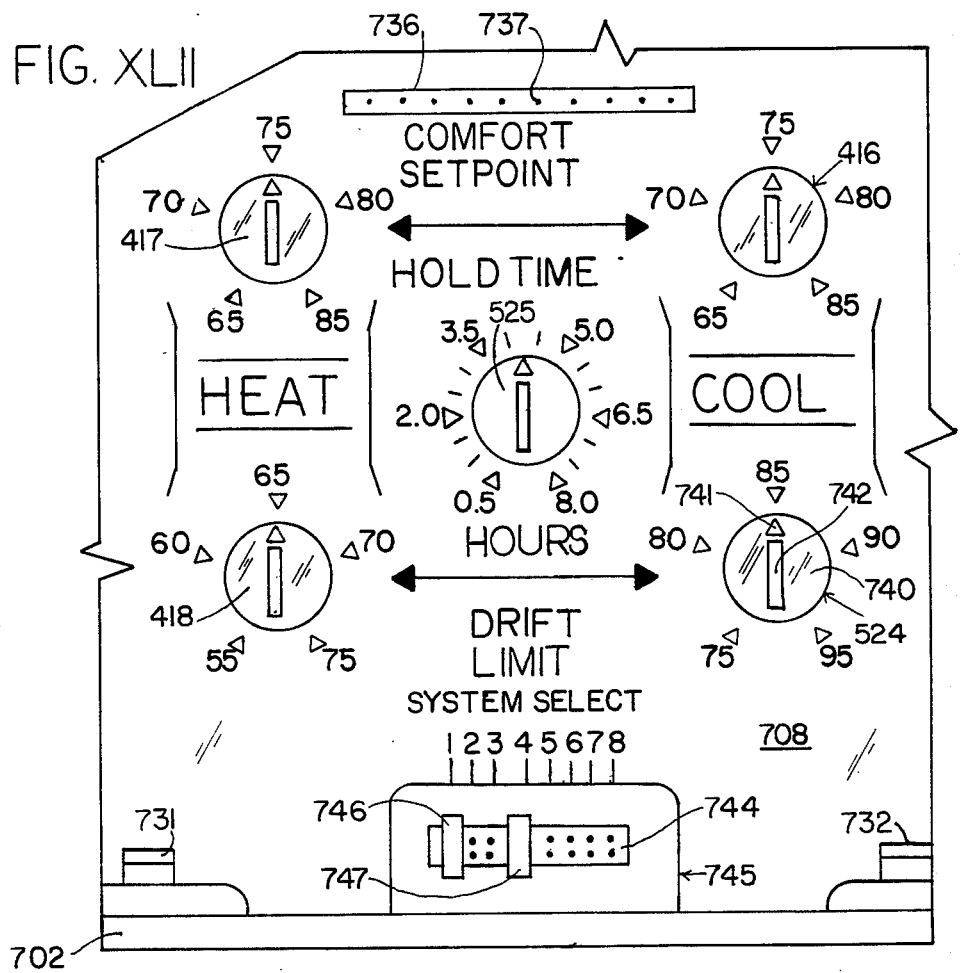
FIG. XLII
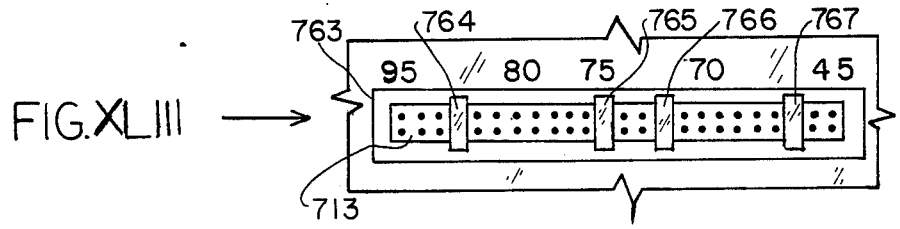
FIG. XLIII
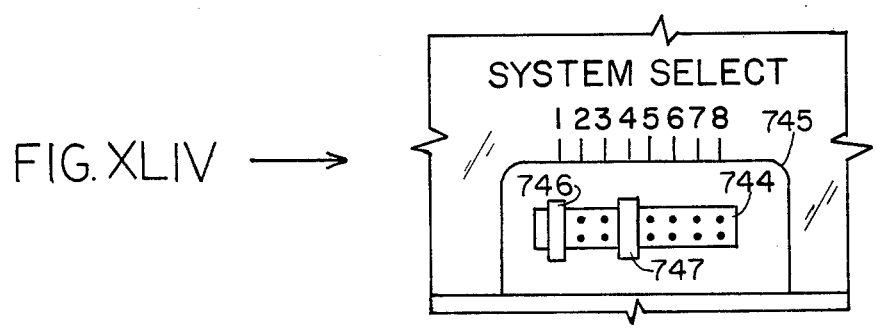
FIG. XLIV

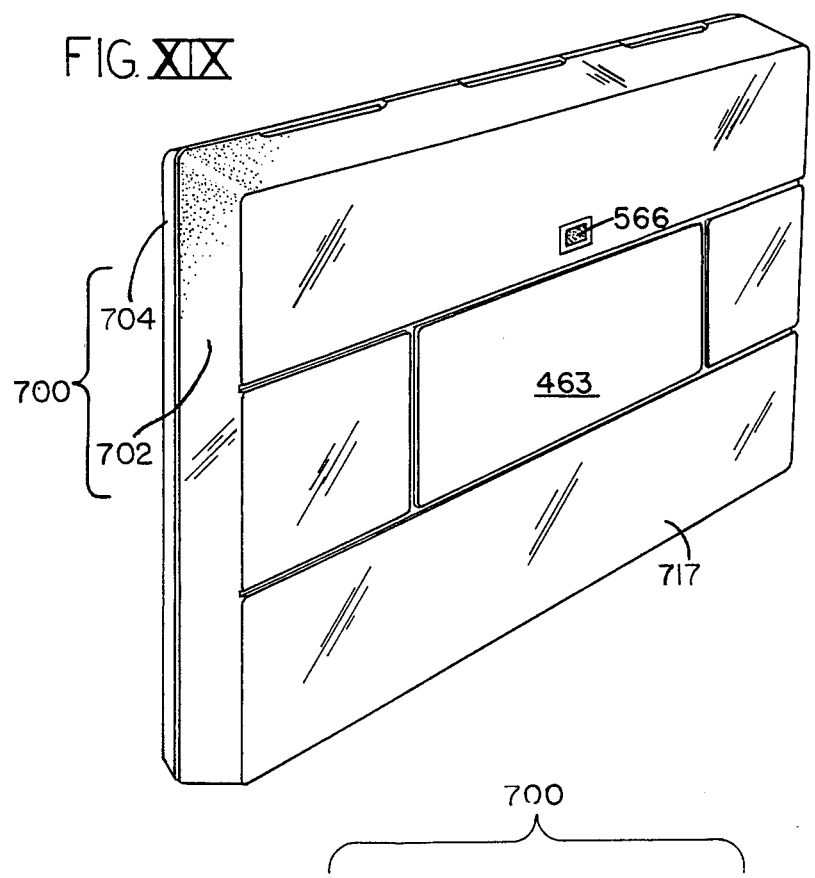
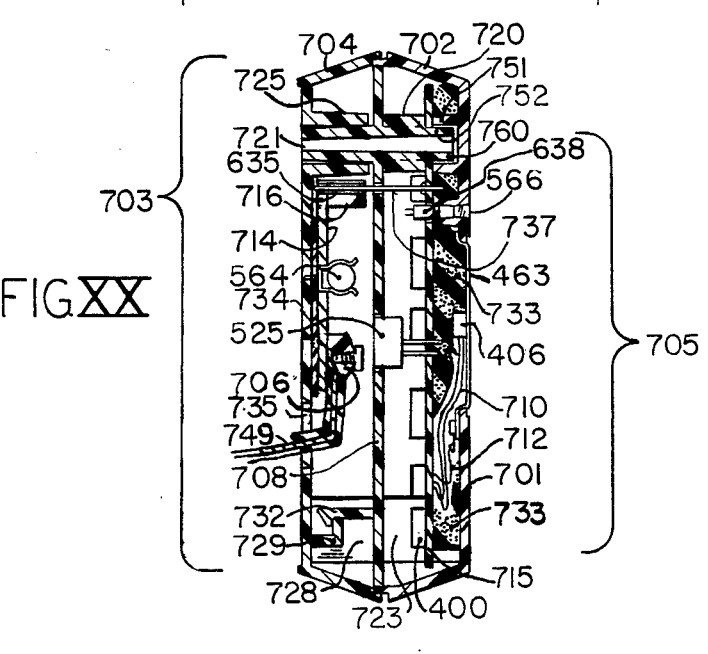

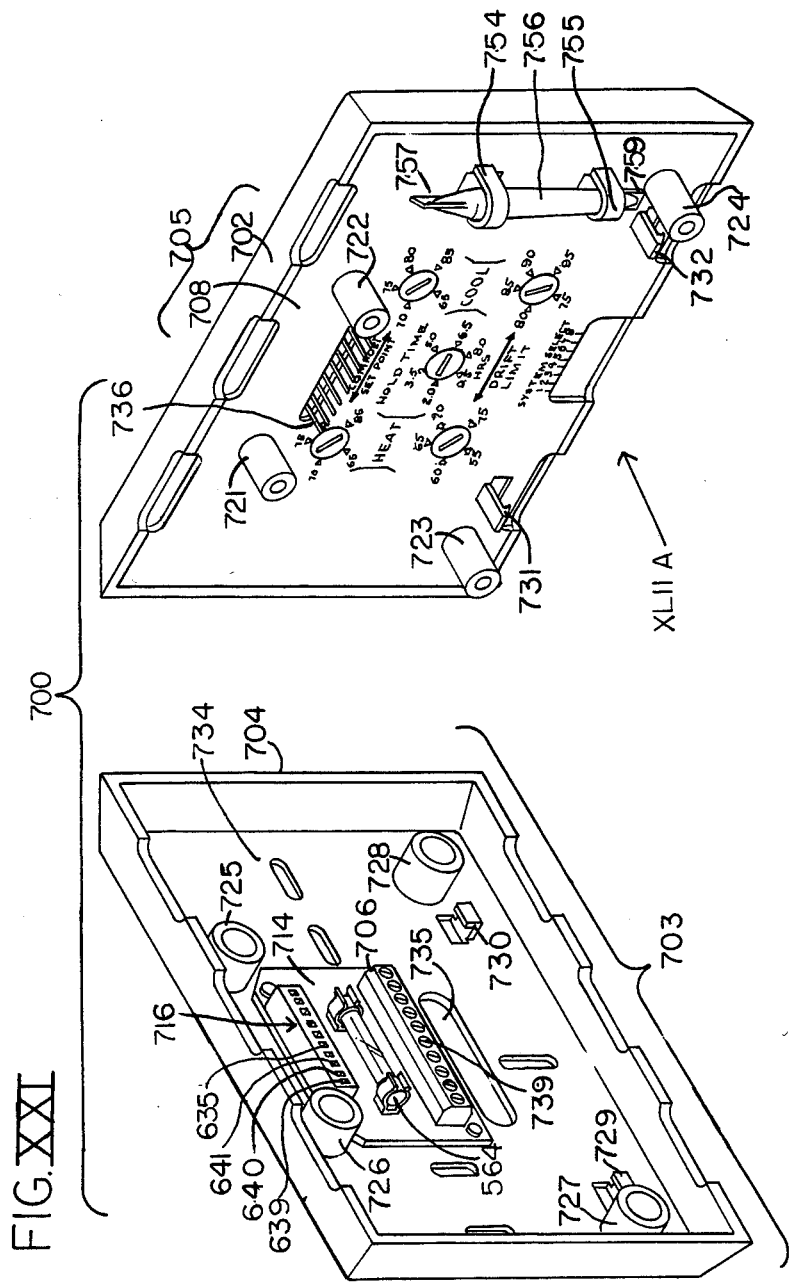

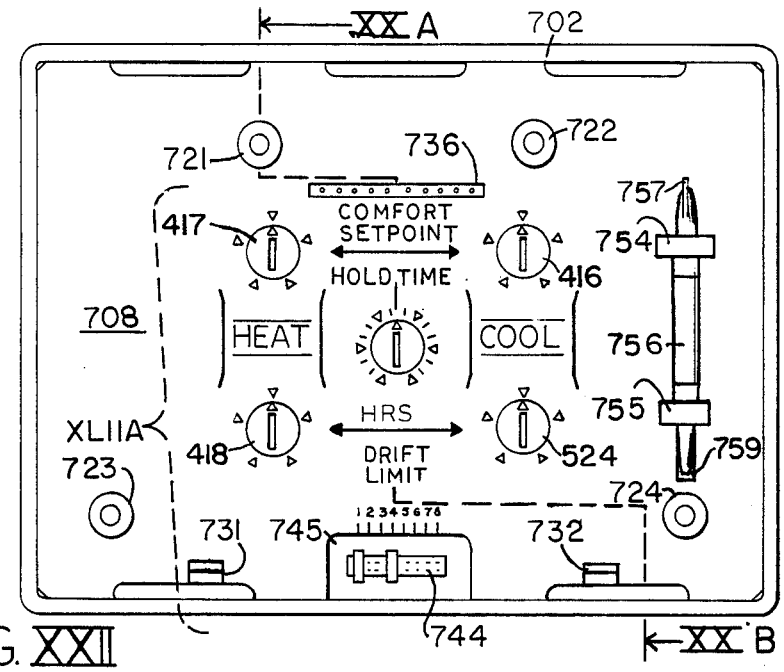
FIG. XXII
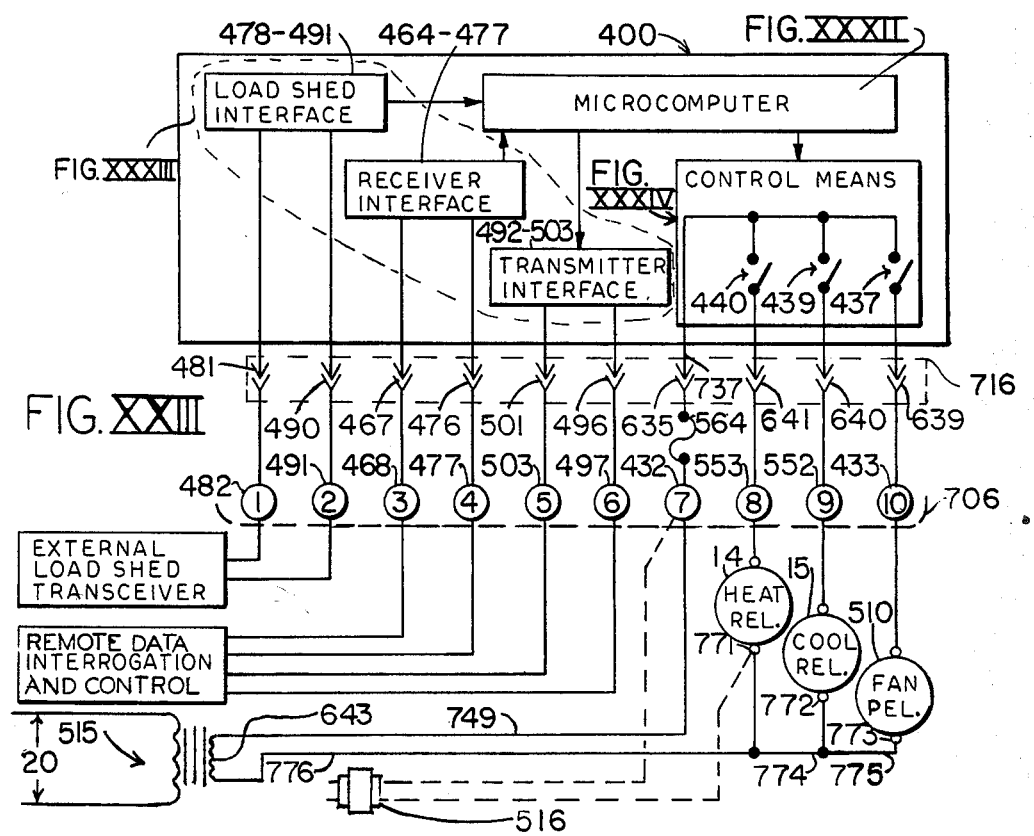
FIG. XXIII

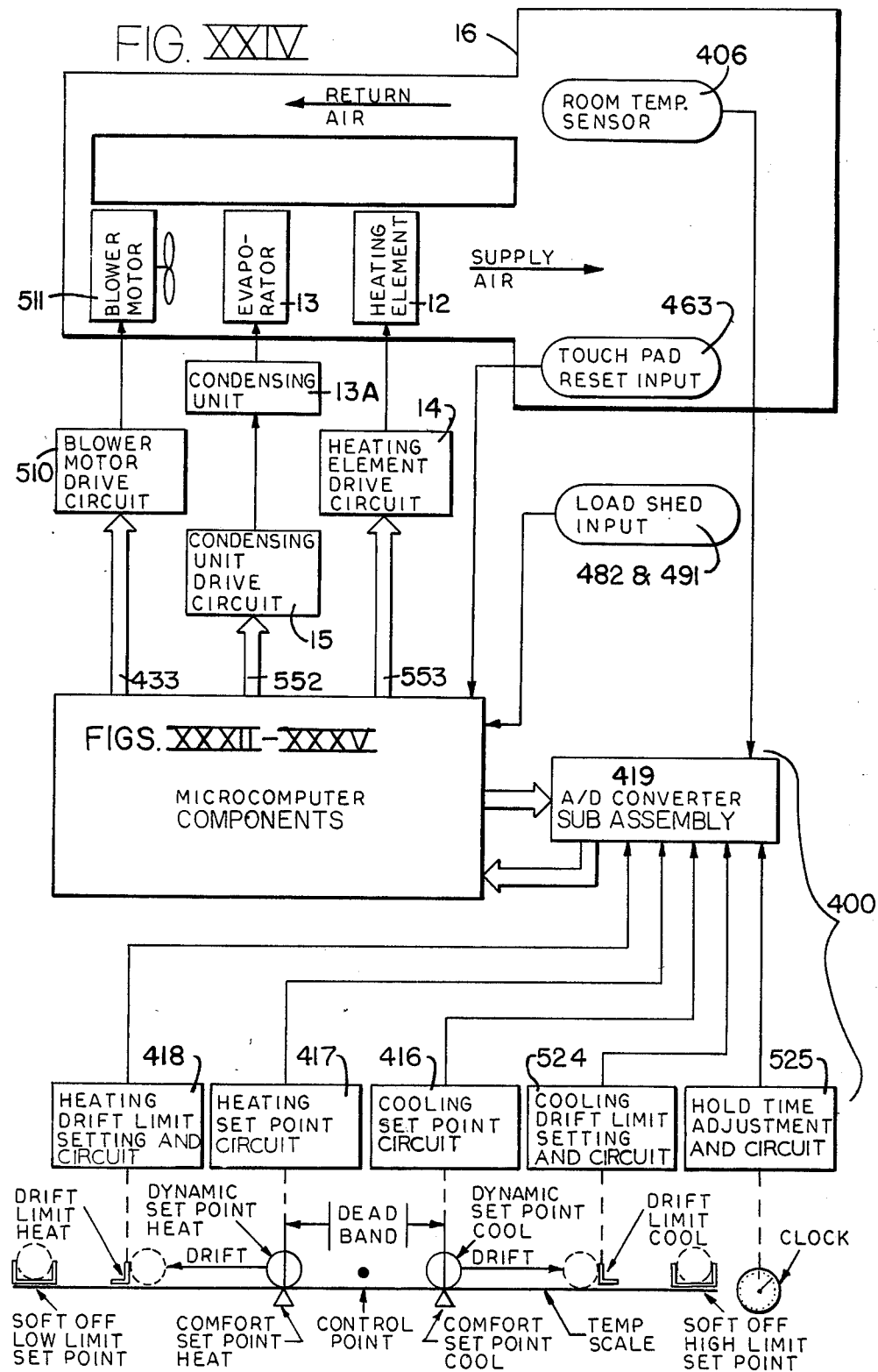

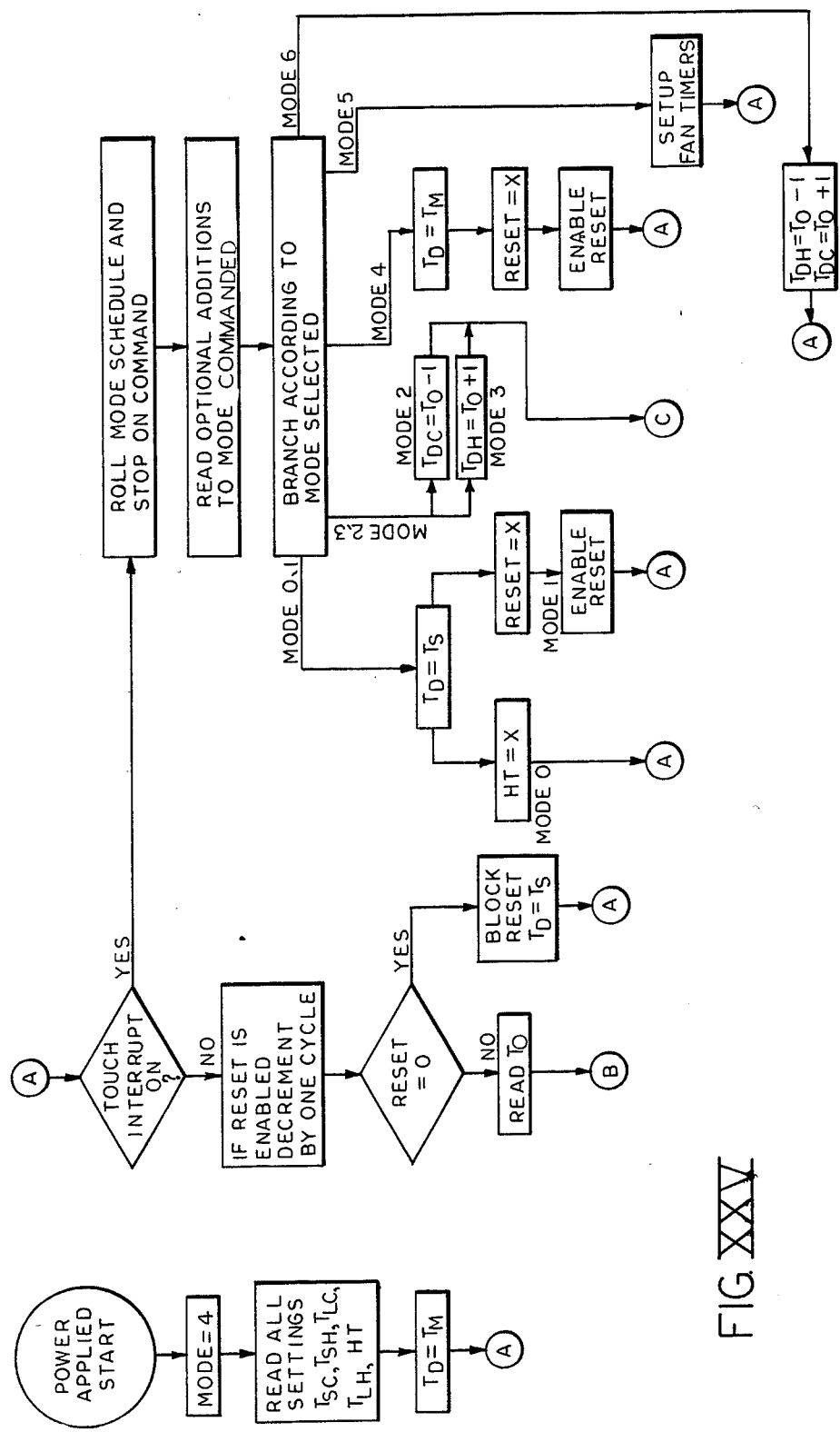
FIG. XXV

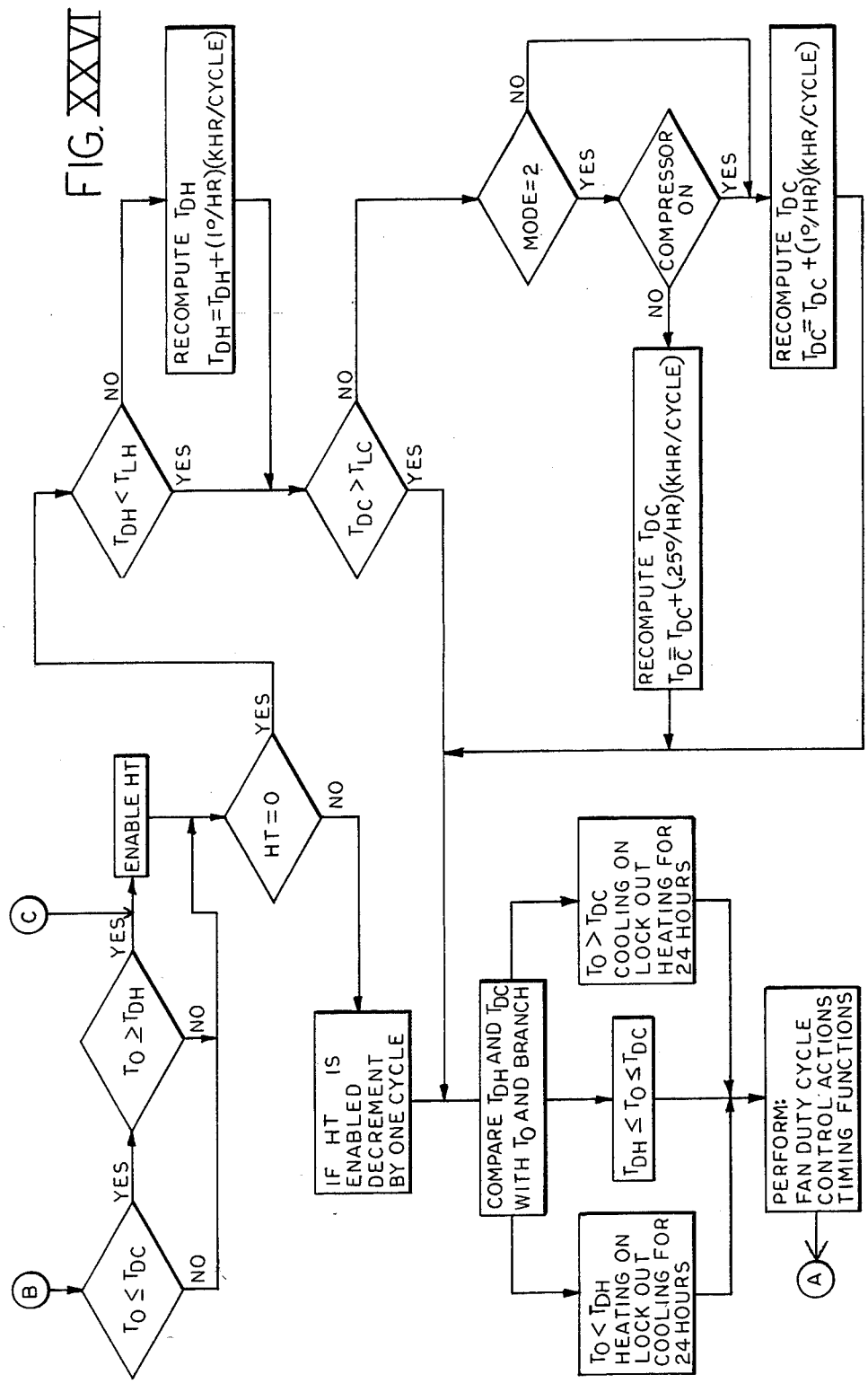

| LEGEND | |
|---|---|
| SYMBOL | DESCRIPTION |
| $T_S$ | COMFORT SETPOINTS-GENERAL |
| $T_{SC}$ | COMFORT SETPOINT-COOLING |
| $T_{SH}$ | COMFORT SETPOINT-HEATING |
| $T_L$ | DRIFT LIMIT-GENERAL |
| $T_{LC}$ | DRIFT LIMIT-COOLING |
| $T_{LH}$ | DRIFT LIMIT-HEATING |
| $T_D$ | DYNAMIC SETPOINT-GENERAL |
| $T_{DC}$ | DYNAMIC SETPOINT-COOLING |
| $T_{DH}$ | DYNAMIC SETPOINT-HEATING |
| $T_M$ | SOFT OFF HIGH AND LOW LIMIT SETPOINTS |
| $T_O$ | PSEUDO-OPERATIVE TEMPERATURE |
| HT | HOLD TIME COUNTDOWN CLOCK-COUNTER |
| RESET | COUNTDOWN CLOCK-COUNTER |

FIG. XXVII

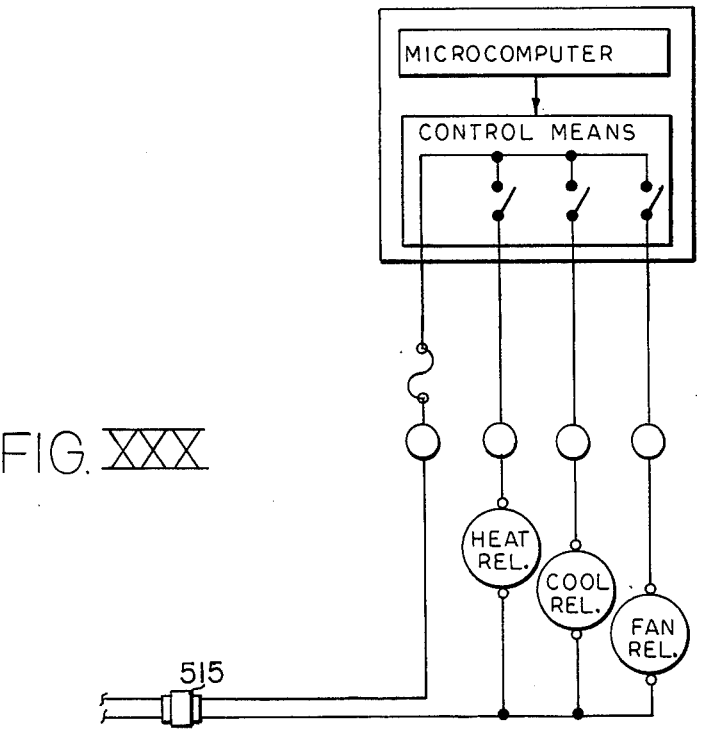

FIG. XXX

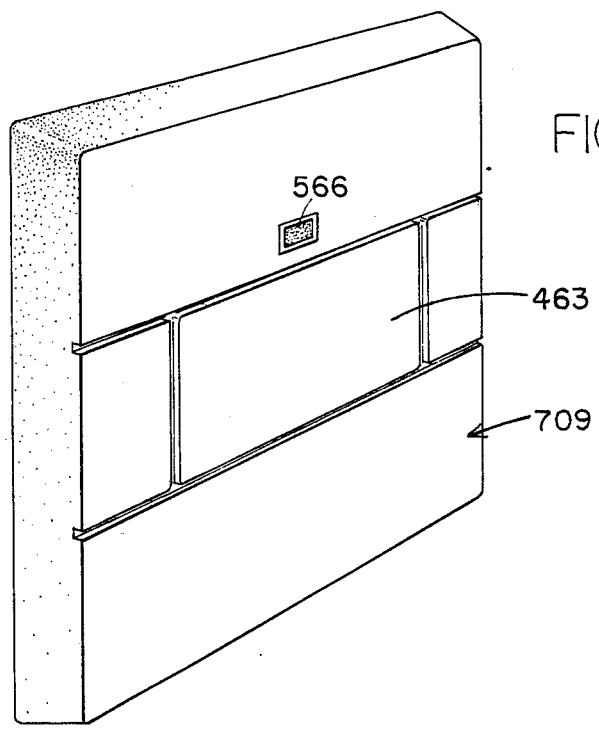
FIG. XXVIII
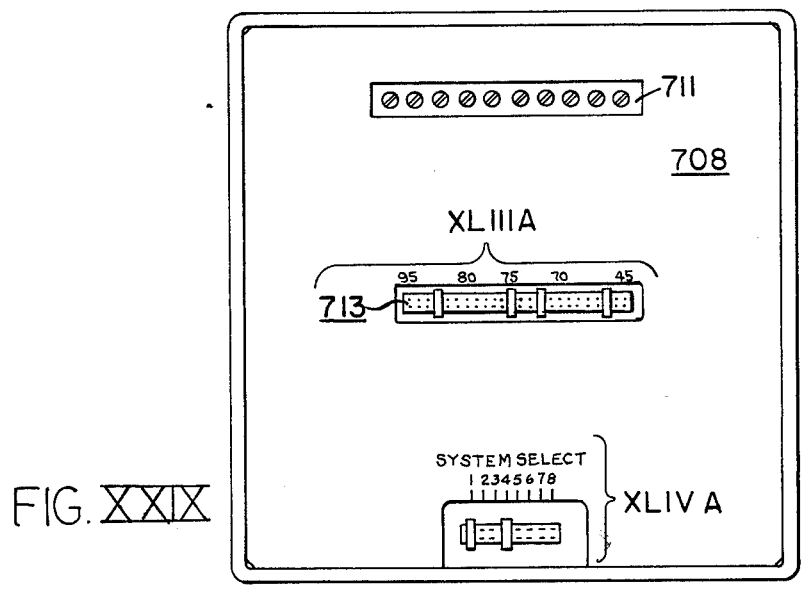
FIG. XXIX ns. 06/236,177 filed Feb. 20, 1981 and now abandoned.

TEMPERATURE CONTROL SYSTEMS WITH PROGRAMMED DEAD-BAND RAMP AND DRIFT FEATURES

This application is a continuation in part of my pending application Ser. No. 06/236,177 filed Feb. 20, 1981 and now abandoned.

BACKGROUND OF THE INVENTION

1. Field of the Invention

Temperature and humidity sensing apparatuses, systems and control processes which modulate air heating and cooling apparatus in environmental control systems.

2. The Prior Art

The conventional residential thermostat with its on-off-auto, heat-cool sub-base is too complex for most occupants to operate efficiently, and some of the more recent energy-conserving thermostats which require instruction booklets are even more complicated to operate, and do not provide a simple solution to energy conservation.

The Emergency Building Temperature Restrictions were promulgated July 5, 1979, under the U.S. Department of Energy, 10 CFR Part 490. These restrictions made it prohibitive in commercial and public buildings for an operator to set the thermostats so that energy is consumed to raise the room dry-bulb temperature above 65 deg F. (18 deg C.) or to set the thermostats so that energy is consumed to lower the room dry-bulb temperature below 78 deg F. (26 deg C.). For many buildings it was impractical to comply with the restriction by simple adjustment of the existing thermostats. There was also considerable reluctance to replace the thermostats due to the guaranteed discomfort as well as cost.

SUMMARY OF THE INVENTION

In one embodiment of this invention, shown in FIGS. I-XVII, means sensitive to air temperature (17 and 18) and humidity (19) in a room of a dwelling (16) are connected through a measuring means (21) having an output (208) proportional to such temperature and humidity to a control circuit (23). The control circuit (23) is connected to and directs heating and cooling units (12 and 13) within the dwelling (16). The program control circuit (23) provides programs of progressively changing signals to progressively change the effective temperature in the dwelling. The system is pre-programmed to permit the space termperature to drift at a controlled rate within a pre-selected dead-band range at a rate of 1 degree Fahrenheit per hour continuously or stepwise. The system saves energy by permitting space temperature to always drift in the energy conserving direction (i.e. up or down) and when actuated brings the space (16) under ideal control before drifting at an unnoticeable rate, as in FIGS. VI and VIII, in the energy-conserving direction. Energy abusive over-adjustment does not occur as with other thermostats. Such controlled drift provides greater comfort than thermostats which have a broad dead-band wherein room temperatures within the dwelling can rise or fall rapidly and energy is saved while making comfort available at all times to a human occupant (60) within such room or space within the dwelling because the rate of change of the drift of temperature (1 deg. F/hr.) is not noticeable to a human occupant.

Another set of emodiments of the invention provide systems and apparatuses for energy efficient demand reponsive processes for controlled heating and cooling of occupied areas of a building for human habitation, each said process comprising a variety of process steps, one of which steps is a controlled ramp temperature sequence, which sequence includes varied initial and/or final temperatures and duration of such ramp step, and another of which included steps may be the setting of the ramp sequences by an occupant to effect such sequences in predetermined time relations to a variable controlled and/or predetermined periods of time for steady state settings, all such steps being effected with varied differential band ranges and automatic verification to the occupant of each such chosen process steps on initiation and/or operation thereof. Initiation of the steps in such preferred embodiment is by touch sequence of occupant. The result thereof provides substantial energy savings.

BRIEF DESCRIPTION OF THE DRAWINGS

FIG. I is an overall view of the principal assemblies within the system 10 according to this invention.

FIG. II is a detailed showing of the terminal portions of the logic system 27 of cycle selector assembly 22 and the resistor bank subassembly 28 of the overall range control circuit or assembly 23 in zone IIA of FIG. I.

Figure 1:
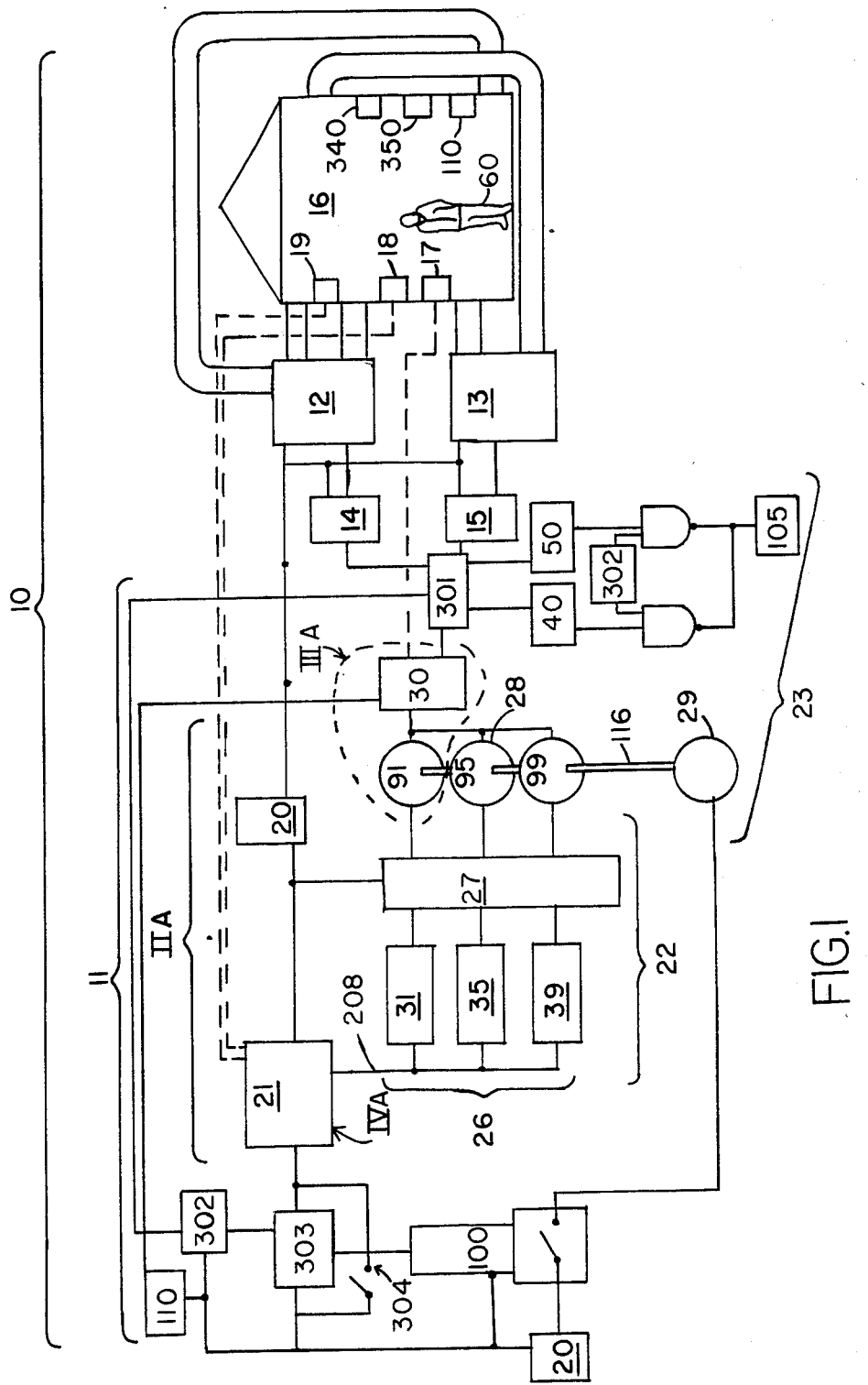

FIG. III is a diagrammatic showing of electrical component block connections in zone IIIA of FIG. I.

FIG. IV is an electrical diagram of parts and connections of apparatus in zone IVA of FIG. I.

FIG. V is an equivalent circuit diagram of the integrated circuit 200 in zone VA of FIGS. III and IV.

FIG. VI shows the temperature changes and stages in a heating cycle control operation of the system for FIG. I according to one embodiment of process of this invention.

FIG. VII diagrammatically shows the temperature changes and stages in a cooling cycle control operation of the system of FIG. I according to another embodiment of process of this invention.

FIG. VIII diagrammatically shows parts and connections within one resistor bank unit assembly, 91.

FIG. IX shows principal parts of a pulse drive mechanism 24 within resistor control unit 29.

FIG. X shows circuit connections and parts of the unijunction timer 111 of FIG. IX.

FIG. XI is a diagrammatic showing of an electrical circuit and mechanical parts within a humidity sensor and control unit 160 of which parts are shown in FIGS. I, III and IV.

FIG. XII shows principal parts of a motor drive assembly mechanism 140 within resistor control unit 29.

FIG. XIII diagrammatically shows the graphical relationships of temperature, humidity and electrical resistance within a control circuit as in FIGS. III and IV using a thermistor and a humidity transducer each having a positive temperature coefficient.

FIG. XIV shows the relation of components shown in FIGS. II and XV.

FIG. XV shows an intermediate portion of the logic system circuit 27 of cycle selector assembly 22 and resistor bank assembly 28 of range control assembly 23.

FIG. XVI diagrammatically shows the relations of temperature and electrical resistance of a thermistor with a negative temperature coefficient used in the circuits of FIGS. III and IV.

FIG. XVII diagramatically shows the relations of humidity and electrical resistance of a humidity transducer with a negative temperatuare coefficient used in the circuits of FIGS. III and IV.

FIG. XVIII is an overall diagramatic view of a system 707 using an improved control unit 700 according to this invention.

FIG. XIX is a perspective view of the completed apparatus unit 700 in the casing 702 therefor.

FIG. XX is a composite vertical transverse section taken along the broken section line shown as XXA—XXB of FIG. XXII.

FIG. XXI is an exploded isometric view of the principal subassemblies of control apparatus 700 showing the interior view of the backplate support assembly 703 and the front plate control unit 705.

FIG. XXII is a rear view of the front plate control unit 705 as seen along the direction of the arrow XXIIA of FIG. XXI.

FIG. XXIII is an installation wiring diagram showing the relationship of the inputs and outputs assemblies that are operatively connected to the electronic assembly components 400 of the control apparatus 700.

FIG. XXIV is a diagrammatic illustration of the overall operations and overall structures therefor of the overall system 707 of which control apparatus 700 is a part.

FIG. XXV and XXVI are diagrammatic illustrations of the operation flow diagram logic for system 707. FIG. XXVI is a logic and flow diagram continuation.

FIG. XXVII is a legend of the symbols used for the operation flow and logic diagarams of FIGS. XXV and XXVI.

FIG. XXVIII is a perspective view of a second record embodiment of apparatus, 709, according to this invention.

FIG. XXIX is a rear view of the front plate control unit of the embodiment shown in FIG. XXVIII showing use of screw terminals as 711 in lieu of plug-in connections and elimination of potentiometers of unit 705 by using a jumperpin strip 713 and jumpers 764–767 in opening 763.

FIG. XXX is an installation wiring diagram for the unit 709 shown in FIGS. XXVIII and XXVIX.

FIG. XXXI is a diagram illustrating operation and overall structure therefor of a system using the apparatus 709 shown in FIG. XXVIII.

FIG. XXXII to XXXV show in enlarged view the electrical connections for the component sub-assemblies in the overall electrical system of components 400 of the control apparatus 700 connected as shown in FIG. XXXVI FIG. XXXVI is a diagrammatic view of the overall relations of the electrical assembly components 400 within the control apparatus unit 700; it illustrates the electrical connection between the components shown in FIGS. XXXII, XXXIII, XXXIV and XXXV.

FIGS. XXXVII, XXXVIII and XXXIX show details of ramping steps for cooling mode operation according to this invention.

FIGS. XL and XLI respectively diagramatically show heating and cooling curves and change of lengths of cycles sensed and controlled according to the apparatus of this invention.

FIG. XLII shows zone XLII A of FIG. XXI in an enlarged mode to illustrate the numerical indicia in such zone for which labels for the rheostats are applied.

FIG. XLIII and XLIV respectively show zone XLIII A and XLIV A of FIG. XXIX at enlarged scale. Table III sets out characteristics of the electrical components of FIGS. XXXII to XXXV. The number of the terminals of each integrated circuit to which wires are attached for connection to the components of assembly 400 are indicated on those Figures.

Table IV sets out the modes of operation of the apparatus 700.

DESCRIPTION OF THE PREFERRED EMBODIMENTS

The system 10 of this invention comprises a program control apparatus 11, a house heating unit 12, a house cooling unit 13, a heating unit control relay 14 and a cooling unit control relay 15. The heating unit and cooling unit are operatively connected to a building or dwelling 16. The program control apparatus 11 provides for control of the heating unit 12 and cooling unit 13 to provide temperature change of one degree Fahrenheit per hour on controlled drift.

The program control apparatus 11 comprises, in operative combination, a power source 20, a cycle selector assembly 22, and a temperature control assembly 23.

The cycle selector assembly 22 comprises, in operative combination, a temperature sensor unit 21, a frequency sensitive selector circuit assembly 26 and a logic unit assembly 27, all connected together as in FIGS. II, XIV and XV and below described. Temperature sensor unit 21 comprises a 555 integrated circuit 200, connected to other components in an electrical circuit as shown in FIGS. IV and III.

Temperatare sensor elements 17 and 18 for units 30 and 21 respectively and a humidity sensor 19 are located in wall mounted housings therefor in the dwelling 16.

Heating and cooling control switches 40 and 50 are also located in wall mounted housings 340 and 350 respectively in the dwelling 16. The selector circuit assembly 26 comprises a series of generally like frequency sensitive electrical units as 31–39, each sensitive and responsive to one principal or particular frequency of the output of temperature sensor unit 21.

The temperature control assembly 23 comprises a resistor bank assembly 28, a resiston control unit 29, and a temperature range controller unit 30. The temperature range controller unit 30 is a 555 timer as 200 connected with other electrical components in an electrical circuit as shown in FIG. III. The resistor bank assembly or group 28 comprises a series of like connected and arranged and actuated resistor unit assemblies as 91–99 shown in FIGS. II, XIV and XV.

The program control apparatus 11 comprises a frequency sensor and selector unit as one of 31–39 of assembly 22 and a resistor unit as one of 91–99 of assembly 23 for each degree Fahrenheit of the range—as 65 deg F. to 85 deg F. shown in FIGS. VI and VII,—of operation of the system 11. The terminal apparatus portions shown as XIV B and XIV C in FIGS. II and XIV and comprising sensor units as 31–34 and resistor units 91–94 and sensor units 37–39 and resistor units 97–99 and circuit elements connected thereto as shown in FIG. II are representative of the terminal portions of the circuity of selector assembly 22 and control assembly 23. Additional intermediate units as sensor units 35 and 36 and resistor units as 95 and 96 and circuitry therebetween are provided between and connected to units 34 and 94 and 37 and 97 respectively as shown in FIG. XV; the number of such additional intermediate units is greater than those shown in FIG. XV as representative of such additional intermediate units in order to provide one sensor unit as 33 and one resistor unit as 93 for each degree Fahrenheit of the range of operation of the program control apparatus 11.

Components and connections of one resistor unit assembly, 91, are shown in FIG. VIII. Each of the resistor unit assemblies as 91-99 has different resistance values of its components, as 121-124 of unit 91, than other assemblies in the resistor bank assembly or group 28.

The resistor control unit 29, in one embodiment of apparatus, 140, shown in FIG. XII comprises a return unit 150 and a 12-hour motor, as 141, whose output completes one 360 degree complete revolution in twelve hours, and which is coupled with gearing 142 to provide continuous change of resistance values between the resistor bank terminal wires as 151, 152 and 153, which wires are connected to the overall resistance portions as 128 and 129 on each side of the wiper arms as 131 of the resistor units as 91-99. Wires 151, 152 and 153 are connected at the input of the temperature range controller unit 30 for continuous operation as in FIG. VI. Reversing unit 150 is connected to relay 109 and power source 20 and is actuated automatically upon cessation of operation of the cycle of operation of motor 141 to return to control shaft 116 of the resistor assembly 28 to its start position.

In another embodiment of resistor control unit apparatus, shown in FIG. IX, the resistor control unit 29 comprises a return unit 150, and a pulse drive assembly 24 which provides timed and stepped increments of resistance value change in the value of resistors of the resistor bank units connected at the input of the temperature range controller unit 30 for stepped operation as illustrated in FIG. VII.

In general, the program control apparatus 11 is directed to provide programs wherein the temperature may controllably drift or change within the dwelling, as 16, by one degree Fahrenheit (0.6 deg. C.) per hour. The direction of the drift will generally be in the direction from which the control signal comes but will always be in the energy conserving direction which tends to eliminate the immediate call for heating or cooling energy input.

LOGIC UNIT ASSEMBLY 27

The logic unit assembly 27 comprises an electrical circuit with a heating control switch 40, and a cooling control switch 50 located in housings therefor in the dwelling 16 and AND circuits as 41-48, 51-57 and 71-77 and inhibiting circuits as 61-67 and 81-87.

The circuits of assembly 27 provide that with the temperature sensor 21 activated at a given temperature, e.g. 74 degrees F., and only one of frequency sensor and selector circuit units as 31-39 activated only one of the relays as one of 101-109 respectively is actuated to control the switch arms therefor and respectively connect one of the resistor bank unit assemblies as one of 91-99 via wires 151, 152 and 153 to the temperature range control unit 30. When, however, two frequency sensor and selector circuit units as 32 and 33 are concurrently actuated because of overlap in range of temperature sensed and reacted to by both such neighboring sensor and related circuit units (as 32 and 33) then selection of only one or another resistor unit assembly of two adjacent resistor unit assemblies as 92 and 93 is automatically effected by the logic circuit 27 as hereinbelow described. The outputs of adjacent or neighboring frequency sensor and selector circuits units in assembly 27, as for example units 32 and 33, are connected to a common AND circuit, as 42, and that AND circuit (42) is connected to other AND circuits 52 and 71. Each of the AND circuits 51-57 is connected to the heating control switch 40 and each of the AND circuits 71-77 is connected to the cooling control switch 50. With the heating control switch 40 operating or in closed circuit condition and switch 50 open, actuation of two neighboring units as 32 and 33 serves to actuate the AND circuits 42 and 52; such connection also inhibits, through the inhibitor switch 62, actuation of one normally open relay 103 and provides for connection of the normally open relay 102 and resistors of resistor bank unit assembly 92 so that the cycle of operation of controller 30 with the resistors of the resistor bank unit assembly 92 of resistor bank assembly 28 is initiated. Similarly on the heating cycle (switch 40 closed and switch 50 automatically concurrently open) on concurrent actuation of the frequency sensor and selector circuit units 33 and 34, the AND circuit 43 is actuated as well as the AND circuit 53 to inhibit, through inhibiting switch 63, the actuation of relay 104 for the resistor bank unit assembly 94 while the normally open relay 103 for connection of the resistors of resistor bank unit assembly 93 is then actuated and the resistors of that unit assembly 93 are connected to the range controller unit 30.

With the cooling control switch 50 operating or in closed circuit condition and heating control switch 40 automatically open, actuation of units 32 and 33 serves to actuate the AND circuits 42 and 71; such connections also inhibits, through the inhibitor switch 81, actuation of the relay 102 and provide for connection of the relay 103 and the resistors of resistor bank unit assembly 93 so that the cycle of operation of range controller unit 30 with the resistors of the resistor bank unit assembly 93 of resistor bank 28 is initiated. Similarly on the cooling cycle (switch 50 closed and switch 40 automatically concurrently open) on concurrent acutation of the selector units 33 and 34 the AND circuit 43 is actuated as well as the AND circuit 72 to inhibit, through inhibiting switch 82, the actuation of relay 103 for the resistor unit 93 while the normally open relay 104 for the resistors of resistor unit 94 is then actuated and the resistors of resistor unit 94 are connected to range control unit 30.

The particular values of resistances in the resistor bank assembly 28 so connected to unit 30 provide the initial temperature range at the boundaries of which the controller unit 30 provides for turning on and off the heating unit relay 14 or turning off and on the cooling unit relay 15 to maintain the temperature in the dwelling unit 16 within predetermined ranges of temperature. The initial relative value of the resistances as 121-126 is determined by the initial position of each wiper arm as 131 held on the wiper arm drive shaft 116 for unit 91 (and by wiper arm as 132 for resistor unit 92) for a first value of resistance distribution and a total resistance value 128 on one side of each wiper arm as 131 and another resistance value as 129 on the other side of each such wiper arm as 131.

Each wiper arm as 131 and 132 is connected via shaft 116 and a wiper 139 therein to resistance bank terminal wire 152 with terminals of fixed resistances as 121 and 123 connected to wires 151 and 153 respectively. The variable resistances as 122 and 124 provide for precise quantitative calibration.

The operation of resistor control unit 29 progressively changes the values of the boundaries 251 and 252 of the controlled temperatuare range 253 through the resistances as 128 and 129 connected to the controller unit 30 continually and stepwise in a process as shown in FIG. VII using the apparatus of FIGS. IX and X or progressively changes the boundaries 261 and 262 of the controlled temperature range 263 continuously or smoothly in a process as shown in FIG. VI when a continuously running motor as 141 is used to drive the wiper arm drive shaft 116. Such progressive changes of resistance values progressively changes the position of the range of on and off control by range control unit 30 and provides the programs of on and off operation of the heating unit 12 and cooling unit 13 to provide a controlled drift of the effective temperature in dwelling 16.

In the resistor control unit 29 embodiment shown in FIGS. IX and X the pulse drive mechanism 24 comprises a stepping circuit 145 and a gear drive assembly 146. The stepping circuit 145 comprises a unijunction timer circuit 111 of which the actuating switch 241 is closed when the start relay 100 is actuated at the start of the system 10 by switch 110. The unijunction timer circuit 111 is connected to a solenoid 112 which solenoid drives the gear drive assembly 146. Gear drive assembly comprises a gear train 114 and a ratchet wheel 113; the ratchet wheel 113 drives the gear train 114 and that gear train drives a drive shaft wheel 115; the drive shaft wheel 115 positions and controls the wiper arm drive shaft 116 of resistor assembly 29 on which shaft are firmly mounted wiper arms, as 131 for resistor unit 91, arm 132 for resistor unit 192, and like arms for each resistor unit 93-99 so that, on initiation of operation of the cycle of operation of unit 29, the distribution of resistance values in each resistor unit as 91-99 is regularly changed at a rate providing for a change of temperature range as 253 or 263 in dwelling 16 of ¼ degree Fahrenheit each 15 minutes.

The return unit 150 is connected to electrical power source 20 and comprises a switch 147, a locking circuit 148, and a trigger 149 on the shaft 116. The output of switch 147 is connected to drive the solenoid 117 and a motor 118 to return gear 113 to start position. Alternatively the output of switch 147 may be used to return the motor 141 and gear 142 to start position.

On termination of each cycle of operation of unit 29 as in FIG. IX, (a) the solenoid 117 is actuated by switch 147 to release the escapement lock rod 144 that normally holds the ratchet wheel 113 for stepwise motion in one, clockwise, direction and (b) motor 118 turns a helically threaded shaft 154, which mates with and turns a correspondingly threaded end of shaft 143 of the ratchet wheel 113 and returns the ratchet wheel 113 and shaft 116 and wiper arms as 131 and 132 of all resistor units 91-99 to their start position.

Normaly open switch 147 is closed only on release of the relay 100 and is automatically thereafter held closed by a locking timer circuit 148 until shaft 116 is brought to its start position, and then relay switch 147 is opened automatically by a triggar 149 on shaft 116.

OPERATION OF SYSTEM 10 ACCORDING TO FIGS. VI AND VII

Human occupants as 60 in an enclosure as a room in dwelling or building 16 are comfortable although the temperature drifts so long as the rate of drift is controlled or (ramped) to a gradual change. Slow rates of temperature change, approximately 1 degree Fahrenheit per hour (0.6 deg Centigrade per hour) or less are acceptable and allow the temperature during drift to extend beyond the given appropriate comfort temperature range for humans.

Generally for sedentary persons, slow temperature changes from the usual neutral comfort point are indistinguishable from constant temperature conditions.

The thermostat system 10 has a narrow (1 deg F.) "dead-band" as 263 in FIG. VI and 253 in FIG. VII and on each of its preselected neutral set-points, but the "dead-band" always drifts at a controlled rate when triggered by a call for heating or cooling by switches 40 or 50 and 110 of apparatus 11. The system 10 does not call for heating or cooling energy input when the room temperature is within the bounds of the "dead-band" upper and lower temperature limits as 251, 252, 261 or 262. The temperature of the air in the building 16 is shown by dashed lines 260 and 259 in FIGS. VI and VII respectively. The energy input zones are shown by hatched zones 264 and 268 A-F and 254 and 258 A-F. The "dead-band" also continues at a controlled drift at times when the apparatus 11 does not call for heating or cooling so long as the rate of drift does not exceed the rate of natural temperature drift of the space. A touch of the finger to the thermostat face plate 110 causes the "dead-band" to move back to a neutral setting, as 75 deg F. in FIG. VI Limits can be set to the extent the thermostat's "dead-band" would drift from neutral setting.

In the preferred embodiment, the operator as 60 in dwelling 16 adjusts the thermostat unit 21 by touching start button or switch 110. The system 11 does not have the conventional dial that is set or twisted to adjust; the operator 60 touches a conductive plate or button 110 which brings the temperature setting of the thermostat as 21 to a preselected neutral point as 75 deg F. in FIG. VI and FIG. VII. A thermistor sensor and humidity transducer determines when the setting is satisfied for unit 30 and in turn programs the unit 21 to start a setting change, or drift. When the start button 110 is actuated the control unit 30 comes into play and provides for bringing the environment in the dwelling 16 to a preset temperature as is sensed by thermistor 17 (and the variable resistor 170 which is a measure of sensed humidity). After the interior of dwelling 16 is at the desired temperature a signal from the output stage 214 is produced.

Such signal's effect on the heating and/or cooling units depends upon whether the heat control switch 40 or the cooling control switch 50 is earlier actuated.

A discriminator 301 which distinguishes between the high and low output signals of the circuit 30 is actuated by response of the circuit 30 to the conditions in dwelling 16 as measured by humidity and temperature components 17 and 19. Such discriminator 301 connects to a flip-flop switch 302 which is actuated thereby and in turn actuates a time delay 303. Accordingly after a fixed time as determined by the time delay 303 the sensor unit 21 begins its program. At the time the sensor unit 21 begins its program the flip-flop 302 has been toggled and the further signals from control unit 30 do not effect the time delay unit 303 until the starter switch 110 is actuated to start another cycle. During the period that the control unit 30 is operated it controls the heating and cooling units 12 and 13 through the relays therefor 14 and 15 respectively. The time at which the temperature sensor unit 21 becomes effective to control the system and begin the program can be actuated by a fixed time delay 303 or the time delay 303 may be made variable depending upon the conditions and dynamic response of the dwelling system and its heating and ventilation and air conditioning system or a bypass switch 304 may actuate the program 21 at a time, for instance, when the occupant leaves the house or at such other time at which the occupant may desire to initiate the cycle programs provided by the sensor unit 21 and the remainder of the unit 11.

The immediate call by button or plate 110 is for the heat or the cooling to be brought into the temperature range as at 264 in FIG. VI or 254 in FIG. VII that the occupant's body needs at that moment, remaining fixed at this re-set temperature as 75 deg F. in harmony with the response time of the heating or cooling system. Response time 265 and 255 is the time required for the heating or cooling equipment for dwelling 16 to bring the environment of the space to within the preselected comfort range. The button or plate 110 may also be connected to sense and make minor adjustments in the preselected temperature as reflected in a further adjustable resistance in series with 17 and 170, to account for discomfort reflected by too great a difference between the temperature of the occupant's fingers as compared to normal.

Touching the plate changes the temperature setting of the thermostat to a preselected neutral/comfort set point because the thermistor 18 and humidity transducer 190 through unit 21, assembly 22 and 23 actuates units 12 or 13 to effect heating or cooling, as required, to bring the room temperature in building 16 into the preselected temperature range as 75 deg. F. as shown in FIG. VI where heating is desired or 75 deg. F. as shown in FIG. VII where cooling is desired.

The set point will remain fixed at this reset neutral/comfort temperature setting for a period of time, as 266 in FIG. VI and 256 in FIG. VII which is in harmony with the dynamic response of the building—which includes its contents and structure as well as its heating and cooling system. The response times 265 and 266 will vary among systems and structures. The electronic sensor circuit 30 determines when the set point has been satisfied and triggers a timer 304 which, when timed out, starts the set point range 263 (or 253) to slowly drift as shown in FIG. VI (and VII).

The following is a specific example of the winter operation of a controlled drift apparatus 11 installed within a residential environment system as 10 (referring to FIGS. I and VI).

The occupant awakes at 6:00 a.m. and touches the thermostat start switch 110 if the room temperature feels too cool (e.g. 65 deg F.). The circuit 30 responds by calling for the preselected 75 F. plus or minus 1 deg F. (24 deg C. plus or minus 0. deg C.) and provides for 100% heating, and starts operation of the heating unit as at 264 in FIG. VI to satisfy the thermostat and humidity sensor setting and maintains that setting until the room's Mean Radiant Temperature (MRT) approaches the room's air temperature shown by the dashed line 260 as sensed by thermistor 17 and humidity transducer 19.

The occupant leaves for work at approx 7:30 a.m. at which time the space had been warmed to an Operative Temperature of 75 F. (24 deg C.) by 6:30 and has begun to cool down at a rate of 1 deg F./h (0.6 deg C./h). There will be many occasions during cool weather wherein well insulated residential spaces subject to this controlled drift rate will result in no need for heating energy.

By 5:30 p.m. when the occupant returns home from work, the temperature within the space will be say 65 F. (18 deg C.) if the cold weather has continued throughout the day. Although 11.5 hours have passed since the thermostat was touched, an 11.5 deg F. (6 deg C.) drop would not necessarily have occurred even if a 65 deg F. (18 deg C.) minimum limit had not been set. The reason is that the drift does not begin until the space temperature reaches Operative Temperature or the delay timer times out, (shown in FIG. VI as around 6:30 a.m.). Furthermore, if at any time during the day outdoor conditions warm to the point of causing the space temperature to cease dropping, the first call for cooling merely causes the direction of drift to reverse.

Upon finding the space temperature too cool, the thermostat is touched again at 5:30 p.m. to reset the thermostat to warm the space to 75 F. (24 deg C.) or 76 F. (24.5 deg C.) by 6:00-6:30 p.m., and thereafter the drifting resumes. For someone retiring by 10:00-10:30 p.m. the temperature will be no lower than 72 F. (2 deg C.). It will be after midnight when the occupant is asleep and covered with blankets before the temperature drops below 70 F. (21 deg C.).

The following is a specific example of the summer operation of energy saving controlled drift apparatus 11 installed within a residential environment system as 10 (referring to FIGS. I and VII):

The occupant arrives at or awakes at 8:00 a.m. in the room and touches the thermostat start switch 110 if the room temperature feels too hot. The circuit 30 responds by calling for the preselected 75 deg F. plus or minus 1 deg F. (26 deg C. plus or minus 0.6 deg C.).

The thermistor and humidity sensor of temperature range controller 30 call for 100% cooling by the cooling unit 13 to satisfy the thermostat and humidity sensor setting and maintains that setting and operation, as at 254 in FIG. VII until the room's Mean Radiant Temperature (MRT) approaches the room's air temperature 259 as sensed by thermistor 17 and transducer 19. The preset built-in timer circuit as 303 to delay commencement of drift may also be used to delay drift until MRT approximates air temperature 259.

The occupant leaves the room at approx 9:00 a.m. at which time the space had been cooled to an Operative Temperature of 75 deg F. (24 deg C.) and had begun to warm up at a rate of 1 deg F./h (0.6 deg C./h). While there will be many occasions during warm weather wherein very well insulated residential spaces subject to this controlled drift rate will result in no need for further cooling energy.

By 5:30 p.m. when the occupant returns to the room, the temperature within the space will be about 83 deg F. (28.3 deg C.) if the hot weather has continued throughout the day. Although 8.5 hours have passed since the thermostat was touched, an 8.5 deg F. (6 deg C.) increase would not necessarily have occurred even if an 82 deg F. (27.8 deg C.) limit had not been set. The reason is that the drift does not begin until the space temperature reaches Operative Temperature or the delay timer times out, which is shown as around 8:30 a.m. Furthermore, if at anytime during the day outdoor conditions cool to the point of causing the space temperature to cease rising, the first call for cooling merely causes the direction of drift to reverse.

Upon finding the space temperature too hot, the system start switch 110 is touched again as at 5:30 p.m. to reset the thermostat to cool the space to 75 deg C. (24 deg C.) and the drifting resumes. For someone retiring by 10:00-10:30 p.m. the temperature will be no higher than 80 deg F. (26.7 deg C.) if the weather had remained severely warm into the night. When the thermostat is touched upon retiring, the room temperature may tend to rise only slightly before the normal early morning cool weather conditions prevent a further rise in temperature.

The system 10 above described has a narrow 1 deg F. (0.6 deg C.) dead-band 253 with boundaries 251 and 252 in FIG. VII and dead-band as 263 with boundaries 261 and 262 in FIG. VI starting on a preselected neutral/comfort set point, but the set point dead-band always drifts (to right in FIG. VII and to left in FIG. VI) at a controlled rate of 1 deg F./hr. when drifting is triggered by the system satisfying a "call" for heating or cooling. The system 10 neither calls for heating as at 264 and 268 A-F or cooling as at 254 and 258 A-F so long as the room temperature 260 or 259 is within the bounds of the dead-band upper and lower limits as 261 and 262 and calls for heating as at 264 and 268 A-F and cooling as at 254 and 258 A-F only when the temperature of the room shown by dashed line is at the limit of the band and the circuit 30 then actuates the heating or cooling unit 12 or 13 of system 11. The set point/dead-band as 263 and 253 continues controlled drift when the system 11 is or is not calling for heating or cooling.

The system 10 thus provides for greater dwell time in the "energy systems-off" mode periods as 257 A-G and 267 A-267E than in the "energy systems on" periods 264 and 268 A-E and 254 and 258 A-F when energy is supplied to maintain the rate of drift of the air temperature as indicated by lines 260 and 259—within the band limits 263 and 253 respectively resulting in a corresponding reduction in energy consumption. A touch of the occupant's finger to the control button plate 110 causes the set point/dead-band to move back to a neutral setting as 75 deg F. in FIGS. VI and VII. The extent of drift of the set point dead-band from neutral setting (high limit and low limit) can be preset and further limited by field accessible adjustments to accommodate to different personal and seasonal conditions.

On starting the operation of the system 11 and the process as in FIG. VI or VII (by connecting the range controller unit 30), the resistor relay 105 is automatically actuated. The resistor unit assembly 95 then provides the electrical resistances thereof (at the usual start position of assembly 95) across wires 151 and 152 and 153 to the 555 timer unit 200. Such values of electrical resistance correspond to the value of electrical resistances through the thermistor 17 and rheostat portion 170 at the desired comfort value in the dwelling, 16 e.g. 75 deg F. and 50% relative humidity or equivalent effective temperature. Such resistances which are initially connected across wires 151 and 152 and 153 remain so connected for the duration of the period of response time as 265 and the dwell time 266 in FIG. VI and 256 in FIG. VII. At the end of the response timer period as for instance at 6:30 a.m. as shown in FIG. VI, and 8:30 a.m. in FIG. VII when the timer unit times out and the sensor unit 21 and control assembly 22 are then thereby automatically actuated, the sensor unit 21 and assembly 22 then control the sequence of positions of resistor units as 96, 97 and 98 that are subsequently connected to unit 30 on an energy conserving heating operation as in FIG. VI; alternatively units as 94, 93, and 92 are sequentially connected to unit 30 during an energy conserving cooling operation as in FIG. VII. The sequence of connection of the resistor units is determined by actuation of cooling control switch 40 or heating control switch 50. The operation of this system provides heating energy savings proportional to the area 267A-F between areas shown as periods of heating as 264 and 268A-F. The operation of this system also provides cooling energy savings proportional to the areas 257A-G between areas shown as periods of cooling as on 254 and 257A-F.

In the operation of the apparatus 11 on a heating cycle as in FIG. VI sensor 21 initially senses the temperature in room 16 at the operative temperature as 75 deg F. set by unit 30 and then connects a particular resistor unit, as 95 for a temperature range of 75 deg F. plus or minus ½ deg F. to actuate the unit 30 for the period of response 265 and dwell time 266. Thereafter relay 100 is actuated and the resistor control unit 29 commences then to automatically operate. The resistor control unit 29 then continuously and smoothly progressively changes the values of the assembly 28 resistors as 128 and 129 and thereby lowers the on-off range of reaction of range control unit 30 at the continuous rate of one degree Fahrenheit per hour (to 74 deg F. plus or minus ½ deg F.). When the temperature in zone 16 drops to the lower limit of the range set by unit 30, as at point 291, heating unit 12 is actuated automatically by unit 30 and the temperature in the zone 16 then rises as shown diagrammatically by the room temperature path portions 292 A-F. When the unit 30 is no longer actuated the temperature of zone 16 falls as at portions 293 A-F of temperature path 260.

When the temperature in zone 16 reaches 74 deg F. the sensor unit 21 connects another resistor unit, as 94 to wires 151, 152 and 153. Such other resistor unit sets the range control unit 30 at a different value than did the first resistor unit, 95, connected to range control unit 30 so that unit 30 then sets range of reaction of the heating unit 12 to drift continuously downward to 73 deg F. in one hour without actuating that heating unit. When the zone 16 temperature reaches 73 deg. F. the sensor unit 21 actuates another resistor unit as 93 that provides that range control unit 30 have a 73 deg. F. range (plus or minus ½ degree F.) and so permits the reaction zone or dead-band 263 to drift upwards continuously and smoothly at 1 deg. F. per hour within a range of ½ degree F. The thermistors 17 and 18 are accurate to within 0.2 degree Fahrenheit.

In operation of the apparatus 11 on a cooling cycle as in FIG. VII the sensor 21 initially senses the temperature in room 16 at the operative temperature as 75 deg F. set by unit 30 and then connects a particular resistor unit, as 95, for a temperature range of 75 deg F. plus or minus ½ deg F. to actuate the unit 30 for the period of response 255 and dwell time 256. Thereafter relay 100 is actuated and the resistor control unit 29 commences then to automatically operate. The resistor control unit then continually in stepwise fashion progressively changes the values of the assembly 28 resistors as 128 and 129 and thereby raises the on-off range of reaction of range control unit 30 at the rate of one-fourth Fahrenheit per ¼ hour to 76 deg F. (plus or minus ½ deg F.). When the temperature in zone 16 rises to the upper limit of the range set by unit 30, as at 294, cooling unit 13 is automatically actuated by unit 30 and the temperature in the zone 16 then falls as shown diagrammatically by the room temperature path at 295 A-F. When the unit 30 is no longer actuated the temperature of zone 16 falls, as at portions 296 A-F of temperature path 259.

When the temperature in zone 16 rises to 76 deg F. the sensor unit 21 connects another resistor unit, as 96 to wires 151-3. Such other resistor unit sets the range control unit 30 at a different value than did the first resistor unit, 95 connected to range control unit 30 so that unit 30 then sets the range of reaction of the cooling unit 13 to drift stepwise upward to 77 deg. F. in one hour (at ¼ e.g. F. each 15 minutes) without actuating that cooling unit. When the zone 16 temperature reaches 77 deg. F. the sensor unit 21 actuates another resistor unit as 97 that provides that unit 30 have a 77 deg. F. range (plus or minus ½ degree F.) and so permits the reaction zone or dead-band 253 to drift upward stepwise at 1 degree Fahrenheit per hour within a range of ½ degree F.

The particular described initial setting of the dead-bands as 263 and 253 in FIGS. VI and VII at 75 deg. F. is merely exemplary of initial settings in comfort conditions of ASHRAE standard 55-74 i.e., at effective temperature in range of 72 and 78 deg. F. (22.2 and 25.6 deg. C.) and dew points of 35 and 62 deg. F. (1.7 and 16.7 deg. C.)—along the 50% relative humidity line the temperature range is 72-78 deg. F.—and more recent winter and summer comfort envelopes at air movement of 30 f.p.m. or less. Following such initial settings the control drift is put into operation for system 10 by apparatus 11 as above described.

The controlled stepped dead-band operation in FIG. VII is merely exemplary of a stepped controlled drift operation using the apparatus as in FIGS. IX and X and the smooth controlled dead-band operation of FIG. VI is merely illustrative of a controlled continuous drift operation using apparatus as in FIG. VII. Accordingly the stepped characteristics shown in the controlled dead-band drift cooling energy input operation of FIG. VII may also be applied to a controlled dead-band drift heat energy input operation as described in relation to FIG. VI. Variations to ramp rate create varied comfort feelings and are useful when optimum savings is not to be had without some discomfort. Also, the smooth continuous characteristic of the controlled dead-band drift in the controlled heating energy input operation shown and described in relation to the operation shown in FIG. VI may be used in an operation as shown in FIG. VII where there is a controlled dead-band drift during application of cooling energy.

OPERATION OF HUMIDITY SENSOR ASSEMBLY OF FIG. XI

Humidity sensor and control unit 160 comprises in operative combination, and connected as shown diagrammatically in FIG. XI, a humidity transducer 19 located within a wall mounted housing in the room 16, a base resistance 162, an amplifier transistor 163, a solenoid coil 164 within which is located a solenoid piston 165 with an extension arm 159, a piston spring 166 which biases the piston to maintain it in rest position with the piston only partially extended upwardly beyond the coil 164, an adjustment screw 167 which serves to adjust the base or rest position of the piston relative to the coil, and a bracket 176 and base plate 168 on and in which the coil 164 and arm 159 and screw 167 are supported as well as electrical components 162, 163, 170 and 180. The apparatus 160 also comprises a linkage 169 which is connected to the arm 159 of the piston 165 to actuate the wiper arm 172 of the range control unit rheostat 170 and wiper arm 192 of sensor unit rheostat 190. The humidity transducer or humidistat 19 thus actuates two rheostats, one, sensor, rheostat 190, for the sensor circuit 21 and the other, control, rheostat 170 for the control circuit 30.

FIG. XVI shows the electrical resistance characteristics of thermistor 17 of controller 30 as well as the electrical resistance characteristics of the thermistor 18 of sensor unit 21 where both have negative temperature coefficients. In FIGS. XIII and XVI the vertical line referenced as "TEMP" and shown as 178 in FIG. XIII indicates increasing temperature in an upward vertical direction and in FIGS. XIII, XVI and XVII the horizontal line referred to as "RESISTANCE" and 179 in FIG. XIII indicates increasing electrical resistance from left to right. In FIG. XVII the vertical line indicated as "HUMIDITY" indicates increasing values of humidity in the upward vertical direction.

The fixed terminal 175 and wiper arm terminal 173 of the rheostat 170 are connected in the electrical circuit of the control unit 30 so that the output of that circuit 30 reacts to the sum or totality of electrical resistance measurements of temperature and the humidity in the monitored and controlled zone 16. The fixed terminal 195 and wiper arm terminal 193 of rheostat 190 are connected in the circuit of the temperature sensor unit 21 so that the output of such circuit 21 reacts to the sum or totality of electrical resistance measurements of temperature as 282 in FIG. XVI and the humidity as 272 in FIG. XVII in zone 16.

As shown by line 270 in FIG. XVII, with a negative temperature coefficient of the humidity transducer 19 in the circuit 160, with a high humidity 271 in zone 16 the electrical resistance 272 of the transducer 19 is relatively low or reduced and the current through the transistor 163 of circuit 160 is low or reduced; as a result thereof the current through the coil 164 is reduced and the displacement of the piston 165 is small or lowered.

The linkage 169 then provides that the portion 171 of the rheostat resistance between wiper arm terminal 173 and fixed terminal 175 of the rheostat resistance 170 applied to control circuit 30 has a low value. With the circuit of unit 30 comprising a thermistor 17 of negative temperature coefficient as shown by line 280 in FIG. XVII the sum or combination of resistance 283 of the thermistor 17 and the resistance 273 of the humidity rheostat resistor 170 has lower total resistance than would be the case where the humidity as 272 and temperature as 282 were at lower value with concurrent higher resistances as 274 and 284 respectively. The linkage 169 also provides that the portion of the rheostat resistance 190 between terminals 193 and 195 of rheostat 190 is applied to sensor circuit 21 and has a low value, and the combination of electrical resistances of the negative temperature coefficient thermistor 18 and of the humidity rheostat resistor 190 have a total lower electrical resistance than would be the case where the humidity and temperatures were cool or at a lower value.

The converse is also true, i.e. when the humidity in zone 16 is low as at 272 the resistance 273 of the humidity transducer 19 is high, the current through the transistor 163 is high and displacement of the piston 165 is large and the linkage 169 then provides that (a) a large portion of the resistor 170 is applied in series with the thermistor resistance 17 as shown in FIG. III while also (b) that a large portion of the resistor 190 is applied in series with the thermistor resistance 18 as shown in FIG. IV.

Accordingly, in the apparatus 11 although the actual temperature in zone 16 of the dwelling may be a given dry bulb temperature e.g. 76.3 deg F. with a high humidity e.g. 80% relative humidity the humanly sensed temperature or effective temperature would be higher e.g. 78.8 deg F. at 40% relative humidity and the output line 208 of sensor 21 would provide, at 76.3 deg F. and 80% relative humidity an output to the frequency selectors as 31-39 as though a higher dry bulb temperature (but the same effective temperature) of 80.6 deg F. at 20% relative humidity were sensed because the resistance due to the temperature as measured by a thermistor would be one value (FIG. XVI No. 283) and the resistance due to the humidity would be additional thereto (Reference No. 273 on FIG. XVII) for a total resistance which would be the sum of the resistances due to the resistance of the thermistor and also the resistance due to the rheostat resistor portion 171. Thus, the control unit 30, via the humidity sensor rheostat 170 of assembly 160 provides that the humidity in the monitored zone or room is automatically taken into consideration together with the dry bulb temperature sensed by the thermistor 17 for the control action of unit 30, i.e. a certain resistance (283 in FIG. XVI) due to the electrical resistance of the thermistor plus the resistance 273 of the unit 170 due to the humidity reading.

Further, where the actual temperature in the dwelling may be 72 deg F. with a low humidity, e.g. 20% relative humidity, the humanly sensed temperature or effective temperature would be lower e.g. like 70 deg F. at a higher e.g., 50% relative humidity and the sensor 21 automatically provides at 72 deg F. and 20% relative humidity in dwelling 16 an output at 28 to the frequency selectors as 31-39 as though a lower dry bulb temperature (of 70 deg F. at higher, e.g. 50%, humidity) were sensed because the resistance due to the temperature is one a value as 283 and the resistance as 273 due to the humidity is added thereto to provide a total resistance as 284 which is as great as that corresponding to a lower dry bulb temperature as 282. The unit 30 under such conditions, via with the sensor rheostat 170 in assembly 160 provides that humidity in the monitored zone or room is automatically taken into consideration together with the temperature sensed by the thermistor 17 for the control action of temperature range controller unit 30.

The rheostats 170 and 190 are thus connected in circuit 160 so as to provide changes in electrical resistance in circuits 30 and 21 respectively that not change in the same direction as the electrical resistances of the thermistors 17 and 18, on change increase in temperature of the interior of building or dwelling 16 but also the amount of change of the resistance of the portions of rheostat 170 and 190 connected to circuits 30 and 21 respectively due to change in humidity; sensed by the transducer 19 provides an amount of electrical resistance change in those portions of rheostats 171 and 191 connected to circuits 30 and 21 respectively that matches the equivalent change in temperature and humidity for comfort purposes, as set out in ASHRAE comfort chart (Hardy, J. D. Thermal Comfort and Health, ASHRAE Journal 31, pgs. 43-51, 1971 and ASHRAE STANDARD 55, Thermal and Environmental Conditions for Human Occupancy.)

Both rheostats 170 and 190 are connected to provide a reduced electrical resistance as the sensed humidity increases when, as is the case with the preferred circuit embodiment of units 160 and 30 described herein, the thermistors of the sensor and control circuits 30 and 21 also have negative coefficients of temperature as shown by lines 280 and 270 in FIGS. XVI and XVII respectively. However, the thermistors 17 and 18 used in circuits 30 and 21 respectively may have positive coefficients of temperature, as shown in FIG. XIII, then the rheostat 170 of humidity control unit 160 would be connected at terminals 173 and 174 to the remainder of circuit 30 as shown in FIG. III and rheostat 190 of the unit 160 would be connected at its terminals 193 and 194 to the remainder of circuit 21 as shown in FIG. IV. With a thermistor having a positive temperature coefficient, as shown in FIG. XIII with a 70 deg. F. temperature in zone 16, as indicated at 181 for thermistor as 17 or 18 and—in view of the relationship established by temperature coefficient of resistance line 180—with the corresponding resistance value 183, the electrical resistance value connected to circuit 30 or 21 is increased from the electrical resistance value at 183 by an added electrical resistance value (187 in FIG. XIII) such as is provided by the rheostat portion 193-194 or 173—174 in response to the humidity condition in zone 16 as then measured by unit 160. The effect of the electrical resistance due to the humidity measurement is to reach a total resistance value of 184 because of the added effect at 187 of humidity. Such additive action produces an inapparent higher temperature, as 72 deg. F., as indicated by referece number 186, in view of the temperature coefficient relationship of temperature and resistance at point 185 to which the sensor unit 21 reacts. By such circuit using positive temperature coefficient components when the sensed temperature or humidity increases there is also provided automatic addition of the effect of the total of increased temperature and increased humidity to automatically control the heating and cooling units 12 and 13 of system 11. Such system also provides decreased total electrical resistance in series with the thermistor when the sensed humidity decreases so as to provide automatic addition of the overall decreased effect of decreased temperature and decreased humidity to automatically control the units 12 and 13 of system 11.

The electrical connections of the output of the circuit of FIG. III are then reversed to provide for actuating cooling instead of heating units as below described and the relation of the sensor unit 21 output 208 to the frequency selector circuit assembly is reversed to provide the same functional relationships as herein described for use of the thermistors and humidity transducers with negative coefficient of temperature.

OPERATION OF SENSOR CIRCUIT 21 OF FIG. IV

When wired as an astable multivibrator as in FIG. IV the 555-type IC timer 200 is used to generate a square-wave output voltage at 208 of which the frequency has a one-to-one correspondence with temperature. A negative-temperature-coefficient thermistor 18 is used in the IC's charging network.

The circuit's output frequency varies in a nearly linear manner from 38 to 114 hertz as temperature changes from 37 deg F. to 115 deg F. At no point in this temperature range does the frequency count differ by more than plus or minus 1 Hz from the corresponding temperature.

The circuit of FIG. IV uses a thermistor resistor. Transistor 205 is turned on during the charging interval and off during the discharge interval. This transistor's near-zero on-resistance and very large off-resistance result in equal charge and discharge intervals that depend on only the resistance of thermistor 18, resistor 208 and rheostat 190. Operating frequency can then be given by:

f=1/[2(R18+R206+R190)C ln (2)] or, at a fixed value of C, f=K(R18+R206+R190).

Frequency variation with temperature, therefore, is similar to the voltage variation of the thermistor/resistor divider network. The divider's output voltage can be expressed as:

$$V_{out} = \left( \frac{[R\,206 + R\,190]}{[R\,206 + R\,190 + R\,18]} \right) V_{cc}$$

As the denominators of this equation and the frequency equation are the same, the frequency/temperature relationship of the circuit has the same shape and degree of linearity as that of the voltage output of a conventional thermistor/resistor divider.

With a thermistor having an R value of 5,000 ohms at 25 deg C. and a resistance ratio of 9.06:1 over the temperature range of 0 deg C. to 50 deg C., the circuit produces a linearity error of less than plus or minus 1 deg. F. over a 78 deg F. range.

The frequency count of the circuit is the same as the useful Fahrenheit temperature range (37 deg F. to 115 deg F.).

In general, the frequency will be linear with respect to temperature in the 60–100 deg. F. interval of interest, but the frequency count is different from the absolute value of the temperature being sensed in view of the above described inclusion of humidity effect.

To minimize circuit error, it is desirable to use temperature-stable polycarbonate capacitors. For this circuit, off-the-shelf capacitors having nominal plus or minus 5% tolerances are employed, with the final capacitance being a number of parallel capacitors hand-selected to give the correct frequency count at a given temperature.

The IC timer itself contributes negligible error to the frequency output over temperature. Power supply bypassing may be provided to avoid sensitivity to supply voltage variations.

OPERATION OF TEMPERATURE RANGE CONTROL UNIT 30 OF FIG. III

Generally, in the circuit of FIG. III the thermistor-resistor divider network 128, 129, 130, 17 and 170 produces a voltage that is directly proportional to effective temperature sensed at thermistor 17 and humidity sensor 19. When the effective temperature is rising (at a fixed value of humidity) the output from stage 214 at terminal 3 of the 555 timer (shown as 200) is high and the threshold input voltage at pin 6 to threshold comparator 211 is determined by the voltage divider set up by resistances 17, 170, and the resistances connected across input wires 151 and 152 from the resistance bank assembly 28, such as the variable overall resistances 128 and 129 of the resistor bank assembly unit 91. Such input voltage increases as resistances across 17 and 170 decreases. When the sum of the resistance of the thermistor 17 and the humidity rheostat 170 portion connected to circuit 30 equals the resistance at the "hot" setpoint temperature (RTH) the divider relationship establishes a voltage of $\frac{2}{3}$ Vcc at the threshold input (pin 6). After the input to the internal comparator 211 reaches this ($\frac{2}{3}$ Vcc) level, the discharge transistor 215 is switched on, effectively placing resistance 130 in parallel with resistor bank resistances as 128 and 129.

As the resistance and/or humidity drops the thermistor and/or humidity resistance increases so that the voltage is divided between (17 and 170) and (130 in parallel with 128 and 129). When the thermistor resistance and the resistance of the humidity rheostat portion in the circuit equals the resistance at the "cold" set point temperature (RTC), the divider produces a voltage of $\frac{1}{3}$ input voltage (Vcc) at pin 2.

More particularly, the timer's internal resistive divider 216, 217 and 218 establishes reference voltages at ($\frac{1}{3}$) Vcc and ($\frac{2}{3}$) Vcc for each of the timer's comparators 212 and 211 respectively. When an external voltage applied to the threshold input pin (6) exceeds ($\frac{2}{3}$) Vcc, an output is generated by the threshold comparator 211 that toggles the flip-flop. This turns on the discharge transistor 215 and results in a low output signal from the timer's driver amplifier output stage 214.

A discriminator circuit 301 distinguishes between high and low outputs of the output stage of unit 30 and actuates the heater unit relay 14 and heater unit 12 when heating is needed and when heating control switch 40 is actuated or actuates the cooling unit relay 15 and the cooling unit 13 when cooling is needed and heating control switch 50 is actuated; otherwise the heating and cooling units are not actuated.

The turn-on of the timer's discharge transistor 215 lowers the voltage at the threshold input to less than ($\frac{2}{3}$) Vcc (at 219). If the trigger input (at 2), to comparator 212 then drops below ($\frac{1}{3}$) Vcc, the trigger comparator 212 generates a pulse that retoggles the flip-flop 213, drives the discharge transistor 215 off, and causes the output stage 214 to return to its high output level.

This circuit action maintains an environment as 16 within a bounded temperature range. A voltage that is directly proportional to effective temperature i.e. the sum of relative humidity and temperature, will rise at pin 6 along with effective temperature until threshold voltage ($\frac{2}{3}$) Vcc is reached. The output stage 214 will then change state so that a cooling unit as 13 can be turned on or a heater unit as 12 can be turned off. Effective temperature will then drop until ($\frac{1}{3}$) Vcc exists at the trigger input pin 2 causing the output stage 214 to return to its first state with the cooler off and the heater on.

For the circuit in FIG. III, the thermistor/resistor divider networks connected to pins 6 and 7 produce the voltage that is directly proportional to effective temperature. When effective temperature is rising (high output state, discharge transistor 215 off) the threshold input voltage at pin 6 is determined by the division between the combination of (R17+R170+R128) and R129—where R17 is the electrical resistance of the thermistor 17 and R170 is the connected portion, as 171 of the humidity rheostat 170 and R128 is the electrical resistance of the portion of the resistor unit of assembly 28 connected to control unit input wires 151 and 152 and R129 is the electrical resistance of the portion of the resistor unit of assembly 28 connected to control unit input wires 152 and 153—and such input voltage increases as the value of (R17+R170) decreases.

When (R17+R170) is equal to the thermistor resistance at the hot setpoint temperature, RTH, the divider relationship needed to establish [($\frac{2}{3}$) Vcc] at the threshold input is:

$$[(Rth+R128)/(Rth+R128+R129)] = \tfrac{2}{3}$$

After an input to the threshold comparator 211 reaches this level, the discharge transistor 215 is switched on, effectively placing R130 (the electrical resistance shown as 130 in FIG. III) in parallel with the combination (R128+R129).

As the effective temperature drops (R17+R170) increase in value, and the division is between (R17+R170) and [R130 in parallel with (R128 and R129)]. p When (R17+R170) is equal to the resistance at the cold setpoint temperature, RTC, the divider must produce [($\frac{1}{3}$) Vcc] at the trigger input. The divider relationship becomes: A/B×$\frac{1}{2}$ where A=[R130 in parallel with the series combination of (R128+R129(] and B=[RTC in series with the parallel combination of ((R130) and (the series combination of R128 and R129))]. Otherwise expressed as

[R130 11 (R128+R129)/RTC+(R130 11 (R128+R129))]=$\frac{1}{2}$

Therefore, the impedance level of the thermistor and humidistat/resistor dividers is effectively changed depending on whether the thermostat and humidistat (or humidity transducer) be in the rising temperature portion of their operating cycle or the cooling portion. This is necessary since a thermistor's resistance varies quasi-exponentially with temperature and may exhibit a two- or three-fold change over a total temperature range; that is, the thermistor's cold setpoint resistance, RTC, may be several times larger than its hot setpoint resistance, RTH over the entire range of 65 to 95 deg F.

Where a standard thermistor is used and its resistance as a function of temperature is known, as is usual, straightforward design approach applies. Where the setpoint resistance ratio, RTC/RTH, is less than 2, as is usual over a 1 deg F. range, then R128=0 and R129 is 2RTH, so that:

R130=2RTHRTC/(2RTH-RTC)

(For this analysis, the timer's trigger and threshold inputs do not load the dividers.) Thermistor power dissipation is kept as low as possible to maintain the accuracy of the thermostat's setpoints. By operating the timer from the lowest possible supply voltage-e.g. 5 volts-thermistor self-heating is minimized as well as self heating of the humidity transducer or humidistat 19.

To prevent noise signals from causing premature state changes, the timer's trigger and threshold inputs are by-passed with capacitors 220 and 221 respectively (of 0.01 microfarad capacity) when divider impedance levels are high, the environment is noisy, or long leads are used to connect the thermistor to the circuit.

OPERATION OF TIMING CIRCUIT OF FIG. X

FIG. X is a circuit diagram of timer 111; it operates on a 24 volt power supply and provides a 15 minute or 900 second time delay between closing of the switch 241 and firing of the SCR 240. Such firing of the SCR 240 actuates the coil 112 of the stepping unit 146 of assembly 24.

The circuit of timer 111 comprises unijunction transistor oscillator to furnish the negative pulse to the base of UJT 238 of the unijunction transistor timer. The time constant is T, and where R233 is resistance of 233 in ohms and C237 is capacitance of capacitor 237 in microfarads T=R233 ×C237=900 seconds.

Unijunction 230 generates a quasi-sawtooth waveform at its emitter; the time period of this waveform is approximately 10 seconds. Capacitor 235 couples the negative-going portion of this waveform to the base 242 of unijunction 238. The amplitude of the negative pulse at base 242 is on the order of 1 volt. (Routine test with the value of capacitor 235 will yield the most desirable value.) If the pulse is too large to amplitude, unijunction 238 will fire too early; if the pulse is too small, firing may be erratic. The unijunction 230 sends a pulse to unijunction 238 once every 10 seconds. This structure provides a 15 minute timer. Exemplary electrical component values of circuit 111 are set out in Table I. Values of the circuit elements of FIG. V are set out in Table II.

TABLE I

| No. | Value |
| --- | --- |
| 230 | transistor 2N1671B |
| 231 | 20 ohm resistor |
| 232 | 1 meg ohms |
| 233 | 15 meg ohms |
| 234 | 220 vhm |
| 235 | .001 microfarad capacitor |
| 236 | 10 microfarad capacitor |
| 237 | 60 microfarad capacitor |
| 238 | transistor 2N1671B |
| 239 | 20 ohm |
| 240 | SCR |
| 241 | switch (closed by actuation of 100) input = 24 volts |

TABLE II

| Data on Circuit of FIG. V | |
| --- | --- |
| Ref No. | Description |
| 216 | 5K ohms |
| 217 | 5K ohms |
| 218 | 5K ohms |
| 311 | 4.7K ohms |
| 312 | 830 ohms |
| 313 | 4.7K ohms |
| 314 | 1K ohm |
| 315 | 6.8K |
| 316 | 3.9K |
| 317 | 7K ohms |
| 318 | 10K ohms |
| 319 | 4.7K ohms |
| 320 | 220 ohms |
| 321 | 100K ohms |
| 322 | 4.7K ohms |
| Pin 1 | ground |
| 2 | trigger |
| 3 | output |
| 4 | reset |
| 5 | control voltage |
| 6 | threshold |
| 7 | discharge |
| 8 | Vcc input voltage |

Source: Service Signetics Corporation, Sunnyvale, CA as SE 555/NE555

Electrical characteristics are set out at pages 1–6, Table 1-2, of "The 555 Timer Applications Sourcebook, With Experiments", Howard M. Berlin 1976, Capital City Press, Montpelier, VT 05602.

The system 707 shown in FIG. XVIII comprises the thermal comfort dynamics controller, apparatus 700 located in an inhabited space 16 which is used to control systems for heating unit 12, ventilating fan 511 and air conditioning unit 13 common to commercal and residential establishments. The control unit 700 although very different than any of the traditional room thermostats, serves as a direct replacement therefor and provides superior thermal comfort control.

The control apparatus 700 comprises a single printed circuit board 715 packaged within a first precisely molded plastic front housing or casing 702 and a back plate assembly 703 and operatively attached to both; cover assemblies 702 and 708 and board 715 together form a front plate control unit 705.

An operative temperature sensor touchplate 463 is exposed on the outer face 717 on the apparatus 700 along with an indicator LED 638 with window 566. The control dials of adjustable set point potentiometers 416, 417, 418, 524 and 525 are exposed at the rear cover 708 of the assembly 705. The assembly 705 is secured to and supported by the wall of the conditioned space as 16 by means of a back plate assembly 703. Assembly 703 is constructed of and supported by a precise plastic molding cover 704, and includes a terminal strip 706 for connection of field control wiring to the apparatus 700, a plug assembly 716 for electronic connection of the back plate assembly 703 to the circuit board 715, and fuse protection 564 for the assembly 700 from the power source 20.

The rear plate 734 of the back support assembly 703 is a rigid plastic plate and has firmly attached thereto rigid projecting female receptacles 725, 726, 727 & 728 with smooth interior surfaces. The front plate 701 of the front control assembly casing 702 has projecting therefrom and firmly attached thereto rigid cylindrical pedestal portions 721, 722, 723 and 724 with smooth exterior surfaces; these portions slidely engage with the interior surfaces of receptacles 725, 726, 728 and 727 respectively on the back support assembly 703. Each such male pedestal as 721 has a broader or larger diameter cylindrical base or support element as 720 the front end of which is formed into a small diameter connector or nipple 752 which firmly fits into a receptacle 751 therefor which is fixed to the front assembly front plate 701. The nipple 752 fits into a hole 760 therefor in circuit board plate 715. The board 715 is thereby held between the shoulders formed by receptacle 751 and pedestal base 721. Each of the other pedestals 722, 723 and 724 has a similar structure and relation to a hole therefor in front assembly circuit board 715. The board 715 is thereby held between the shoulders formed by receptacle 751 and pedestal base 721. The cover plate 708 is firmly attached to each of the pedestals 721-724 immediately rearward of the base thereof as shown in FIG. XX for pedestal 721. Thereby the circuit board 715 and rear cover plate 708 of front control assembly 705 are attached firmly and permanently together yet spaced apart as shown in FIG. XX. A thermally and electrically insulating plate 733 is located between circuit board 715 and the rear of the front plate 701. Plate 733 is rigid to prevent motion of the plate 463 relative to the board 715 and prevents any electrical contact there between.

A back plate printed circuit board 714 is firmly attached to back plate 734 and supports a rigid insulating terminal strip 706 and a rigid plug assembly 716. All of the several like terminals as 432 in strip 706 are each separately electrically connected via separate electrical conductors on the printed circuit board 714 to one of the plugs or receptacles as 635 of plug assembly 716. The rear plate or panel 734 of assembly 703 has a hole 735 therein through which each conductor, as 749, passes and is inserted into a slot below a screw as 739 which secures each such conductor to a terminal as 432 on terminal strip 706, as in FIG. XXIII.

A hole 736 in the rear plate 708 of the front assembly 705 provides for passage of each one of several stiff electrically conductive pins as 737 to extend from their rigid connection to the circuit board 715 into one of the separate receptacles as 635 in the plug assembly 716. Such pins form firm electrical connections between assembly 716 and electrical assembly 400 but are removable from assembly 716 as needed to make settings on the dials of the removable front assembly 705.

L-shaped lugs or ears 731 and 732 are attached to the rear cover plate 704 and engage with matching, upwardly extending L-plate lugs 730 and 729 respectively on the rear plate 734 for firm yet readily releasable support of front control assembly 705 on back support assembly 703. The lugs 731 and 732 are resilient and may be moved upward for ready removal of the front control assembly unit 705 from the rear support assembly 703.

The apparatus 700 operates the relays of the power units of the heating, ventilating and air conditioning systems as 12, 511 and 13 in such a fashion as to produce a higher probability of acceptable thermal comfort to the occupants as 60 of the conditioned space 16 than is possible with traditional wall mounted thermostats while following specific programs which minimize utility power consumption necessary to maintain the conditioned space at these acceptable comfort conditions.

The control procedures of apparatus 700 are based upon research in thermal comfort as summarized in the Comfort Equations of ASHRAE Standard 55-1981. The procedures of apparatus account for the six parameters as outlined in the ASHRAE Comfort Equations, specifically, dry bulb temperature (tdb), mean radiant temperature (MRT), air velocity (V), relative humidity (rh), clothing factor (clo), and metabolic rate (M). In addition to these six parameters, the procedures incorporate an adaptive response to the six variables over time (t) to create a dynamic operating system. The inclusion of time as an element in the procedures makes possible a control technique which maintains the conditioned space within an operator specified Operative Temperature (To) range with minimal running time of heating, ventilating and air conditioning system operation and, hence, minimal utility cost.

The controlled variable in each space as 16, known more accurately as pseudo-operative temperature (To), is measured directly by the apparatus 700. To is a function of the ambient dry bulb temperature (tdb), the ambient mean radiant temperature (MRT), and the air velocity (V) in space 16. This is accomplished with a temperature sensitive electronic sensor device 406 affixed to a thermal mass 463 exposed directly to the air currents and radiant heat of the conditioned space 16. The mass to surface area ratio of the temperature sensor is critical for providing proper compensation of the convective heat exchange coefficient (hc) due to air velocity in the conditioned space. The material chosen for the surface of the thermal mass, gold, absorbs radiant energy at frequencies typical for such conditioned spaces at rates similar to the absorption rate of the human body.

Two parameters in the Comfort Equations, clothing factor (clo) and metabolic rate (M), are treated as constant values for presetting neutral/comfort set points with temperature ramps for subsequent variations by the operation of apparatus 700 and system 707. The actual set points are dynamic and the beginning preset comfort set point values selected will generally correspond to lightly dressed adults performing sedentary work. Relative humidity (rh) is neither monitored directly, nor treated as a constant in the apparatus 700, but is instead indirectly incorporated in the dehumidifying-/Effective Temperature (ET) shift and the rates of pseudo-operative temperature change allowed in the typical cooling operation.

There are adjustable rheostats and associated electrical circuiting for setting each of two Operator Adjustable Comfort Set Points (Ts), rheostat 417 for Comfort Set Point—Heat (TSH) and rheostat 416 for Comfort Set Point—Cool (TSC), two Operator Adjustable Drift Limits, rheostat 418 for Drift Limit—Heat (TLH) and 524 Drift Limit—Cool (TLC), and rheostat 525 for Operator Adjustable Hold Time (HT).

As shown in FIG. XLII each rheostat as 524 has a dial as 740 with a pointer or indicator 741 and slot 742. The same structure is provided for the rheostats 416, 417, 418 and 525. Adjacent to each such indicator as 741 is a set of the numbers indicating the temperatures as 75, 80, 85, 90 and 95 for dial 740 and numbers 55, 60, 65, 70 and 75 for dial 418 and numbers 65, 70, 75, 80 and 85 for dial 417 and numbers 65, 70, 75, 80, and 85 for dial 416. These indicate the temperatures, respectively, for the set points for heating on dial 417 and cooling on dial 416, for drift limit during heating on dial 418, and for the drift limit on cooling on dial 524. Also the hold time rheostat 525 has a dial as provided with an indicator for the operation of rheostat 525 to indicate the number of hours which may be set by the operator e.g. 0.5, 2.0, 3.5, 5.0, 6.5 and 8 hours. A setting tool 756 is held in brackets 754 and 755 and has blades 757 and 759. The blades 757 and 759 fit into the slots at 742 on each of the dials 416, 417, 418, 524 and 525 to provide for convenient setting of such dials by locating the indicator on such dial adjacent to the temperature value desired therefor and shown on the calibrated scale provided on the back of the plate 708 and exposed when assembly 705 is removed from assembly 703. The blade 757 and 759 are made sufficiently brittle so that they will break when the rheostat is 524 is attempted to be turned past its maximum clockwise or past its maximum counter clockwise position and so protects such rheostat and all the other rheostat dial faces which are exposed on face 708 of unit 705 from mechanical damage by any attempt to turn such dials past their intended maximum and minimum position.

Table IV illustrates the various modes of operations of the apparatus 700 as determined by the operator touching the plate 463 in the sequence set out in that Table are below described.

The Dynamic Set Points (To) coincide with the Operator Adjustable Comfort Set Points (Ts) at the beginning of an Operating Mode 0 or 1. Over time, the value of the Dynamic Set Points (To) will exist at various settings along a time-temperature ramp between the comfort set points (Ts) and the drift limits (TL). The ramp movement of the Dynamic Set Points (To) from Comfort Set Point values (Ts) to the drift limit values (TL) is in small incremental steps (0.17 deg F., 0.09 deg C.) increments each ten minutes so as to closely approach a smooth uniform movement unnoticeable to occupants. The set of programs includes a low limit set point stop (45 F.) and a high limit set point stop (95 F.) for interior space protection, and these limits come into action if the unit has been turned off (Mode 4) and wide temperature variations occur.

The procedure provided by apparatus 700 includes an automatic measure of the pseudo-operative control point temperatures, and then a comparison of this value with the values of two specific (dynamic) set points. The specific values of the Dynamic Set Points is a function of both time and previous operator input history by operation on plate 463. The result of these comparisons decides the ensuing action taken by the apparatus 700. Detection by sensor 406 of a pseudo-operative control point temperature above or below the dead band bounded by the dynamic set points initially, in mode 0 or 1, set at rheostats 416 and 417 and plate 463 will initiate a command for either cooling or heating to maintain the conditioned space 16 within the limits defined by the positions of the two dynamic set points.

Hold Time is an operator controlled value at rheostat 525 which is initially set by the operator at rheostat 525 to provide a period for the occupant's body to become accustomed to the heat exchange rates with the controlled environment and for the heat exchange rates of space enclosure and contents to stabilize. The Hold Time function begins timing either when the pseudo-operative temperature achieves a value within the range defined by the two comfort set points or when the operator initiates a Mode 2 or Mode 3 operation. The Hold Time function becomes engaged whenever the control point reaches a value equal to one of the two dynamic set points. The set point ramp functions commence operation any time the Hold Time function expires or is operator terminated. The ramp functions by increasing and decreasing the dynamic set points for cooling and heating, respectively, over time. During heating mode the Control Point is smoothly and continuously decreased at a rate of one degree of F. per hour from the initial value each hour when the ramp function is operating. During cooling mode the Control Point—is smoothly and continuously increased from the initial value at a rate of one degree F. per hour when the apparatus is in Mode 0, 1, or 6 while the ramp function is operating and, during Mode 2 is increased at rates of 0.25 degree F. per hour when the air conditioner compressor is not running and of 1.0 degree F. per hour when the compressor is in operation as shown in FIG. XXXIX. No drift may occur while heating and cooling are inactive as in FIG. XXXVIII.

The components of assembly 400 compare the pseudo-operative temperature control point value to the Dynamic Set Point values and automatically initiates the appropriate action such as: energizes the cooling system, energizes the heating system, or takes no action. Energizing either of the heating or cooling systems also sets a 24-hour inhibition on the other system and regulates automatic changeovers between heating and cooling to a maximum of one per day unless manually requested. This avoids the wasteful situation of slightly heating followed by cooling during mild weather conditions.

The controller assembly 400 also incorporates a set point control differential procedure. The Set Point Differential procedure provided for generally varies the temperature differential or band width between on and off commands and specifically provides for band width values ranging from one degree F. to one-half degree F. inhibited only by program safeguards for assuring that the motors for the cooling compressor stay off and on for minimum periods to prevent otherwise harmful short-time-cycling of the HVAC system when such system has capacity for quick recovery to set point or the system load is very light. The temperature set point differential procedure is illustrated in FIGS. XL and XLI; as there shown the band is progressively narrowed from an initial value of 1.0 F. to a final value of 0.5 F. as the length of time between compressor off commands grows, allowing accurate and close range temperature control under high load conditions without creating short period cycling conditions under light load situations. Additional short cycle protection is included in the program in the form of a 5-minute minimum off-time for the compressor when it is automatically stopped by the apparatus 700 and a 7-minute minimum on-time for the compressor when it is automatically started by the apparatus 700.

In FIGS. XXXVII to XLI time is shown along the horizontal axis from left to right and temperature is shown along the vertical axis FIG. XXXVII shows a usual drift situation where a hold time starts at time point 762 and extends to time 763; the set point changes at the rate of 1 F. per hour to the time point 764 at which temperature level the drift limit is established or had been established and continues at the temperature between 764 and 765. In this operation the temperature of zone as 16 which initially is at the value of 762 and 763 for the period of time between 762 and 763 may then change as shown by the dashed line 766 and never reaches the limit 764 and 765; this is merely a drift, there has been no change forced on the environment as in 16 to reduce the temperature thereof.

In FIG. XXXVIII where there is an initial hold time from point 767A in time to point 767B in time and at the level of temperature shown as 767; the set point thereafter changes along the sloped line 768 towards the upper level 769. The maximum slope of the temperature change along line 768 is 1 F. per hour and the limit is at 769. The range or band in this case is the distance 778 between levels 777 and 769 (767A and B and 777 are the same temperature level).

In this Figure of the horizontal lines shown as 771 and 773 and 775 represent a 0 deg F. per hour ramp with the compressor in its off position while the sloped lines 772, 774 and 776 and the period between 767B and 770 represent 1 F. per hour while the compressor is on so that there are several steps within the band 778.

In FIG. XXXIX the hold time from 780 to 781 is followed by a period from 781 to 782 along the 1 deg F./hr sloped line 783 in the direction toward point 784 at the initiation of a period of temperature shown as 785. However the steps by which the temperature is changed is only by a 1 per F. hour drift ramp while the compressor is on shown at periods 781–782, 787 and 890 with intermediate periods 786, 788 and 892 of 0.25 F. per hour ramp while the compressor is off.

In FIG. XI the variation of range of band width is shown with the heating actuator on and off conditions during a heating mode. The curved line 790 has several segments the position of which vary in location between the on and off condition used to keep the temperature of zone as 16 within the band. The temperature curve changes from the level of 791 to the level shown as 804 which is a 1 F. change in this illustration; when the temperature reaches point 805 at the level 804 then the heating mode starts and the zone temperature rises as along segment 806. After a period of 12 minutes between time and temperature point 791 and 792 and after each subsequent 3 minute period as from 792 to 793 without an "off" signal the upper temperature limit of the band 804–791 is changed by apparatus 400 from time 792 to 798 i.e. for 1/6 F.; each additional 3 minutes period of time between off conditions, as from 793 to 795 provides a additional drop of 1/6 of a degree F. (as the increment 794 between level 798 and level shown as 792 and the drop 797 from the level shown as 798 to the level shown as 800.) Further fall in band limit temperature as shown at 801 down to level 802 occurs until the sensed temperature as at portion 803 is met for an "off" signal. When the temperature, as shown at 803 finally meets and upper band limit setting as 802 then the heating operation is turned off. At that point the set point immediately goes back to the level 810 (same as 791–792).

In FIG. XLI the variation of range of band width is shown with the cooling relay on and off conditions during a cooling mode. The curved line 820 has several segments the portions of which vary in location between the on and off condition used to keep the temperature of zone as 16 within the band. The temperature curve changes from the level of 821 to the level shown as 834 which is a 1 F. change in this illustration; when the temperature reaches point 835 at the level 834 then the cooling mode starts and the zone temperature falls as along segment 836. After a period of 12 minutes between time and temperature point 851 and 822 and after each subsequent 3 minute period as from 822 to 827 without an "off" signal the temperature range of the band lower limit is changed by assembly 400 from 821 to 828 i.e. for 1/6 F.; each additional 3 minutes period of time between "off" signals as from 827 to 831 provides a additional rise of 1/6 of a degree F. as the increment 827 between level 828 and level shown as 830 and the rise from the level shown as 830 to the level shown as 832. Further, a rise in band limit temperature as shown in 830 up to level 832 occurs until the sensed temperature as at portion 833 is met for an "off" signal. When the temperature, as shown at 833 meets lower band limit setting as 832 then the cooling operation is turned off. At the point the set point immediately goes back to the level 840 (same as 851–822).

For FIG. XLI following the exemplary level of the off temperature being set at level 840 for period of 12 minutes until the time 841 the temperature in the zone 16 may then rise along the portion 842 until the level intersects the temperature set for putting the cooling equipment again into operation at 843 following which the curve 820 moves down along the portion 843–848. However where the temperature does not reach the off level as 840 until after a period of 12 minutes the "off" set point again automatically reduces first to the level 845 and then to the level 846 each following 7 minute period as at time indicated at 841 following the 12 minutes between 833 and 841 and each subsequent 3 minutes as between time 841 and 844. When the temperature as shown by 848 again intersects the set point level, this time at level 846 the cooling relay is turned off and the temperature in the zone 16 returns along the line 847 and the set point temperature again lowers to the level of 849 which is the same as was the level at point 821 and 840.

For FIG. XL following the exemplary level of the off temperature being set at level 810 for period of 12 minutes until the time 811 the temperature in the zone 16 may then fall along the portion 812 until the level intersects the temperature set for putting the heating equipment again into operation at 813 following which the curve 790 moves up along the portion 813–818. However where the temperature does not reach the off level 810 until after a period of 12 minutes (between time 796 and 811) the "off" set point again automatically reduces first to the level 815 and then to the level 816 each following 3 minute period as at time indicated at 811 following the 12 minutes between 796 and 811 and each subsequent 3 minutes as between time 811 and 814. When the temperature as shown by 818 again intersects the set point level, this time at level 816 the heating goes off and the temperature in the zone returns along the zone 817 and the set point temperature again rises to the level of 819 as was the level at 810 and in period 791–792.

As shown in Table IV there are seven operator selectable operation modes numbered 0 through 6 with apparatus 700 and each mode is further modifiable by operator selected options. All operator mode selection and mode option modification are made by the operator touching the touchplate 463 (which plate 463 also serves as the thermal mass unit for the pseudo-operative temperature sensor). While the sensor touchplate 463 is being used as the operator input key, the pseudo-operative temperature readings are ignored by the microcomputer assembly 400 until the plate 463 has had time to dissipate heat gained from the operator's touch or recover from heat lost from the operator's touch. Visual indication to the operator of the mode selection is with a LED 566 located on the face 711 of the apparatus 700.

Mode 0 resets the Dynamic Heating and Cooling Set Points at values equal to the predetermined Comfort Set Point values and maintains this condition for the length of time as determined by the HVAC system's capability to bring the environmental space as 16 under control and the Hold Time Setting provided by rheostat 525. The Hold Time period commences when space 16 conditions, as determined by sensing pseudo-operative temperature thereof reach the comfort set point, and the HVAC unit then turns off, and the ramp function as in FIG. VI or VII commences at the end of the Hold Time function. The operator may, in Mode 0 only, temporarily modify the length of time the Hold Time function operates by making subsequent and immediate additional touches to the touchplate. The LED 638 then automatically provides visual feedback to the operator, by flashes seen through window 566 as in Table IV, for verifying acceptance of additional mode option touches.

Mode 1 also resets the Dynamic Set Points at values equal to the predetermined comfort set points. The operator may modify (through subsequent and additional touches within 2 seconds of setting of the mode) the length of time the ramp functions will operate after the preset Hold Time has expired, by specifying the length of the period of time at the end of which period the Dynamic Set Points shall again be reset to values equal to the Comfort Set Points.

Mode 2 sets the Dynamic Cooling Set Point to a value of one degree less than the pseudo-operative control point temperature and immediately engages the Hold Time function. By subsequent and immediate additional touches the operator may, as a mode modification, set the Dynamic Set Point at values of more than one degree below the pseudo-operative temperature in increments of 1 deg F.

Mode 3 automatically sets the Dynamic Heating Set Point to a value of one degree greater than the pseudo-operative control point temperature and immediately engages the Hold Time function. Further touches modify the mode to set the dynamic heating set point at values of more than one degree above the pseudo-operative temperature.

Mode 4 positions the Dynamic Heating and cooling set points at 45 deg F. and 95 deg F., respectively, resets any Mode 5 operation to the automatic default value, and thus effectively turns the HVAC system off in other than extremely hot or cold inside space conditions. Mode 4 also clears any inhibition regulating automatic changeovers between heating and cooling, making possible an immediate, operator-initiated changeover. Modification of this mode (4) through mode options later restores the Dynamic Set Points to values equal to the operator predetermined comfort set point values after the passage of a length of time selected from the operator's mode option touches.

Mode 5 controls operation of the HVAC system fan, with the default condition activating the fan only when either the heating or cooling systems are energized. This mode may also be modified by mode option touches to operate the fan continuously or for operator selectable proportional lengths of time out of a repeating 15-minute cycle. Mode 5 overlays all other modes and operates continuously with all other modes except Mode 4. Moreover, fan operation is continued for a fixed time period such as two minutes to capture residual cooling capacity, the system following operation of the cooling system then otherwise inhibits fan operation for a fixed time to provide time for condensed water drainage. Fan operation otherwise re-evaporates the condensate residue on the cooling coil and in the drain pan causing a rise in relative humidity.

Mode 6 terminates the Hold Time function and, immediately energizes the ramp functions and sets the values of the appropriate Dynamic Set Point one degree beyond the pseudo-operative temperature. The option mode allows restoring the Dynamic Set Points to predetermined comfort set points after a delay time selected by the operator.

The programs of apparatus 700 are accomplished with a microelectronic computer, analog to digital converters, and various supporting electronic circuits as in FIGS. XXXII–XXXV. The operator predetermined values (for Comfort Set Point—Heat, Comfort Set Point—Cool, Drift Limit—Heat, Drift Limit—Cool, and Hold time) are set on the precision potentiometers using a tool therefor, 756, stored within the casings 702 and 704. The analog values as set are read by the computer assembly 400 through analog-to-digital converters. A default value for the dynamic heating set point of one degree less than the dynamic cooling set point operates whenever there would otherwise exist a noncontrollable overlap of the two dynamic set points. The computer assembly 400 scans and performs the process repeatedly, makes control decisions, and executes these control decisions by driving the triac circuits thereof in FIG. XXXIV in a binary fashion; alternatively a proportional (as a pulse width modulated fashion) is used in accordance with a proportional-integral-derivative control program. The triac circuits control the operation of the fan, the cooling system, and the heating system by means of low voltage relays, solenoids, or actuator motors common to HVAC systems: a selectable jumper network shown in FIG. XLII allows fitting the apparatus 700 timing and anticipating programmed circuits to direct expansion cooling or hydrocarbon fired heating systems (jumpers as 746 and 747 at position 2 and 4 of FIG. XLII on exposed terminals of terminal strip 744), direct expansion cooling-electric heating systems jumpers at 1 and 4, heat pump systems diverted for heating jumpers at 1 and 3 and heat pump systems diverted for cooling (jumpers at 2 and 3).

Operations of the programs or process cycles of unit 700 in system 707 may be interrupted either by the operator or by an input at special interrupt remote terminals 497 and 503 responsive to a remote sensor. Also, unit 700 may be interrogated when connected by terminals 468 and 477, which terminals are connected to pin connections 467 and 476 in strip 716. Terminals 497 and 503 provide communication for transmitting information from apparatus 400 for remote control. Operator interruption is routinely accomplished by touching the touchplate 463. A circuit sensitive to changes in capacitance (part A of FIG. XXXIII) detects the touch and switches the programmed components of apparatus 400 to a selection which, in turn, presents each possible mode to the operator. When the desired mode is displayed (at window 566 for LED 638) the operator releases his touch at plate 463. The circuit assembly 400 also responds to any subsequent mode modifying touches as in Table IV following the touch signal first initiated within a modification period two seconds after the first touch. Presence of a signal at the special load shed interrupt terminal immediately engages a cyclical load shedding operation; the set points are not effected by the load shed function. This load shed interrupt may be employed as at 482 and 491 of FIG. XXIII in connection with power meter interface equipment or with utility load shedding equipment.

Cost comparison based on metered data of an existing 2100 square foot residence in Houston, Tex. for a 3 year test period with 2 adults and 3 small children residing in a residence occupied 24 hours per day, with natural gas at $6.00/MCF for domestic hot water and space heat using a 96,000 B.T.V. capacity Carrier model 58CH12032 heater and cooling by conventional electrical air conditioner (4 ton capacity General Electric model BTR4883) at $0.09/KWH with temperature settings before apparatus 700 was installed of 70 F. heating and 78 F. cooling provides 46 percent savings on electric cooling portion with apparatus 700 and 37 percent savings on gas heating portion with apparatus 700 installed. Similar savings resulted with an all-electric apartment based on actual test results for 1981-1983.

The overall dimensions of apparatus 700 (shown to scale and pictorially in FIGS. XIX and XXI and XXII are; overall height 5 inch, (12.6 cm); overall width (left to right) 7 inch, (17.7 cm); touch plate 463 height exposed 1⅜ inch (3.7 cm) and width exposed is 3⅜ inch (4.6 cm). The weight of the touch plate 463 is 0.91 ounces (25.9 grams).

Table III and Table IV follow.

The CMOS EPROM 462 is an off the shelf available unit and is programmed in conventional manner by a program as set out in the hereto attached print out sheets 1-34 THERMP on a standard 5¼ inch diameter floppy disc using a conventionally available Motorola® MC6800 64K RAM development system.

The secondary (24 volt) winding 643 of transformer 515 is connected in series via terminal 432 in strip or block 706 and pin 635 in plug assembly 716 as shown in FIGS. XXIII and XXI through diodes triacs and power circuit of FIG. XXXIV and via terminals 553, 552 and 433 in terminal block or strip 706 and pins 641, 640 and 639 of plug assembly 716 to heating relay 14, cooling relay 15 and fan relay 510 respectively; thereby no independent power supply to unit 400 is required as the transformer for said relays provides power to unit 400 through the same conductors as power the relays as shown in full lines in FIG. XXIII.

The touch plate 463 is made of gold plated brass, 0.20 total inch thick, with a coating of 200 microinch of nickel plate, and with 50 microinch of surface gold plate thereon. Where the system has separate transformers for the heating relay, fan relay and cooling relay, each such transformer as 516 may be connected to the unit 400 as shown for transformer 515 in FIG. XXIII, i.e. one end of the transformer secondary coil, (as 643 of 515) is connected to terminal 432 and the other end of that secondary coil of each such transformer is separately connected to the end terminal as 771, 772 and 773 (of heating, cooling and fan relay) distant from the terminals 553, 552 and 433 respectively; in such arrangement of separate transformers as 516 for each relay as 14 (and a like transformer for relay 15 and 510) lines 774, 775, 776 and 749 are deleted. In the schematic FIG. 1, ground symbol is shown to indicate the neutral conductor rather than only a ground as known in D.C. Systems.

TABLE III

| ELECTRICAL ITEMS SHOWN IN DRAWING |
|---|
| 401 Bus Multiplexer - CMOS, MSI dual 4 bit latch Motorola MC14508B |
| 402 CMOS EPROM - ultra violet erasable CMOS PROM, 32K electrically reprogrammable CMOS EPROM National Semiconductor NMC27C32 |
| 403 Microprocessor - Motorola MC146805E2 bit microprocessor contains CPU, on chip RAM 112 bytes 8 bit timer 16 bidirectional I/O lines |
| 404 3-in Nand Gate - CMOS, SS1 triple 3 input NAND gate Motorola MC14023B |
| 405 3-in Nand Gate - CMOS, SS1 triple 3 input NAND gate Motorola MC14023B |
| 406 20K PA42D1 - Thermistor |
| 407 150K - Resistor |
| 408 .1uf C323C10425V1CA - Capacitor |
| 409 10K - Resistor |
| 410 22K - Resistor |
| 411 10K - Resistor |
| 412 .1uf C323C10425V1CA - Capacitor |
| 413 10K - Resistor |
| 414 15K - Resistor |
| 415 10K 3299X-1-103 - Potentiometer |
| 416 50K 3345P1-503 - Potentiometer |
| 417 50K 3345P1-503 - Potentiometer |
| 418 50K 3345P1-503 - Potentiometer |
| 419 A/D Converter - CMOS, SS1 Motorola MC14443P 6 channel, single slope, 8 bit, analog to digital converter |
| 420 77K - Resistor |
| 421 4.7K - Resistor |
| 422 22K - Resistor |
| 423 MPS A92 - NPN Transistor |
| 424 1N 4749 - Diode 24VZ |
| 425 100uf 25V VTL100S25 - Capacitor |
| 426 4.7K - Resistor |
| 427 4.7K - Resistor |
| 428 4.7K - Resistor |
| 429 120 - Resistor |
| 430 120 - Resistor |
| 431 120 - Resistor |
| 432 7th Pos. SSB4S1OS - Terminal Block |
| 433 10th Pos. SSB4S1OS - Terminal Block |
| 434 .1uf C323C10425V1CA - Capacitor |
| 435 .1uf C323C10425V1CA - Capacitor |
| 436 .1uf C323C10425V1CA - Capacitor |
| 437 2N6070B - Triac |
| 438 1.2K - RESISTOR |
| 439 2N6070B - Triac |
| 440 2N6070B - Triac |
| 441 22K - Resistor |
| 442 4.7K - Resistor |
| 443 4.7K - Resistor |
| 444 PN2222A - NPN Transistor |
| 445 22K - Resistor |

TABLE III-continued
ELECTRICAL ITEMS SHOWN IN DRAWING

- 446 PN 2907A - PNP Transistor
- 447 2N5551 - PNP Transistor
- 448 390 - Resistor
- 449 1.2K - Resistor
- 450 1.2K Resistor
- 451 10M - Resistor
- 452 MP040 - Crystal - 4MHZ
- 453 22Pf - CK05BX220M - Capacitor
- 454 22Pf - CK05BX220M - Capacitor
- 455 Flip Flop - CMOS, SS1 dual type-D flip flop Motorola MC14013B
- 456 3-in Nand Gate - CMOS, SSI triple 3 input NAND gate Motorola MC14023B
- 457 2.2K - Resistor
- 458 1N4154 - Diode
- 459 1.8K - Resistor
- 460 Touch Plate - Solder Pad
- 461 1uf C323C10425V1CA - Optional Capacitor
- 462 1N4154 - Diode
- 463 Touch Plate
- 464 22K - Resistor
- 465 220K - Resistor
- 466 1N4002 - Diode 1A-100V
- 467 09-64-1103 - I/O Connector Male
- 468 3rd Pos. SSBS1OS - Terminal Block
- 469 MC3302 - Quad Camparator
- 470 4N33 Opto Isolator
- 471 220K - Resistor
- 472 220K - Resistor
- 473 22K - Resistor
- 474 1M - Resistor
- 475 1.2K - Resistor
- 476 09-64-1103 - I/O Connector Male
- 477 4th Pos. SSB4S1OS - Terminal Block
- 478 22K - Resistor
- 479 220K - Resistor
- 480 1N4002 - Diode 1A-100V
- 481 09-64-1103 - I/O Connector Male
- 482 1st Pos. SSB4S1OS - Terminal Block
- 483 Quad single supply comparator Motorola MC3302P
- 484 4N33 - Opto Isolator
- 485 220K - Resistor
- 486 220K - Resistor
- 487 22K - Resistor
- 488 1M - Resistor
- 489 1.2K - Resistor
- 490 09-64-1103 - I/O Connector Male
- 491 2nd Pos. SSB4S1OS - Terminal Block
- 492 22K - Resistor
- 493 10K - Resistor
- 494 4N33 - Opto Isolator
- 495 1N4749 - Diode 24VZ
- 496 09-64-1103 - I/O Connector Male
- 497 6th Pos. SSB4S1OS - Terminal Block
- 498 4.7K - Resistor
- 499 10K - Resistor
- 510 1M - Resistor
- 511 1.2K - Resistor
- 512 09-64-1103 - I/O Connector Male
- 513 5th Pos. SSB4S1OS - Terminal Block
- 521 47K - Resistor
- 522 47K - Resistor
- 523 47K - Resistor
- 524 50K 3345P1-503 - Potentiometer
- 525 50K 3345P1-503 - Potentiometer
- 526 1.0uf25V VLB1H010M - Capacitor
- 527 .01uf CK05BX103 - Capacitor
- 528 3.3K - Resistor
- 529 2.7K - Resistor
- 530 .1uf C323C10425V1CA - Capacitor
- 531 100K 3299X-1-104 - Potentiometer
- 532 100K - Resistor
- 551 N4002 - Didode 1A-100V
- 552 9th Pos. SSB4S1OS - Terminal Block
- 553 8th Pos. SSB4S1OS - Terminal Block
- 554 1N4002 - Diode 1A-100V
- 555 2N5551 - PNP Transistor
- 556 4.7K - Resistor
- 557 1N4002 - Diode 1A-100V
- 558 22K - Resistor
- 559 47K - Resistor
- 560 1.0uf25V ULB1H010M - Capacitor
- 561 .1uf C323C10425V1CA - Capacitor
- 562 Opptional - Diode
- 563 5VDC UA7905UC - Voltage Regulator
- 564 31201.5 - Fuse-3AG 1.5A
- 565 22K - Resistor
- 566 220K - Resistor
- 567 22K - Resistor
- 568 Quad Single Supply comparator Motorola MC3302P
- 569 22K - Resistor
- 570 1N4002 - Diode 1A-100V
- 571 82K - Resistor
- 572 47K - Resistor
- 573 47K - Resistor
- 574 47K - Resistor
- 575 47K - Resistor
- 576 47K - Resistor
- 577 47K - Resistor
- 578 Quad single supply comparator Motorola MC3302P
- 579 Quad single supply comparator Motorola MC3302P
- 580 Quad single supply comparator Motorola MC3302P
- 581 1N4002 - Diode 1A-100V
- 582 22K - Resistor
- 583 68K - Resistor
- 584 39K - Resistor
- 585 22K - Resistor
- 586 100K - Resistor
- 587 22K - Resistor
- 588 .001uf GE102 - Capacitor
- 589 V56ZA2 - Mov
- 591 Quad single supply comparator Motorola MC3302P
- 590 100K - Resistor
- 594 100K - Resistor
- 595 9 Quad single supply comparator Motorola MC3302P
- 593 1N4002 - Diode 1A-100V
- 596 1N4002 - Diode 1A-100V
- 592 22K - Resistor
- 600 V56ZA2 - Mov
- 599 .001uf GE102 - Capacitor
- 598 MC3302 - Quad Comparator - 9
- 597 22K - Resistor
- 609 22K - Resistor
- 601 22K - Resistor
- 602 22K - Resistor
- 603 1N4002 - Diode 1A-100V
- 604 100K - Resistor
- 605 1N4002 - Diode 1A-100V
- 606 22K - Resistor
- 607 Quad single supply comparator Motorola MC3302P
- 608 .1uf C323C10425V1CA - Capacitor
- 610 V56ZA2 - Mov
- 611 .001uf GE102 - Capacitor
- 612 22K - Resistor
- 613 Quad single supply comparator Motorola MC3302P
- 614 Quad single supply comparator Motorola MC3302P
- 615 1N4002 - Diode 1A-100V
- 616 100K - Resistor
- 617 1N4002 - Diode 1A-100V
- 618 22K - Resistor
- 619 .1uf C323C10425V1CA - Capacitor
- 627A 100K - Resistor
- 628B .1uf - Capacitor
- 629C Wire Connections for Thermistor
- 630D Transistor PN2222
- 631E 65610-172 - Jumper Strip
- 632F .1uf - Capacitor
- 633G .1uf - Capacitor
- 634H Fuse Holder
- 635I I/O Connector - Female
- 636J PN2222 - Transistor
- 637K PN2907 - Transistor

TABLE III-continued
ELECTRICAL ITEMS SHOWN IN DRAWING

638L CQV61J - L.E.D.

(In the above table u = micro)

TABLE IV
OPERATING MODES*

| PART I: MODE SELECTION | | PART II: MODE OPTIONS | |
|---|---|---|---|
| No. of Winks | Determined by duration of first touch measured by number of winks Mode Description | No. of Touches | Determined by number of additional touches Mode Description |
| 0 ** | RESET: To neutral/comfort set points. Drift begins after preset hold time. | Any Number to 127 | Drift begins after hold time which is determined by number of touches (one hour/touch). |
| 1 ** | RESET: To neutral/comfort set points. Drift begins after preset hold time. | Any Number to 127 | Reset automatically occurs after period determined by number of touches (one hour/touch). |
| 2 *** | COOLER: Lowers cooling set point 1 F. below ambient temperature and drift begins after hold time. | Any Number to 4 | Lowers cooling set point an additional 1 F. below ambient temperature for each touch. |
| 3 *** | WARMER: Raises heating set point 1 F. above ambient temperature and drift begins after hold time. | Any Number to 4 | Raises heating set point an additional 1 F. above ambient temperature for each touch. |
| 4 | OFF: Heating and cooling set points positioned at 45 F. and 95 F. respectively. | Any Number to 127 | Reset automatically occurs after period determined by number of touches (one hour/touch). |
| 5 | FAN: Puts fan in "AUTO" mode activated only by cooling and heating cycles as selected Note: Previous settings are not cancelled. | 1 / Any Number 2 to 13 | ON: Fan runs continuously. / Cycle: Fans cycles on a portion of each 15 minute period. The "ON" duration is equal is equal to one min./touch |
| 6 | DRIFT: Cooling and heating set points positioned at 1 F. above and below ambient temperature respectively causing cooling or heating to cease and drift to begin immediately. | Any Number to 127 | Reset automatically occurs after period determined by number of touches (one hour/touch). |

*Delay between mode selection and mode option touches must be less than 2 seconds or TOUCHSTAT will assume entry has been completed.
**Hold time begins after ambient temperature reaches set point.
***Hold time begins immediately. Drift rate in mode 2 changes to .25 F./HR at times cooling is cycled off.

```
1                        NAM     THERMP.S35
2                        *TOUCHSTAT CONTROL PROGRAM
3                        *DEVELOPED UNDER DIRECTION OF KIRMET S. HARMON, JR.
4                        *
5            0010      A RAM     EQU     $0010
6            1800      A ROM     EQU     $1800
7A 0010                  ORG     RAM
8                        *
9                        *REGISTERS USED BY BUGMON
10A 0010     0001      A RBZ     RMB     1       RECEIVE BUSY COUNT
11A 0011     0001      A RDR     RMB     1       RECEIVE DATA REGISTER
12A 0012     0001      A RWR     RMB     1       RECEIVE WORKING REGISTER
13A 0013     0001      A TBZ     RMB     1       TRANSMIT BUSY COUNT
14A 0014     0001      A TDR     RMB     1       TRANSMIT DATA REGISTER
15A 0015     0001      A TWR     RMB     1       TRANSMIT WORKING REGISTER
16A 0016     0001      A TEMPO   RMB     1       TEMPORARY 0
17A 0017     0002      A ADDR    RMB     2       ADDRESS REGISTER
18A 0019     0001      A DOIT    RMB     1       OPERAND
```

```
19A 001A    0002    A TADDR   RMB     2               TARGET ADDRESS
20A 001C    0001    A         RMB     1               RTS
21A 001D    0001    A T1      RMB     1               1/8-SEC TIMER
22A 001E    0001    A T2      RMB     1               15-SEC TIMER
23A 001F    0001    A T3      RMB     1               30-MIN TIMER
24                  *
25                  *FLAG REGISTERS    INIT VALUE
26                  *
27A 0020    0001    A FLAG0   RMB     1
28          0000    A T1B     EQU     0       0       1/8 SEC FLAG
29          0001    A T2B     EQU     1       0       15 SEC FLAG
30          0002    A T3B     EQU     2       0       30 MIN FLAG
31          0003    A SLO     EQU     3       0       LOAD SHED TURN OFF
32          0004    A FE      EQU     4       0       FAN ENABLE
33          0005    A HE      EQU     5       0       HEAT ENABLE
34          0006    A CE      EQU     6       0       COOL ENABLE
35          0007    A LE      EQU     7       0       LED ENABLE
36A 0021    0001    A FLAG1   RMB     1
37          0000    A TCT     EQU     0       0       CURRENT TOUCH CONDITION
38          0001    A TCP     EQU     1       0       PREVIOUS TOUCH CONDITION
39          0002    A TCC     EQU     2       0       TOUCH CONDITION CHANGE
40          0003    A TCF     EQU     3       1       TOUCH FAILURE
41          0004    A DHM     EQU     4       0       DRIFT HOLD MASK
42          0005    A DSF     EQU     5       0       DRIFT SLOW FLAG
43          0006    A TDRE    EQU     6       1       TRANSMIT DATA REGISTER EM
44          0007    A RDRF    EQU     7       0       RECEIVE DATA REGISTER FUL
45A 0022    0001    A FLAG2   RMB     1
46          0000    A RSTF    EQU     0       1       THERMO RESET FLAG
47          0001    A INITF   EQU     1       1       INITIATION FLAG
48          0002    A EXF     EQU     2       0       EXECUTE ENABLE FLAGS
49          0003    A FR      EQU     3       0       FAN OPERATION RESET
50          0004    A RDAL    EQU     4       1       READ ALL A/D INPUTS
51          0005    A RDFF    EQU     5       0       READ A/D FINISHED FLAG
52          0006    A MNF     EQU     6       0       MONITORING OUTPUT FLAG
53          0007    A MNS     EQU     7       0       MONITORING STATE
54A 0023    0001    A FLAG3   RMB     1
55          0000    A BAUD    EQU     0       0       TRANS BIT RATE
56          0007    A SLF     EQU     7       IN SLC  LOAD SHED DATA INPUT
58                  *PERIPHERAL ADDRESSES
59                  *
60                  *                       I/O  LOGIC  INIT VALUE
61          0004    A PACR    EQU     $0004   PERIPHERAL A CONTROL
62          0000    A PADR    EQU     $0000   PERIPHERAL A DATA
63          0000    A TCHT    EQU     0       0    +     0   TOUCH DRIVE
64          0000    A ADC1    EQU     0       0    +     ?   ADMUX BIT 1
65          0001    A ADC0    EQU     1       0    +     ?   ADMUX BIT 0
66          0002    A ADC2    EQU     2       0    +     ?   ADMUX BIT 2
67          0003    A ADRS    EQU     3       0    +     0   A/D RAMP STA
68          0007    A COMP    EQU     7       0    +     0   COMPRESSOR C
69          0006    A FAN     EQU     6       0    +     0   FAN CONTROL
70          0005    A HEDV    EQU     5       0    +     0   HEAT/DIVERTE
71          0004    A LED     EQU     4       0    +     0   LED CONTROL
72                  *
73          0005    A PBCR    EQU     $0005   PERIPHERAL B CONTROL
74          0001    A PBDR    EQU     $0001   PERIPHERAL B DATA
75          0000    A TCHS    EQU     0       I    +     ?   TOUCH SENSE
76          0002    A CFG2    EQU     2       I               CNTL BAND SE
77          0005    A TXB     EQU     5       O    -     0   TRANSMIT LIN
78          0007    A RXB     EQU     7       I    +     ?   RECEIVE LINE
79          0006    A SLB     EQU     6       I    -     ?   LOAD SHED LI
80          0001    A NA2     EQU     1       I               NOT ASSIGNED
81          0004    A CFG0    EQU     4       I    +     ?   CONFIGURATIO
82          0003    A CFG1    EQU     3       I    +     ?   CONFIGURATIO
83                  *
84          0008    A TMDR    EQU     $0008   TIMER DATA REGISTER
85          0009    A TMCR    EQU     $0009   TIMER CONTROL REGISTER
86          0000    A TSCL0   EQU     0       .   SCALER BIT 0
87          0001    A TSCL1   EQU     1       .   SCALER BIT 1
```

```
88      0002    A TSCL2  EQU   2      .  SCALER BIT 2
89      0003    A TSRST  EQU   3      .  SCALER RESET
90      0004    A TPIN   EQU   4      .  PIN INPUT
91      0005    A TCLK   EQU   5      .  CLOCK INPUT
92      0006    A TMSK   EQU   6      .  TIMER INTERRUPT MASK
93      0007    A TUP    EQU   7      .  TIME UP FLAG
94              *
95      0000    A OFSC   EQU   0      OFSET CHANNEL
96      0002    A CPC    EQU   2      CONTROL POINT CHANNEL
97      0003    A LSPC   EQU   3      LOW SET POINT CHANNEL
98      0004    A HSPC   EQU   4      HIGH SET POINT CHANNEL
99      0001    A LLSC   EQU   1      LOW LIMIT STATIC CHANNEL
100     0006    A HLSC   EQU   6      HIGH LIMIT STATIC CHANNEL
101     0005    A DHSC   EQU   5      DRIFT HOLD SET CHANNEL
102     0007    A REFC   EQU   7      REFERENCE CHANNEL
103             *
104             *CONFIGURATON MAP
105             *CFG1=0------CONVENTIONAL
106             *    CFG0=0-FAN ON WITH PLENUM SWITCH
107             *    CFG0=1-FAN ON WITH HEAT
108             *CFG1=1------HEAT PUMP
109             *    CFG0=0-DIVERTER ON FOR COOL
110             *    CFG0=1-DIVERTER ON FOR HEAT
112             *TWO BYTE REGISTERS
113             *
114A 0024  0002 A CP     RMB   2      CONTROL POINT
115A 0026  0002 A HLD    RMB   2      HIGH LIMIT DYNAMIC
116A 0028  0002 A HLS    RMB   2      HIGH LIMIT STATIC
117A 002A  0002 A HSP    RMB   2      HIGH SET POINT
118A 002C  0002 A LLD    RMB   2      LOW LIMIT DYNAMIC
119A 002E  0002 A LLS    RMB   2      LOW LIMIT STATIC
120A 0030  0002 A LSP    RMB   2      LOW SET POINT
121A 0032  0002 A OFS    RMB   2      OFFSET
122A 0034  0002 A REF    RMB   2      REFERENCE
123A 0036  0002 A TMV    RMB   2      A/D OUTPUT VALUE
124             *
126             *ONE BYTE REGISTERS
127             *
128A 0038  0001 A TCM    RMB   1      MODE COUNT
129A 0039  0001 A TCO    RMB   1      OPTION COUNT
130A 003A  0001 A SLC    RMB   1      LOAD SHED COUNT
131A 003B  0001 A RH     RMB   1      RESET HOLD COUNT
132A 003C  0001 A DHS    RMB   1      DRIFT HOLD SET VALUE
133A 003D  0001 A DH     RMB   1      DRIFT HOLD COUNT
134A 003E  0001 A DC     RMB   1      DRIFT RATCHET COUNTER
135A 003F  0001 A SC     RMB   1      SCREEN COUNTER FOR TEST
136A 0040  0001 A MWH    RMB   1      HEAT WAIT MASK
137A 0041  0001 A DSC    RMB   1      DRIFT SLOW COUNTER
138A 0042  0001 A MWC    RMB   1      COOL WAIT MASK
139A 0043  0001 A FO     RMB   1      FAN OVERRIDE ON TIME
140A 0044  0001 A FP     RMB   1      FAN PERIOD TIME COUNT
141A 0045  0001 A FT     RMB   1      FAN RUN TIME COUNT
142             *
143             *
144A 0046  0001 A MW     RMB   1      HEAT/COOL RESTART MASK
145A 0047  0001 A HCA    RMB   1
146A 0048  0001 A TTW    RMB   1      TOUCH WAIT MASK
147A 0049  0001 A SLR    RMB   1      LOAD SHED RANDOM BYTE
148A 004A  0001 A CYC    RMB   1
149A 004B  0001 A ROV    RMB   1      ROLLOVER REGISTER
150
151A 004C  0002 A CPA    RMB   2      ADJUSTED CONTROL POINT
152A 004E  0001 A TEMP1  RMB   1      TEMPORARY 1
153A 004F  0001 A TEMP2  RMB   1      TEMPORARY 2
154A 0050  0001 A RDT    RMB   1      READ TIME COUNT
155A 0051  0001 A RDS    RMB   1      READ STATE
156A 0052  0001 A SLT    RMB   1      LOAD SHED TIMER
157A 0053  0001 A TCS    RMB   1      TOUCH STATE
```

```
158A 0054    0001    A TFSS    RMB    1          FLASH COUNT STATE
159A 0055    0001    A TTCS    RMB    1          TOUCH COUNT STATE
160A 0056    0001    A TLC     RMB    1          LED TIME COUNT
161A 0057    0001    A MNP     RMB    1          MONITORING DATA POINTER
162A 0058    0001    A MNB     RMB    1          FIRST TRANS BYTE
163A 0059    0001    A MNE     RMB    1          LAST TRANS BYTE
164A 005A    0001    A TFRC    RMB    1          TOUCH FAILURE RECOVERY COUNT
165                          *
167                          *SYSTEM CONSTANTS
168                          *
169          0006    A DEG     EQU    6
170          0006    A CA      EQU    6          COOL ANTICIPATION=1.0 DEG
171          0003    A CAM     EQU    3
172          0028    A DCR     EQU    40         DC SET VALUE=10 MIN
173          0003    A DSP     EQU    3          (MIN SET POINT DIFF)/2=0.5 D
174          0008    A DSR     EQU    8          DRIFT SLOW RATE
175          0006    A SPS     EQU    6          IN MODE 4 (HSP-LSP)/2=1 DEG
176          003C    A FPS     EQU    60         FP SET VALUE=15 MIN
177          FFFA    A HA      EQU    -6         HEAT DEAD BAND
178          FFFD    A HAM     EQU    -3
179          0000    A HSPOH   EQU    $00        HSP FOR MODE 3=95 DEG
180          0078    A HSPOL   EQU    $78
181          00FF    A LSPOH   EQU    $FF        LSP FOR MODE 3=45 DEG
182          004C    A LSPOL   EQU    $4C
183          0030    A MWS     EQU    48         HEAT/COOL CHANGE OVER MASK =
184          0014    A MWOFF   EQU    20         HEAT/COOL RESTART DELAY = S
185          000C    A MWON    EQU    12
186          0078    A RDTS    EQU    120        RDT SET VALUE=15 SEC
187          0002    A SCC     EQU    2          COOL SCREEN TRIGGER LEVEL
188          FFFE    A SCH     EQU    -2         HEAT SCREEN TRIGGER LEVEL
189          0002    A SCO     EQU    2          HEAT-COOL TURN OFF TRIGGER L
190          0008    A SLM     EQU    8          LOAD SHED TRIGGER LEVEL
191          00A2    A TOS     EQU    162        PULSE SET VALUE=1/1200 SEC
192          0050    A TOSR    EQU    80         RESET VALUE FOR TOS AFTER RE
193          0096    A T1S     EQU    150        T1 RESET VALUE=1/8 SEC
194          0078    A T2S     EQU    120        T2 RESET VALUE=15 SEC
195          0078    A T3S     EQU    120        T3 RESET VALUE=30 MIN
196          0078    A TTCL    EQU    120        FLASH RELEASE WAIT=15 SEC
197          00F0    A TTCR    EQU    240        TOUCH RELEASE WAIT=30 SEC
198          0010    A TTCW    EQU    16         WAIT FOR TOUCH=2 SEC
199          000D    A TTWS    EQU    13         TTW WAIT=2 MIN
200          0021    A TCOL    EQU    33         MAX TCO IN MODE 2=5 DEG.
201                          *
202          0020    A SP      EQU    $20        SPACE
203          000D    A CR      EQU    $0D        CARRIAGE RETURN
204          000A    A LF      EQU    $0A        LINE FEED
205                          *
206          0006    A HCAS    EQU    6          HCA START = 1 DEG.
207          0003    A HCAM    EQU    3          HCA MIN. = .5 DEG.
208          0030    A HCAFD   EQU    48         TIME TO FIRST DEC. = 12 MIN.
209          000C    A HCAND   EQU    12         TIME TO NEXT DEC. = 3 MIN.
210                          *
212                          *[MAIN] PROGRAM ENTRY POINT
213                          *
214A 1800                    ORG     ROM
215
216                          *[INIT] INITIATION SEQUENCE
217                          *
218A 1800 9B                 INITSK  SEI
219A 1801 9C                         RSP             RESET STACK POINTER
220                          *
221A 1802 A6  20    A MONIT   LDA    #%00100000 PB DATA DIRECTION
222A 1804 B7  05    A         STA    PBCR
223A 1806 1B  01    A         BCLR   TXB,PBDR MARK TX LINE NEG. LOGIC
224A 1808 3F  10    A         CLR    RBZ       RX BUSY
225A 180A 3F  13    A         CLR    TBZ       TX BUSY
226A 180C A6  96    A         LDA    #T1S      INIT TIMING
227A 180E B7  1D    A         STA    T1
```

```
 228A 1810 A6   79        A           LDA    #T2S
 229A 1812 B7   1E        A           STA    T2
 230A 1814 A6   79        A           LDA    #T3S
 231A 1816 B7   1F        A           STA    T3
 232A 1818 CD   1E71      A           JSR    SETIM
 233A 181B 9A                          CLI           CLEAR INTERRUPT MASK
 234                                *
 235A 181C A6   FF        A PRGIT     LDA    #%11111111 PA DATA DIRECTION
 236A 181E B7   04        A           STA    PACR
 237A 1820 3F   00        A           CLR    PADR
 238A 1822 3F   3A        A           CLR    SLC           LOAD SHED COUNT
 239A 1824 3F   52        A           CLR    SLT           LOAD SHED TIMER
 240A 1826 3F   53        A           CLR    TCS
 241A 1828 3F   51        A           CLR    RDS           READ STATUS
 242A 182A 3F   11        A           CLR    RDR
 243A 182C 3F   3F        A           CLR    SC            TEST SCREEN COUNTER
 244A 182E 3F   20        A           CLR    FLAG0
 245A 1830 A6   48        A           LDA    #%01001000 TDRE,TCF ON; RDRF,TCC,TCP,
 246A 1832 B7   21        A           STA    FLAG1
 247A 1834 A6   13        A           LDA    #%00010011 RDAL,INITF,RSTF ON; MNS,MN
 248A 1836 B7   22        A           STA    FLAG2
 249A 1838 3F   23        A           CLR    FLAG3
 250A 183A B7   59        A           STA    MNE
 251A 183C 3F   5A        A           CLR    TFRC
 252A 183E A6   10        A           LDA    #16
 253A 1840 B7   48        A           STA    TTW
 254A 1842 B7   59        A           STA    MNS
 255                                *
 256                                *
 257A 1844 CD   1EFE      A HOLD      JSR    MWAIT   2 SEC START UP DELAY
 258A 1847 01 20 FA    1844           BRCLR  T1B,FLAG0,HOLD
 259A 184A 3A   48        A           DEC    TTW
 260A 184C 26   F6      1844           BNE    HOLD
 261                                *
 262                                *
 263A 184E A6   04        A           LDA    #4            "OFF"
 264                                *
 265                                *THERMO ENTRY POINT
 266                                *
 267
 268A 1850 20   0C      185E           BRA    RSTSKI
 269                                *
 270                                *[RSTSK] RESET SEQUENCE
 271                                *
 272                                *START OF OPERATION LOOP
 273                                *
 274A 1852 3D   3B        A RSTSK     TST    RH
 275A 1854 27   14      186A           BEQ    RSTSKO
 276A 1856 05 20 11    186A           BRCLR  T3B,FLAG0,RSTSKO
 277A 1859 3A   3B        A           DEC    RH
 278A 185B 26   0D      186A           BNE    RSTSKO
 279A 185D 4F                          CLRA
 280A 185E 3F   39        A RSTSKI    CLR    TCO
 281A 1860 B7   39        A RSTMC     STA    TCM
 282A 1862 10   22        A           BSET   RSTF,FLAG2
 283A 1864 16   22        A           BSET   FR,FLAG2
 284A 1866 3F   50        A           CLR    RDT
 285A 1868 18   22        A           BSET   RDAL,FLAG2
 286A 186A 01 22 18    1885 RSTSKO    BRCLR  RSTF,FLAG2,RSTSKX
 287A 186D 0B 22 15    1885           BRCLR  RDFF,FLAG2,RSTSKX
 288A 1870 03 22 09    187B           BRCLR  INITF,FLAG2,RSTSK1
 289A 1873 B6   37        A           LDA    TMV+1
 290A 1875 48                          ASLA                MULT BY 16
 291A 1876 48                          ASLA
 292A 1877 48                          ASLA
 293A 1878 48                          ASLA
 294A 1879 B7   49        A           STA    SLR           START SLR
 295A 187B 11   22        A RSTSK1    BCLR   RSTF,FLAG2
 296A 187D A6   05        A           LDA    #5            SET UP MODE 0, OPTION 0
```

```
297A 187F B7    53         A              STA    TCS
298A 1881 17    21         A              BCLR   TCF,FLAG1
299A 1883 13    22         A              BCLR   INITF,FLAG2
300A 1885 CD    1EA1       A  RSTSKX JSR  WAITIN   GO TO WAIT-TIME ROUTINE
301                            *
302                            *[SLTSK] LOAD SHEDDING OPERATION
303                            *
305A 1888 01 20 6B      18F6 SLTSK  BRCLR  T1B,FLAG0,SLTSKX
306A 188B 3D    52         A              TST    SLT     INCR SLT ON BEAT WHILE (SLB=
307A 188D 26    06      1895              BNE    SLTSK1
308A 188F 0C 01 2D      18BF              BRSET  SLB,PBDR,SLTSK5
309A 1892 0F 52 2A      18BF              BRCLR  SLF,SLT,SLTSK5
310A 1895 3C    52         A  SLTSK1 INC  SLT
311A 1897 0D 01 25      18BF              BRCLR  SLB,PBDR,SLTSK5
312A 189A 0E 52 22      18BF              BRSET  SLF,SLT,SLTSK5
313                            *
314A 189D A6    08         A              LDA    #SLM    ADJUST SLC
315A 189F B1    52         A              CMP    SLT
316A 18A1 25    04      18A7              BLO    SLTSK2
317A 18A3 3A    3A         A              DEC    SLC     DECR SLC IF SLT<=SLM
318A 18A5 20    02      18A9              BRA    SLTSK3
319A 18A7 3C    3A         A  SLTSK2 INC  SLC     INCR SLC IF SLT>SLM
320A 18A9 3F    52         A  SLTSK3 CLR  SLT
321A 18AB A6    78         A              LDA    #T2S
322A 18AD B7    1F         A              STA    T2
323A 18AF 3D    3A         A  SLTSKA TST  SLC     KEEP 0=<SLC<=7
324A 18B1 2A    02      18B5              BPL    SLTSK4
325A 18B3 3F    3A         A              CLR    SLC
326A 18B5 A6    07         A  SLTSK4 LDA  #$07
327A 18B7 B1    3A         A              CMP    SLC
328A 18B9 24    12      18CD              BHS    SLTSK6
329A 18BB B7    3A         A              STA    SLC
330A 18BD 20    0E      18CD              BRA    SLTSK6
331A 18BF 1F    52         A  SLTSK5 BCLR SLF,SLT   SET SLF=CURRENT SLB
332A 18C1 0C 01 02      18C6              BRSET  SLB,PBDR,SLTSKB
333A 18C4 1E    52         A              BSET   SLF,SLT
334A 18C6 05 20 04      18CD SLTSKB BRCLR T3B,FLAG0,SLTSK6
335A 18C9 3A    3A         A              DEC    SLC
336A 18CB 20    E2      18AF              BRA    SLTSKA
337A 18CD 03 20 26      18F6 SLTSK6 BRCLR T2B,FLAG0,SLTSKX
338                            *
339A 18D0 3A    49         A              DEC    SLR     IMPLEMENT LOAD SHED
340A 18D2 B6    3A         A              LDA    SLC     SLQ=1 WHILE (SLR&$70)/16<SLC
341A 18D4 A1    07         A              CMP    #$07    SLQ=1 IF SLC=7
342A 18D6 27    10      18E8              BEQ    SLTSK7
343A 18D8 B6    49         A              LDA    SLR
344A 18DA A4    70         A              AND    #$70
345A 18DC 44                               LSRA
346A 18DD 44                               LSRA
347A 18DE 44                               LSRA
348A 18DF 44                               LSRA
349A 18E0 A1    07         A              CMP    #$07
350A 18E2 27    0B      18EF              BEQ    SLTSK8
351A 18E4 B1    3A         A              CMP    SLC
352A 18E6 24    0E      18F6              BHS    SLTSKX
353A 18E8 06 20 0B      18F6 SLTSK7 BRSET SLQ,FLAG0,SLTSKX
354A 18EB 16    20         A              BSET   SLQ,FLAG0
355A 18ED 20    05      18F4              BRA    SLTSK9
356A 18EF 07 20 04      18F6 SLTSK8 BRCLR SLQ,FLAG0,SLTSKX
357A 18F2 17    20         A              BCLR   SLQ,FLAG0
358A 18F4 14    22         A  SLTSK9 BSET EXF,FLAG2
359                  18F6    A  SLTSKX EQU *
360
361                            *[TCTSK] TOUCH INTERPRETER TASK
362                            *
363                  18F6    A  TCTSK  EQU *
364                            *
365                            *[TDET] TEST FOR TOUCH ON
366                            *
```

```
367A 18F6 00 51 3B  1934 TDET   BRSET  0,RDS,TDETX
368A 18F9 13    21        A            BCLR   TCP,FLAG1
369A 18FB 15    21        A            BCLR   TCC,FLAG1
370A 18FD 12    00        A            BSET   ADCO,PADR PULSE FAILSAFE
371A 18FF 13    00        A            BCLR   ADCO,PADR
372A 1901 10    00        A            BSET   TCHT,PADR PULSE TCHT TWICE
373A 1903 11    00        A            BCLR   TCHT,PADR
374A 1905 10    00        A            BSET   TCHT,PADR
375A 1907 11    00        A            BCLR   TCHT,PADR
376A 1909 07 21 10  191C         BRCLR  TCF,FLAG1,TDET0
377A 190C 11    21        A            BCLR   TCT,FLAG1
378A 190E 00 01 21  1932         BRSET  TCHS,PBDR,TDET4
379A 1911 01 20 20  1924         BRCLR  T1B,FLAG0,TDETX TEST TCF RECOVERY
380A 1914 3A    5A        A            DEC    TFRC
381A 1916 26    1C  1934               BNE    TDETX
382A 1919 17    21        A            BCLR   TCF,FLAG1
383A 191A 20    18  1934               BRA    TDETX
384A 191C 01 21 04  1923 TDET0  BRCLR  TCT,FLAG1,TDET1 IF TCT SET, SET TCP
385A 191F 12    21        A            BSET   TCP,FLAG1
386A 1921 11    21        A            BCLR   TCT,FLAG1
387A 1923 01 01 09  192F TDET1  BRCLR  TCHS,PBDR,TDET3 IF TCHS SET, SET TCT
388A 1926 10    21        A            BSET   TCT,FLAG1
389A 1928 02 21 07  1932         BRSET  TCP,FLAG1,TDET4 SET TCC IF TCT CHANGE
390A 192B 14    21        A TDET2 BSET  TCC,FLAG1
391A 192D 20    03  1932               BRA    TDET4
392A 192F 02 21 F9  1928 TDET3  BRSET  TCP,FLAG1,TDET2
393A 1932 3F    5A        A TDET4 CLR   TFRC
394       1934           A TDETX EQU   *
395                           *
396A 1934 BE    52        A            LDX    TCS      JUMP TO STEP INDICATED BY TC
397A 1936 A3    05        A            CPX    #5
398A 1938 23    02  193C               BLS    TCTSK0
399A 193A AE    05        A            LDX    #5
400A 193C DE    1942      A TCTSK0 LDX  TCSTBL,X
401A 193F DC    1948      A            JMP    TCSJ0,X
402A 1942 00              A TCSTBL FCB  0       JUMP TABLE
403A 1943 09              A            FCB    TCSJ1-TCSJ0
404A 1944 79              A            FCB    TCSJ2-TCSJ0
405A 1945 BA              A            FCB    TCSJ3-TCSJ0
406A 1946 C6              A            FCB    TCSJ4-TCSJ0
407A 1947 CB              A            FCB    TCSJ5-TCSJ0
408                           *
409       1948           A TCSJ0  EQU   *        TCS=0
410                           *
411A 1948 01 21 72  19BD         BRCLR  TCT,FLAG1,TCTSKY
412A 194B 3C    52        A            INC    TCS
413A 194D 3F    54        A            CLR    TFSS
414A 194F 20    6A  19BB               BRA    TCTSKZ
415
417       1951           A TCSJ1  EQU   *        TCS=1
418                           *
419                           *[TFSH] TOUCH FLASH COUNTING
420                           *
421A 1951 B6    54        A TFSH   LDA   TFSS
422A 1953 26    15  196A               BNE    TFSH2
423A 1955 00 21 04  195C         BRSET  TCT,FLAG1,TFSH1 TFSS=0
424A 1958 3F    52        A TFSH0  CLR   TCS
425A 195A 20    5F  19BB               BRA    TFSHX
426A 195C 3C    54        A TFSH1  INC   TFSS
427A 195E A6    96        A            LDA    #T1S
428A 1960 B7    1D        A            STA    T1
429A 1962 A6    78        A            LDA    #TTCL
430A 1964 B7    1E        A            STA    T2
431A 1966 1F    20        A            BCLR   LE,FLAG0
432A 1968 20    51  19BB               BRA    TFSHX
433A 196A A1    01        A TFSH2  CMP   #1
434A 196C 26    0C  197A               BNE    TFSH3
435A 196E 01 21 E7  1958         BRCLR  TCT,FLAG1,TFSH0 TFSS=1
```

```
436A 1971 1E   20        A          BSET   LE,FLAG0
437A 1973 01   20  45    19BB       BRCLR  T1B,FLAG0,TFSHX
438A 1976 3C   54        A          INC    TFSS
439A 1978 20   41        19BB       BRA    TFSHX
440A 197A 00   21  12    198F TFSH3 BRSET  TCT,FLAG1,TFSH4  TFSS>1
441A 197D 04   21  0F    198F       BRSET  TCC,FLAG1,TFSH4
442A 1980 3F   55        A          CLR    TTCS
443A 1982 3C   53        A          INC    TCS
444A 1984 44                        LSRA
445A 1985 44                        LSRA
446A 1986 44                        LSRA
447A 1987 B7   38        A          STA    TCM
448A 1989 27   16        19A1       BEQ    TFSH5
449A 198B 3A   38        A          DEC    TCM
450A 198D 20   12        19A1       BRA    TFSH5
451A 198F 01   20  29    19BB TFSH4 BRCLR  T1B,FLAG0,TFSHX
452A 1992 3C   54        A          INC    TFSS
453A 1994 02   20  12    19A9       BRSET  T2B,FLAG0,TFSH7
454A 1997 A1   03        A          CMP    #$03
455A 1999 25   0A        19A5       BLO    TFSH6
456A 199B 03   54  07    19A5       BRCLR  1,TFSS,TFSH6
457A 199E 05   54  04    19A5       BRCLR  2,TFSS,TFSH6
458A 19A1 1F   20        A    TFSH5 BCLR   LE,FLAG0
459A 19A3 20   16        19BB       BRA    TFSHX
460A 19A5 1E   20        A    TFSH6 BSET   LE,FLAG0
461A 19A7 20   12        19BB       BRA    TFSHX
462A 19A9 16   21        A    TFSH7 BSET   TCF,FLAG1 TOUCH FAILURE
463A 19AB 11   21        A          BCLR   TCT,FLAG1
464A 19AD 15   21        A          BCLR   TCC,FLAG1
465A 19AF A6   05        A          LDA    #5        SET FOR MODE 1, OPTION 2
466A 19B1 B7   53        A          STA    TCS
467A 19B3 A6   01        A          LDA    #1
468A 19B5 B7   38        A          STA    TCM
469A 19B7 A6   02        A          LDA    #2
470A 19B9 B7   39        A          STA    TCO
471                     19BB        A TFSHX EQU  *
473A 19BB 12   50        A    TCTSKZ BSET  1,RDT     DELAY READ DURING TOUCH OPER
474A 19BD CC   1807      A    TCTSKY JMP   TCTSKX
475                        *
476                     19C0        A TCSJ2 EQU  *              TCS=2
477                        *
478                        *[TTCH] TOUCH COUNTING
479                        *
480A 19C0 B6   55        A    TTCH  LDA    TTCS
481A 19C2 26   06        19CA       BNE    TTCH0
482A 19C4 3F   39        A          CLR    TCO       TTCS=0
483A 19C6 3C   55        A          INC    TTCS
484A 19C8 20   2E        19F8       BRA    TTCH3
485A 19CA A1   01        A    TTCH0 CMP    #1
486A 19CC 26   1D        19EB       BNE    TTCH2
487A 19CE 01   21  13    19E4       BRCLR  TCT,FLAG1,TTCH1 TTCS=1
488A 19D1 04   21  10    19E4       BRSET  TCC,FLAG1,TTCH1 WAIT FOR TOUCH
489A 19D4 1E   20        A          BSET   LE,FLAG0
490A 19D6 A6   96        A          LDA    #T1S
491A 19D8 B7   1D        A          STA    T1
492A 19DA A6   F0        A          LDA    #TTCR     SET RELEASE WINDOW
493A 19DC B7   1E        A          STA    T2
494A 19DE 3C   39        A          INC    TCO       UP COUNT
495A 19E0 3C   55        A          INC    TTCS
496A 19E2 20   1C        1A00       BRA    TTCHX
497A 19E4 03   20  19    1A00 TTCH1 BRCLR  T2B,FLAG0,TTCHX
498A 19E7 3C   53        A          INC    TCS       WINDOW EXPIRED
499A 19E9 20   15        1A00       BRA    TTCHX
500A 19EB 02   20  0B    19A9 TTCH2 BRSET  T2B,FLAG0,TFSH7 TTCS=2
501A 19EE 00   21  0F    1A00       BRSET  TCT,FLAG1,TTCHX WAIT FOR RELEASE
502A 19F1 04   21  0C    1A00       BRSET  TCC,FLAG1,TTCHX
503A 19F4 3A   55        A          DEC    TTCS
504A 19F6 1F   20        A          BCLR   LE,FLAG0
```

```
505A 19F8 A6  96           A TTCH3   LDA   #T1S
506A 19FA B7  1D           A         STA   T1
507A 19FC A6  10           A         LDA   #TTCW       SET WAIT WINDOW
508A 19FE B7  1E           A         STA   T2
509A 1A00 20  B9      19BB   TTCHX   BRA   TCTSKZ
510                                 *
511                                 *
512            1A02        A TCSJ3   EQU   *           TCS=3
513                                 *
514A 1A02 3F  50           A         CLR   RDT         SET UP READ
515A 1A04 18  22           A         BSET  RDAL,FLAG2
516A 1A06 A6  0D           A         LDA   #TTWS
517A 1A08 B7  48           A         STA   TTW
518A 1A0A 3C  39           A TCSJ31  INC   TCS
519A 1A0C 20  AF      19BD           BRA   TCTSKY
520                                 *
521                                 *
522            1A0E        A TCSJ4   EQU   *           TCS=4
523                                 *
524A 1A0E 0B  22 AC   19BD           BRCLR RDFF,FLAG2,TCTSKY WAIT FOR READ COMPL
525A 1A11 20  F7      1A0A           BRA   TCSJ31
526                                 *
528            1A13        A TCSJ5   EQU   *           TCS=5
529                                 *
530                                 *[TCTIN] INSTALL TOUCH MODE AND OPTION
531                                 *
532A 1A13 BE  39           A TCTIN   LDX   TCM         IF MODE 5 CHANGE FAN ONLY
533A 1A15 A3  05           A         CPX   #5
534A 1A17 27  1E      1A37           BEQ   TCTBL
535                                 *
536A 1A19 B6  3C           A TCTIN0  LDA   DHS         SET FOR NOMINAL VALUES
537A 1A1B B7  3D           A         STA   DH
538A 1A1D A6  03           A         LDA   #HCAM
539A 1A1F B7  47           A         STA   HCA
540A 1A21 A6  78           A         LDA   #T3S
541A 1A23 B7  3E           A         STA   DC
542A 1A25 B7  1F           A         STA   T2
543A 1A27 3F  46           A         CLR   MW
544A 1A29 1B  21           A         BCLR  DSF,FLAG1
545A 1A2B 19  21           A         BCLR  DHM,FLAG1
546A 1A2D 1D  20           A         BCLR  CE,FLAG0
547A 1A2F 1B  20           A         BCLR  HE,FLAG0
548A 1A31 16  22           A         BSET  FR,FLAG2
549A 1A33 14  22           A         BSET  EXF,FLAG2
550A 1A35 3F  2B           A         CLR   RH
551                                 *
552A 1A37 A3  06           A TCTBL   CPX   #6
553A 1A39 25  02      1A3D           BLO   TCTBL0
554A 1A3B AE  06           A         LDX   #6
555A 1A3D B6  39           A TCTBL0  LDA   TCO
556A 1A3F DE  1A45         A         LDX   TCTBL1,X
557A 1A42 DC  1A4C         A         JMP   TCIN0,X
558A 1A45     00           A TCTBL1  FCB   0
559A 1A46     07           A         FCB   TCIN1-TCIN0
560A 1A47     1E           A         FCB   TCIN2-TCIN0
561A 1A48     2E           A         FCB   TCIN3-TCIN0
562A 1A49     50           A         FCB   TCIN4-TCIN0
563A 1A4A     6B           A         FCB   TCIN5-TCIN0
564A 1A4B     90           A         FCB   TCIN6-TCIN0
565                                 *
567A 1A4C 48                 TCIN0   ASLA              MODE 0.  IF TC0>0 SET DH
568A 1A4D 27  07      1A56           BEQ   TCIN11      .  FOR TCO HOURS.
569A 1A4F B7  3D           A         STA   DH
570A 1A51 20  03      1A56           BRA   TCIN11
571                                 *
572A 1A53 48                 TCIN1   ASLA              MODE 1.
573A 1A54 B7  2B           A         STA   RH          .  SET RH FOR TCO HOURS
574A 1A56 B6  2A           A TCIN11  LDA   HSP
```

```
575A 1A58 B7   26    A              STA    HLD
576A 1A5A B6   2B    A              LDA    HSP+1
577A 1A5C B7   27    A              STA    HLD+1
578A 1A5E B6   30    A              LDA    LSP
579A 1A60 B7   2C    A              STA    LLD
580A 1A62 B6   31    A              LDA    LSP+1
581A 1A64 B7   2D    A              STA    LLD+1
582A 1A66 18   21    A              BSET   DHM,FLAG1
583A 1A68 20   65    1ACF           BRA    TCIN50
584                        *
585A 1A6A AD   1E    1A8A TCIN2     BSR    TCINA    MODE 2.
586A 1A6C B6   4D    A              LDA    CPA+1    . SET FOR TCO DEG BELOW CP
587A 1A6E B0   39    A              SUB    TCO
588A 1A70 B7   4D    A              STA    CPA+1
589A 1A72 B6   4C    A              LDA    CPA
590A 1A74 A2   00    A              SBC    #0
591A 1A76 1A   21    A              BSET   DSF,FLAG1
592A 1A78 20   0C    1A86           BRA    TCIN30
593                        *
594A 1A7A AD   0E    1A8A TCIN3     BSR    TCINA    MODE 3.
595A 1A7C B6   4D    A              LDA    CPA+1    . SET FOR TCO DEG ABOVE CP
596A 1A7E BB   39    A              ADD    TCO
597A 1A80 B7   4D    A              STA    CPA+1
598A 1A82 B6   4C    A              LDA    CPA
599A 1A84 A9   00    A              ADC    #0
600A 1A86 B7   4C    A  TCIN30 STA   CPA
601A 1A88 20   5B    1AE5           BRA    TCIN60
602                        *
603A 1A8A 4C              TCINA     INCA
604A 1A8B 48                        ASLA
605A 1A8C B7   39    A              STA    TCO
606A 1A8E 48                        ASLA
607A 1A8F BB   39    A              ADD    TCO
608A 1A91 AB   05    A              ADD    #(DEG/2+2)
609A 1A93 A1   23    A              CMP    #TCOL+2
610A 1A95 23   02    1A99           BLS    TCINA0
611A 1A97 A6   21    A              LDA    #TCOL
612A 1A99 B7   39    A  TCINA0 STA   TCO
613A 1A9B 81                        RTS
615A 1A9C 48              TCIN4     ASLA              MODE 4. TURN OFF
616A 1A9D B7   3B    A              STA    RH
617A 1A9F 3F   3D    A              CLR    DH
618A 1AA1 3F   42    A              CLR    MWC
619A 1AA3 3F   40    A              CLR    MWH
620A 1AA5 A6   79    A              LDA    #HSPOL
621A 1AA7 B7   27    A              STA    HLD+1
622A 1AA9 A6   00    A              LDA    #HSPOH
623A 1AAB B7   26    A              STA    HLD
624A 1AAD A6   4C    A              LDA    #LSPOL
625A 1AAF B7   2D    A              STA    LLD+1
626A 1AB1 A6   FF    A              LDA    #LSPOH
627A 1AB3 B7   2C    A              STA    LLD
628A 1AB5 20   1A    1AD1           BRA    TCIN51   CLR FAN
629                        *
630A 1AB7 4A              TCIN5     DECA             MODE 5.  SET FAN OVERRIDE
631A 1AB9 2B   17    1AD1           BMI    TCIN51   . TCO=0--NORMAL--FO=61
632A 1ABA 27   19    1AD5           BEQ    TCIN52   2=<TC<=12 RUN MIN OUT OF 15
633A 1ABC A1   0D    A              CMP    #13      . TC=1--RUN CONTINUOUSLY--
634A 1ABE 24   15    1AD5           BHS    TCIN52   . TC>12--RUN CONTINUOUSLY-
635A 1AC0 4C                        INCA
636A 1AC1 48                        ASLA
637A 1AC2 48                        ASLA
638A 1AC3 B7   44    A              STA    FP
639A 1AC5 A6   3C    A              LDA    #60
640A 1AC7 B0   44    A              SUB    FP
641A 1AC9 B7   43    A              STA    FO
642A 1ACB A6   01    A              LDA    #01
643A 1ACD B7   45    A              STA    FT
```

```
644A 1ACF 20  2C      1AFD  TCIN50  BRA    TCTINX
645A 1AD1 A6  3D         A  TCIN51  LDA    #61
646A 1AD3 20  01      1AD6         BRA    TCIN53
647A 1AD5 4F             A  TCIN52  CLRA
648A 1AD6 B7  43         A  TCIN53  STA    FO
649A 1AD9 16  22         A          BSET   FR,FLAG2
650A 1ADA 20  21      1AFD         BRA    TCTINX
651                              *
653                              *
654A 1ADC 48            TCIN6    ASLA            MODE 6.  SET TO CP.
655A 1ADD B7  3B         A          STA    RH
656A 1ADF 3F  3D         A          CLR    DH      . SET DH FOR 0 HOURS.
657A 1AE1 A6  28         A          LDA    #DCR    . SET RH FOR TCO HOURS.
658A 1AE3 B7  3E         A          STA    DC
659A 1AE5 B6  4D         A  TCIN60  LDA    CPA+1   HLD=CPA+SPS
660A 1AE7 AB  06         A          ADD    #SPS
661A 1AE9 B7  27         A          STA    HLD+1
662A 1AEB B6  4C         A          LDA    CPA
663A 1AED A9  00         A          ADC    #0
664A 1AEF B7  26         A.         STA    HLD
665A 1AF1 B6  4D         A          LDA    CPA+1   LLD=CPA-SPS
666A 1AF3 A0  06         A          SUB    #SPS
667A 1AF5 B7  2D         A          STA    LLD+1
668A 1AF7 B6  4C         A          LDA    CPA
669A 1AF9 A2  00         A          SBC    #0
670A 1AFB B7  2C         A          STA    LLD
671                              *
672           1AFD       A  TCTINX  EQU    *
673                              *
674           1AFD       A  TCSJ7   EQU    *
675                              *
676A 1AFD 3F  53         A          CLR    TCS
677A 1AFF A6  96         A          LDA    #T1S    RESET TIMING
678A 1B01 B7  1D         A          STA    T1
679A 1B03 A6  78         A          LDA    #T2S
680A 1B05 B7  1E         A          STA    T2
681           1B07       A  TCTSKX  EQU    *
682                              *
684                              *[RDTSK] READ VALUES FROM A/D
685                              *
686A 1B07 3D  50         A  RDTSK   TST    RDT     TEST FOR TIME TO READ
687A 1B09 27  07      1B12         BEQ    RDTSK0
688A 1B0B 01  20 12   1B20         BRCLR  T1B,FLAG0,RDTSK1
689A 1B0E 3A  50         A          DEC    RDT
690A 1B10 20  0E      1B20         BRA    RDTSK1
691A 1B12 0D  01 0B   1B20  RDTSK0  BRCLR  SLB,PBDR,RDTSK1 WAIT UNTIL I/O NOT BU
692A 1B15 0E  3A 08   1B20         BRSET  SLF,SLC,RDTSK1
693A 1B18 3D  10         A          TST    RBZ     WAIT UNTIL I/O NOT BUSY
694A 1B1A 26  04      1B20         BNE    RDTSK1
695A 1B1C 3D  12         A          TST    TBZ
696A 1B1E 27  05      1B25         BEQ    RDTSK2
697A 1B20 3F  51         A  RDTSK1  CLR    RDS
698A 1B22 CC  1C25       A          JMP    RDTSKX
699A 1B25 3C  51         A  RDTSK2  INC    RDS
700A 1B27 00  51 03   1B2D         BRSET  0,RDS,RDTSK3
701A 1B2A CD  1C27       A          JSR    ADTM    READ A/D WHEN RDS IS EVEN
702A 1B2D BE  51         A  RDTSK3  LDX    RDS
703A 1B2F DE  1B34       A          LDX    RDTBL,X
704A 1B32 DC  1B46       A          JMP    RDJ01,X
705                              *
706           1B34       A  RDTBL   EQU    *-1     JUMP TABLE
707A 1B35     00         A          FCB    0
708A 1B36     08         A          FCB    RDJ02-RDJ01
709A 1B37     12         A          FCB    RDJ03-RDJ01
710A 1B38     16         A          FCB    RDJ04-RDJ01
711A 1B39     2D         A          FCB    RDJ05-RDJ01
712A 1B3A     31         A          FCB    RDJ06-RDJ01
713A 1B3B     4F         A          FCB    RDJ07-RDJ01
```

```
714A  1B3C   53           A          FCB    RDJ08-RDJ01
715A  1B3D   57           A          FCB    RDJ09-RDJ01
716A  1B3E   67           A          FCB    RDJ10-RDJ01
717A  1B3F   7E           A          FCB    RDJ11-RDJ01
718A  1B40   94           A          FCB    RDJ12-RDJ01
719A  1B41   A4           A          FCB    RDJ13-RDJ01
720A  1B42   A8           A          FCB    RDJ14-RDJ01
721A  1B43   B8           A          FCB    RDJ15-RDJ01
722A  1B44   C6           A          FCB    RDJ16-RDJ01
723A  1B45   CA           A          FCB    RDJ17-RDJ01
724                                *
726                                *RDTSK CONTINUED
727A  1B46   3F    32     A  RDJ01   CLR    OFS       GET OFFSET
728A  1B48   3F    33     A          CLR    OFS+1
729A  1B4A   A6    00     A          LDA    #OFSC
730A  1B4C   20    49  1B97          BRA    RDTSJ5
731                                *
732A  1B4E   B6    36     A  RDJ02   LDA    TMV       OFS=AD
733A  1B50   B7    32     A          STA    OFS
734A  1B52   B6    37     A          LDA    TMV+1
735A  1B54   B7    33     A          STA    OFS+1
736A  1B56   20    18  1B70          BRA    RDTSJX
737                                *
738A  1B58   A6    07     A  RDJ03   LDA    #REFC     GET REFERENCE
739A  1B5A   20    3B  1B97          BRA    RDTSJ5
740                                *
741A  1B5C   B6    36     A  RDJ04   LDA    TMV       REF=(AD-OFS)/2
742A  1B5E   47                      ASRA             OFS=OFS+REF
743A  1B5F   B7    34     A          STA    REF
744A  1B61   B6    37     A          LDA    TMV+1
745A  1B63   46                      RORA
746A  1B64   B7    35     A          STA    REF+1
747A  1B66   BB    33     A          ADD    OFS+1
748A  1B68   B7    33     A          STA    OFS+1
749A  1B6A   B6    34     A          LDA    REF
750A  1B6C   B9    32     A          ADC    OFS
751A  1B6E   B7    32     A          STA    OFS
752A  1B70   CC  1C25     A  RDTSJX  JMP    RDTSKX
753                                *
754A  1B73   A6    02     A  RDJ05   LDA    #CPC      GET CP
755A  1B75   20    20  1B97          BRA    RDTSJ5
756                                *
757A  1B77   3D    18     A  RDJ06   TST    TTW       CP=AD-OFS
758A  1B79   27    04  1B7F          BEQ    RDJ060    DON'T CHANGE CP IF TTW>0
759A  1B7B   3A    48     A          DEC    TTW
760A  1B7D   20    08  1B97          BRA    RDJ062
761A  1B7F   B6    36     A  RDJ060  LDA    TMV
762A  1B81   B7    24     A          STA    CP
763A  1B83   B6    37     A          LDA    TMV+1
764A  1B85   B7    25     A          STA    CP+1
765A  1B87   B6    24     A  RDJ062  LDA    CP
766A  1B89   B7    4C     A          STA    CPA
767A  1B8B   B6    25     A          LDA    CP+1
768A  1B8D   B7    4D     A          STA    CPA+1
769A  1B8F   08  22 DE  1B70 RDJ061  BRSET  RDAL,FLAG2,RDTSJX
770A  1B92   CC  1C1B     A          JMP    RDTSK6    READ REST IF RDAL=1
772                                *RDTSK CONTINUED
773                                *
774A  1B95   A6    04     A  RDJ07   LDA    #HSPC     GET HSP
775A  1B97   20    67  1C00 RDTSJ5   BRA    RDTSK5
776                                *
777A  1B99   AE    2A     A  RDJ08   LDX    #HSP      HSP=(AD-OFS)/8
778A  1B9B   20    12  1BAF          BRA    RDTSK4
779                                *
780A  1B9D   B6    2B     A  RDJ09   LDA    HSP+1     PRESET LSP=HSP-2*DSP
781A  1B9F   A0    06     A          SUB    #(DSP+DSP)
782A  1BA1   B7    31     A          STA    LSP+1
783A  1BA3   B6    2A     A          LDA    HSP
784A  1BA5   A2    00     A          SBC    #0
```

```
785A 1BA7 B7   30          A        STA   LSP
786A 1BA9 A6   03          A        LDA   #LSPC    GET LSP
787A 1BAB 20   53   1C00            BRA   RDTSK5
788
789A 1BAD AE   4E          A RDJ10  LDX   #TEMP1   LSP=LESSER OF
790A 1BAF 37   36          A RDTSK4 ASR   TMV      (AD-OFS)/2 OR (HSP-2*DSP)
791A 1BB1 36   37          A        ROR   TMV+1
792A 1BB3 37   36          A        ASR   TMV
793A 1BB5 36   37          A        ROR   TMV+1    DIVIDE BY 8 AND STORE
794A 1BB7 37   36          A        ASR   TMV
795A 1BB9 36   37          A        ROR   TMV+1
796A 1BBB B6   36          A        LDA   TMV
797A 1BBD F7               A        STA   0,X
798A 1BBE B6   37          A        LDA   TMV+1
799A 1BC0 E7   01          A        STA   1,X
800A 1BC2 20   61   1C25            BRA   RDTSKX
801
802A 1BC4 B6   4F          A RDJ11  LDA   TEMP2    TEST FOR AND KEEP FOR LSP
803A 1BC6 B0   31          A        SUB   LSP+1    . LESSER OF PRESET OR READ
804A 1BC8 B6   4E          A        LDA   TEMP1
805A 1BCA B2   30          A        SBC   LSP
806A 1BCC 2A   08   1BD6            BPL   RDJ110
807A 1BCE B6   4F          A        LDA   TEMP2
808A 1BD0 B7   31          A        STA   LSP+1
809A 1BD2 B6   4E          A        LDA   TEMP1
810A 1BD4 B7   30          A        STA   LSP
811A 1BD6 A6   01          A RDJ110 LDA   #LLSC    GET LLS
812A 1BD8 20   26   1C00            BRA   RDTSK5
814                                 *RDTSK CONTINUED
815                                 *
816A 1BDA AE   2E          A RDJ12  LDX   #LLS     LLS=(AD-OFS-REF)/8
817A 1BDC B6   37          A        LDA   TMV+1
818A 1BDE B0   35          A        SUB   REF+1    SUBT REF
819A 1BE0 B7   37          A        STA   TMV+1
820A 1BE2 B6   36          A        LDA   TMV
821A 1BE4 B2   34          A        SBC   REF
822A 1BE6 B7   36          A        STA   TMV
823A 1BE8 20   C5   1BAF            BRA   RDTSK4
824                                 *
825A 1BEA A6   06          A RDJ13  LDA   #HLSC    GET HLS
826A 1BEC 20   12   1C00            BRA   RDTSK5
827                                 *
828A 1BEE AE   2A          A RDJ14  LDX   #HLS     HLS=(AD-OFS+REF)/8
829A 1BF0 B6   37          A RDTSK7 LDA   TMV+1
830A 1BF2 BB   35          A        ADD   REF+1    ADD REF
831A 1BF4 B7   37          A        STA   TMV+1
832A 1BF6 B6   36          A        LDA   TMV
833A 1BF8 B9   34          A        ADC   REF
834A 1BFA B7   36          A        STA   TMV
835A 1BFC 20   B1   1BAF            BRA   RDTSK4
836                                 *
837A 1BFE A6   05          A RDJ15  LDA   #DHSC    GET DHS
838A 1C00 B7   16          A RDTSK5 STA   TEMPO    PUT CHANNEL NUMBER IN ADMUX
839A 1C02 B6   00          A        LDA   PADR
840A 1C04 A4   F0          A        AND   #%11110000
841A 1C06 BB   16          A        ADD   TEMPO
842A 1C08 B7   00          A        STA   PADR
843A 1C0A 20   19   1C25            BRA   RDTSKX
844
845A 1C0C AE   4E          A RDJ16  LDX   #TEMP1   DHS=((AD-OFS+REF)/64)+1
846A 1C0E 20   E0   1BF0            BRA   RDTSK7
847
848A 1C10 B6   4F          A RDJ17  LDA   TEMP1+1  DIV. BY 8 AND ADD 1
849A 1C12 2A   01   1C15            BPL   RDJ171
850A 1C14 4F                        CLRA
851A 1C15 44                 RDJ171 LSRA
852A 1C16 44                        LSRA
853A 1C17 44                        LSRA
```

```
854A  1C18  4C                          INCA
855A  1C19  B7  3C           A          STA     DHS
856                                *
857A  1C1B  A6  79           A  RDTSK6  LDA     #RDTS       RESET RDT
858A  1C1D  B7  50           A          STA     RDT
859A  1C1F  19  22           A          BCLR    RDAL,FLAG2  CLEAR RDAL
860A  1C21  3F  51           A          CLR     RDS         AND RDS
861A  1C23  1A  22           A          BSET    RDFF,FLAG2  SET FINISHED FLAG
862A  1C25  20  30        1C57 RDTSKX   BRA     OPTSK
863                                *
865                                *[ADTM] A/D TIMING TASK
866                                *
867A  1C27  A6  58           A  ADTM    LDA     #%01011000  SET UP TIMER
868A  1C29  B7  09           A          STA     TMCR        . SCALE=1, PIN&CLK, CLR TUP
869A  1C2B  B6  32           A          LDA     OFS         PRESET ROV
870A  1C2D  B7  4B           A          STA     ROV
871A  1C2F  B6  33           A          LDA     OFS+1
872A  1C31  26  02        1C35         BNE     ADTM0
873A  1C33  3A  4B           A          DEC     ROV
874A  1C35  16  00           A  ADTM0   BSET    ADRS,PADR   START A/D RAMP
875A  1C37  B7  08           A          STA     TMDR        PRESET TIMER
876A  1C39  B6  08           A  ADTM1   LDA     TMDR
877A  1C3B  0F  09  04     1C42         BRCLR   TUP,TMCR,ADTM2 DECR ROV ON TUP=1
878A  1C3E  1F  09           A          BCLR    TUP,TMCR
879A  1C40  3A  4B           A          DEC     ROV
880A  1C42  B1  09           A  ADTM2   CMP     TMDR
881A  1C44  26  F3        1C39         BNE     ADTM1       FINISHED WHEN TMDR DOESN'T C
882A  1C46  40                          NEGA                NEGATE TMDR
883A  1C47  B7  37           A          STA     TMV+1       AND COMPLEMENT ROV
884A  1C49  B6  4B           A          LDA     ROV         TO GET TMV
885A  1C4B  43                          COMA
886A  1C4C  B7  36           A          STA     TMV
887A  1C4E  A6  50           A          LDA     #TOSR       RESTART TIMER FOR PULSE
888A  1C50  B7  08           A          STA     TMDR
889A  1C52  A6  0A           A          LDA     #%00001010
890A  1C54  B7  09           A          STA     TMCR
891A  1C56  81                          RTS
892                                *
894                                *[OPTSK] OPERATION TASK
895                                *
896              1C57         A  OPTSK   EQU     *
897                                *
898                                *[LTEST] TEST FOR LED OPERATION
899                                *
900A  1C57  3D  53           A  LTEST   TST     TCS         BYPASS DURING TOUCH OPERATIO
901A  1C59  26  2B        1C86         BNE     LTESTX
902A  1C5B  01  20  29     1C86         BRCLR   T1B,FLAG0,LTESTX DO EVERY 1/8 SEC
903A  1C5E  3A  56           A          DEC     TLC         DECR FLASH COUNTER
904A  1C60  B6  38           A          LDA     TCM
905A  1C62  A1  04           A          CMP     #4          TURN OFF IF MODE 4
906A  1C64  27  1E        1C84         BEQ     LTEST0
907A  1C66  06  20  11     1C7A         BRSET   SLQ,FLAG0,LTEST1
908A  1C69  3D  3A           A          TST     SLC
909A  1C6B  26  0D        1C7A         BNE     LTEST1
910A  1C6D  06  21  0E     1C7E         BRSET   TCF,FLAG1,LTEST2
911A  1C70  A6  10           A          LDA     #16
912A  1C72  3D  3D           A          TST     DH
913A  1C74  27  0A        1C80         BEQ     LTEST3
914A  1C76  1E  20           A  LTESTZ  BSET    LE,FLAG0
915A  1C78  20  0C        1C86         BRA     LTESTX
916A  1C7A  A6  04           A  LTEST1  LDA     #04
917A  1C7C  20  02        1C80         BRA     LTEST3
918A  1C7E  A6  01           A  LTEST2  LDA     #01
919A  1C80  B4  56           A  LTEST3  AND     TLC
920A  1C82  26  F2        1C76         BNE     LTESTZ
921A  1C84  1F  20           A  LTEST0  BCLR    LE,FLAG0
922              1C86         A  LTESTX  EQU     *
```

```
923                      *
924                      *
925                      * .
926A 1C86 0E 20 04 1C8D        BRSET   LE,FLAG0,OPTSK0 TURN ON LED IF LE=1
927A 1C89 19 00    A           BCLR    LED,PADR POS LOGIC
928A 1C8B 20 02    1C8F        BRA     OPTSK1
929A 1C8D 18 00    A  OPTSK0   BSET    LED,PADR POS LOGIC
930A 1C8F 00 22 07 1C99 OPTSK1 BRSET   RSTF,FLAG2,OPTSKY IF (RSTF=1)+(TCS>0)
931A 1C92 3D 53    A           TST     TCS       THEN SKIP REST OF OPTSK
932A 1C94 26 03    1C99        BNE     OPTSKY
933A 1C96 0A 22 03 1C9C        BRSET   RDFF,FLAG2,OPTSK2
934A 1C99 CC    1E33   A OPTSKY JMP    OPTSKX
935                      *
936A 1C9C 1B 22    A  OPTSK2   BCLR    RDFF,FLAG2
937                      *
938                      *[ATEST] TEST FOR CONTROL ACTION
939                      *
940
941A 1C9E 3A 4A    A  ATEST    DEC     CYC       ADJUST HCA VALUE
942A 1CA0 26 0C    1CAE        BNE     ATESTC
943A 1CA2 A6 03    A           LDA     #HCAM
944A 1CA4 B1 47    A           CMP     HCA
945A 1CA6 27 06    1CAE        BEQ     ATESTC
946A 1CA8 3A 47    A           DEC     HCA
947A 1CAA A6 0C    A           LDA     #HCAND
948A 1CAC B7 4A    A           STA     CYC
949
950A 1CAE 3D 46    A  ATESTC   TST     MW        TEST MIN. WAIT TIME
951A 1CB0 27 04    1CB6        BEQ     ATESTA
952A 1CB2 3A 46    A           DEC     MW
953A 1CB4 20 63    1D19        BRA     ATST91
954
955A 1CB6 0B 20 1E 1CD7 ATESTA BRCLR   HE,FLAG0,ATEST1 TEST FOR TURN OFF HEA
956A 1CB9 B6 25    A           LDA     CP+1      SET CONTROL OFFSET
957A 1CBB B0 47    A           SUB     HCA
958A 1CBD B7 4D    A           STA     CPA+1
959A 1CBF B6 24    A           LDA     CP
960A 1CC1 A2 00    A           SBC     #0
961A 1CC3 B7 4C    A           STA     CPA
962A 1CC5 B6 4D    A           LDA     CPA+1     IF (CPA>=LLD) FOR SCQ CONSEC
963A 1CC7 B0 2D    A           SUB     LLD+1     THEN TURN OFF HE
964A 1CC9 B6 4C    A           LDA     CPA
965A 1CCB B2 2C    A           SBC     LLD
966A 1CCD 2B 46    1D15        BMI     ATEST9
967A 1CCF 3D 3F    A           TST     SC
968A 1CD1 26 3E    1D11        BNE     ATEST8
969A 1CD3 1B 20    A           BCLR    HE,FLAG0
970A 1CD5 20 1F    1CF6        BRA     ATEST2
971A 1CD7 0D 20 2C 1D06 ATEST1 BRCLR   CE,FLAG0,ATEST3 TEST FOR TURN OFF COO
972A 1CDA B6 47    A           LDA     HCA       SET CONTROL OFFSET
973A 1CDC BB 25    A           ADD     CP+1
974A 1CDE B7 4D    A           STA     CPA+1
975A 1CE0 B6 24    A           LDA     CP
976A 1CE2 A9 00    A           ADC     #0
977A 1CE4 B7 4C    A           STA     CPA       IF (CPA<=HLD) FOR SCQ CONSEC
978A 1CE6 B6 27    A           LDA     HLD+1     THEN TURN OFF CE
979A 1CE8 B0 4D    A           SUB     CPA+1
980A 1CEA B6 26    A           LDA     HLD
981A 1CEC B2 4C    A           SBC     CPA
982A 1CEE 2B 25    1D15        BMI     ATEST9
983A 1CF0 3D 3F    A           TST     SC
984A 1CF2 26 1D    1D11        BNE     ATEST8
985A 1CF4 1D 20    A           BCLR    CE,FLAG0
986A 1CF6 16 22    A  ATEST2   BSET    FR,FLAG2 WHEN TURNING OFF CE OR HE
987A 1CF8 19 21    A           BCLR    DHM,FLAG1
988A 1CFA A6 30    A           LDA     #HCAFD
989A 1CFC B7 4A    A           STA     CYC
990A 1CFE A6 06    A           LDA     #HCAS
```

```
991A 1D00 B7  47        A            STA   HCA
992A 1D02 A6  14        A            LDA   #MWOFF
993A 1D04 20  62      1D68           BRA   ATEST7
994                                *
996
997A 1D06 3D  42        A ATEST3 TST MWC      DON'T TURN ON HE OR CE IF MW
998A 1D08 27  11      1D19           BEQ   ATEST4
999A 1D0A 05 20 2D    1D3A           BRCLR T3B,FLAG0,ATEST4
1000A 1D0D 3A 42        A            DEC   MWC
1001A 1D0F 20 29     1D3A            BRA   ATEST6
1002                               *
1003A 1D11 3A 3F        A ATEST8 DEC SC
1004A 1D13 20 57     1D6C            BRA   ATESTX
1005A 1D15 A6 02        A ATEST9 LDA #SCO
1006A 1D17 B7 3F        A            STA   SC
1007A 1D19 20 51     1D6C ATST91 BRA  ATESTX
1008                               *
1009A 1D1B B6 25        A ATEST4 LDA  CP+1   TEST FOR TURN ON COOL
1010A 1D1D B0 27        A            SUB  HLD+1
1011A 1D1F B6 24        A            LDA  CP       IF (CP>HLD) SCC TIMES MORE T
1012A 1D21 B2 26        A            SBC  HLD      THEN TURN ON HE
1013A 1D23 2B 15     1D3A            BMI  ATEST6
1014A 1D25 04 22 06  1D2E            BRSET EXF,FLAG2,ATST41
1015A 1D28 B6 3F        A            LDA  SC
1016A 1D2A A0 02        A            SUB  #SCC
1017A 1D2C 2B 08     1D36            BMI  ATEST5
1018A 1D2E 1C 20        A ATST41 BSET CE,FLAG0
1019A 1D30 A6 30        A            LDA  #MWS
1020A 1D32 B7 40        A            STA  MWH
1021A 1D34 20 30     1D66            BRA  ATST65
1022A 1D36 3C 3F        A ATEST5 INC SC
1023A 1D38 20 32     1D6C            BRA  ATESTX
1024A 1D3A 3D 40        A ATEST6 TST MWH      TEST FOR TURN ON HEAT
1025A 1D3C 27 07     1D45            BEQ  ATST61
1026A 1D3E 05 20 0E  1D4F            BRCLR T3B,FLAG0,ATST64
1027A 1D41 3A 40        A            DEC  MWH
1028A 1D43 20 0A     1D4F            BRA  ATST64
1029A 1D45 B6 2D        A ATST61 LDA LLD+1
1030A 1D47 B0 25        A            SUB  CP+1
1031A 1D49 B6 2C        A            LDA  LLD      IF (CP<LLD) SCH TIMES MORE T
1032A 1D4B B2 24        A            SBC  CP       THEN TURN ON CE
1033A 1D4D 2A 06     1D55            BPL  ATST62
1034A 1D4F 19 21        A ATST64 BCLR DHM,FLAG1
1035A 1D51 3F 3F        A            CLR  SC
1036A 1D53 20 17     1D6C            BRA  ATESTX
1037A 1D55 04 22 06  1D5E ATST62 BRSET EXF,FLAG2,ATST63
1038A 1D58 A6 FE        A            LDA  #SCH
1039A 1D5A B0 3F        A            SUB  SC
1040A 1D5C 2B B3     1D11            BMI  ATEST8
1041A 1D5E 1A 20        A ATST63 BSET HE,FLAG0
1042A 1D60 A6 30        A            LDA  #MWS
1043A 1D62 B7 42        A            STA  MWC
1044A 1D64 1B 21        A            BCLR DSF,FLAG1
1045A 1D66 A6 0C        A ATST65 LDA #MWON
1046A 1D68 B7 46        A ATEST7 STA MW
1047A 1D6A 14 22        A            BSET EXF,FLAG2 SET EXF IF CE OR HE CHANGED
1048            1D6C    A ATESTX EQU *
1049                               *
1051                               *[FTEST] TEST FOR FAN OPERATION
1052                               *
1053A 1D6C 0C 20 09  1D78 FTEST  BRSET CE,FLAG0,FTEST0 IF (CE+(HE&(CFG0+CFG1
1054A 1D6F 0B 20 0A  1D7C        BRCLR HE,FLAG0,FTEST1 THEN SET FE
1055A 1D72 08 01 03  1D78        BRSET CFG0,PBDR,FTEST0
1056A 1D75 07 01 29  1DA1        BRCLR CFG1,PBDR,FTESTX
1057A 1D78 18 20        A FTEST0 BSET FE,FLAG0
1058A 1D7A 20 25     1DA1        BRA  FTESTX
1059A 1D7C 07 22 14  1D93 FTEST1 BRCLR FR,FLAG2,FTEST2 ELSE IF (FR=1)
1060A 1D7F 17 22        A            BCLR FR,FLAG2 THEN SET FP=FPS AND FT=F0
```

```
1061A 1D81 A6  3C        A         LDA    #FPS
1062A 1D83 B7  44        A         STA    FP
1063A 1D85 19  20        A         BCLR   FE,FLAG0 IF (F0=0)
1064A 1D87 14  22        A         BSET   EXF,FLAG2 THEN FE=1
1065A 1D89 B6  43        A         LDA    F0        ELSE FE=0
1066A 1D8B B7  45        A         STA    FT
1067A 1D8D 26  12     1DA1         BNE    FTESTX
1068A 1D8F 18  20        A         BSET   FE,FLAG0
1069A 1D91 20  0E     1DA1         BRA    FTESTX
1070A 1D93 3A  45        A FTEST2  DEC    FT        DECR FT AND FP EVERY 15 SEC
1071A 1D95 26  04     1D9B         BNE    FTEST3    IF (FT<0) THEN SET FE=1
1072A 1D97 18  20        A         BSET   FE,FLAG0 IF (FP=0) THEN RESET FP AND
1073A 1D99 14  22        A         BSET   EXF,FLAG2
1074A 1D9B 3A  44        A FTEST3  DEC    FP
1075A 1D9D 26  02     1DA1         BNE    FTESTX
1076A 1D9F 16  22        A         BSET   FR,FLAG2
1077         1DA1        A FTESTX  EQU    *
1078                               *
1080                               *[DRIFT] TEST AND EXECUTE DRIFT
1081                               *
1082A 1DA1 3D  3D        A DRIFT   TST    DH        IF (DH>0)&(DHM=0)
1083A 1DA3 27  11     1DB6         BEQ    DRIFT0    THEN DECR DH EVERY 30 MIN
1084A 1DA5 09  21 4B  1DF3         BRSET  DHM,FLAG1,DRIFTX
1085A 1DA8 3A  3E        A         DEC    DC
1086A 1DAA 26  47     1DF3         BNE    DRIFTX
1087A 1DAC A6  78        A         LDA    #T3S
1088A 1DAE B7  3E        A         STA    DC
1089A 1DB0 3A  3D        A         DEC    DH
1090A 1DB2 26  3F     1DF3         BNE    DRIFTX
1091A 1DB4 20  39     1DEF         BRA    DRIFT3
1092A 1DB6 09  21 36  1DEF DRIFT0  BRSET  DHM,FLAG1,DRIFT3 ELSE IF (DH=0)
1093A 1DB9 0B  21 0D  1DC9         BRCLR  DSF,FLAG1,DRIF01
1094A 1DBC 0C  20 0A  1DC9         BRSET  CE,FLAG0,DRIF01
1095A 1DBF 3C  41        A         INC    DSC
1096A 1DC1 B6  41        A         LDA    DSC
1097A 1DC3 A1  09        A         CMP    #DSR
1098A 1DC5 25  2C     1DF3         BLO    DRIFTX
1099A 1DC7 3F  41        A         CLR    DSC
1100A 1DC9 3A  3E        A DRIF01  DEC    DC        THEN EVERY (DCR*15 SEC)
1101A 1DCB 26  26     1DF3 DRIF02  BNE    DRIFTX    . IF (HLD<HLS) THEN INCR HL
1102A 1DCD B6  27        A         LDA    HLD+1     . IF (LLD>LLS) THEN DECR LL
1103A 1DCF B0  29        A         SUB    HLS+1
1104A 1DD1 B6  26        A         LDA    HLD
1105A 1DD3 B2  28        A         SBC    HLS
1106A 1DD5 2A  06     1DDD         BPL    DRIFT1
1107A 1DD7 3C  27        A         INC    HLD+1
1108A 1DD9 26  02     1DDD         BNE    DRIFT1
1109A 1DDB 3C  26        A         INC    HLD
1110A 1DDD B6  2F        A DRIFT1  LDA    LLS+1
1111A 1DDF B0  2D        A         SUB    LLD+1
1112A 1DE1 B6  2E        A         LDA    LLS
1113A 1DE3 B2  2C        A         SBC    LLD
1114A 1DE5 2A  08     1DEF         BPL    DRIFT3
1115A 1DE7 3D  2D        A         TST    LLD+1
1116A 1DE9 26  02     1DED         BNE    DRIFT2
1117A 1DEB 3A  2C        A         DEC    LLD
1118A 1DED 3A  2D        A DRIFT2  DEC    LLD+1
1119A 1DEF A6  23        A DRIFT3  LDA    #DCR
1120A 1DF1 B7  3E        A         STA    DC
1121         1DF3        A DRIFTX  EQU    *
1122                               *
1124                               *OPTSK CONTINUED
1125                               *
1126                               * NOTE (HE=1)&(CE=1)=0 ALWAYS
1127                               * IF (HE=1)&(CFG1=0) THEN SET HEDV ON
1128                               * IF (SLQ=0)&(CE=1)&(CFG1=0) THEN SET COMP ON
1129                               * IF (SLQ=0)&(HE=1)&(CFG1=1)&(CFG0=0) THEN SET COMP
1130                               * IF (SLQ=0)&(HE=1)&(CFG1=1)&(CFG0=1) THEN SET COMP
```

```
1131                        * IF (SLQ=0)&(CE=1)&(CFG1=1)&(CFG0=0) THEN SET COMP
1132                        * IF (SLQ=0)&(CE=1)&(CFG1=1)&(CFG0=1) THEN SET COMP
1133                        * ELSE SET COMP OFF, HEDV OFF
1134                        *
1135A 1DF2 1C   22     A          BSET    MNF,FLAG2
1136A 1DF5 05 22 3B  1E33         BRCLR   EXF,FLAG2,OPTSKX DO IF EXF=1
1137A 1DF8 06 20 29  1E24         BRSET   SLQ,FLAG0,OPTSKA
1138A 1DFB 06 01 0E  1E0C         BRSET   CFG1,PBDR,OPTSK5
1139A 1DFE 0A 20 04  1E05         BRSET   HE,FLAG0,OPTSK3
1140A 1E01 1B   00     A          BCLR    HEDV,PADR POS LOGIC
1141A 1E03 20   02   1E07         BRA     OPTSK4
1142A 1E05 1A   00     A  OPTSK3  BSET    HEDV,PADR POS LOGIC
1143A 1E07 0D 20 1C  1E26 OPTSK4  BRCLR   CE,FLAG0,OPTSKB
1144A 1E0A 20   14   1E20         BRA     OPTSK9
1145A 1E0C 0B 20 05  1E14 OPTSK5  BRCLR   HE,FLAG0,OPTSK6
1146A 1E0F 08 01 0C  1E1E         BRSET   CFG0,PBDR,OPTSK8
1147A 1E12 20   06   1E1A         BRA     OPTSK7
1148A 1E14 0D 20 0D  1E24 OPTSK6  BRCLR   CE,FLAG0,OPTSKA
1149A 1E17 09 01 04  1E1E         BRCLR   CFG0,PBDR,OPTSK8
1150A 1E1A 1B   00     A  OPTSK7  BCLR    HEDV,PADR POS LOGIC
1151A 1E1C 20   02   1E20         BRA     OPTSK9
1152A 1E1E 1A   00     A  OPTSK8  BSET    HEDV,PADR POS LOGIC
1153A 1E20 1E   00     A  OPTSK9  BSET    COMP,PADR POS LOGIC
1154A 1E22 20   04   1E28         BRA     OPTSKC
1155A 1E24 1B   00     A  OPTSKA  BCLR    HEDV,PADR POS LOGIC
1156A 1E26 1F   00     A  OPTSKB  BCLR    COMP,PADR POS LOGIC
1157A 1E28 08 20 04  1E2F OPTSKC  BRSET   FE,FLAG0,OPTSKD IF (FE=1) THEN SET FA
1158A 1E2B 1D   00     A          BCLR    FAN,PADR POS LOGIC ELSE SET FAN OFF
1159A 1E2D 20   02   1E31         BRA     OPTSKE
1160A 1E2F 1C   00     A  OPTSKD  BSET    FAN,PADR POS LOGIC
1161A 1E31 15   22     A  OPTSKE  BCLR    EXF,FLAG2
1162             1E33    A  OPTSKX EQU    *
1163                        *
1165                        *[MNTSK] THERMO MONITORING OPERATION
1166                        *
1167A 1E33 0F 21 15  1E4B MNTSK   BRCLR   RDRF,FLAG1,MNTSK0 IF INPUT='X'
1168A 1E36 1F   21     A          BCLR    RDRF,FLAG1 THEN EXIT TO BUGMON
1169A 1E38 B6   11     A          LDA     RDR
1170A 1E3A A1   58     A          CMP     #'X
1171A 1E3C 26   03   1E41         BNE     TSTR
1172A 1E3E CC   1F0A    A          JMP     BUGCTL
1173A 1E41 A1   52     A  TSTR    CMP     #'R
1174A 1E43 26   06   1E4B         BNE     MNTSK0
1175A 1E45 3F   50     A          CLR     RDT      INITIATE READ CYCLE
1176A 1E47 19   22     A          BSET    RDAL,FLAG2
1177A 1E49 20   15   1E60         BRA     MNTSK3
1178                        *
1179A 1E4B 0D 22 20  1E6E MNTSK0  BRCLR   MNF,FLAG2,MNTSKX IF (MNF=1)&(MNS=0)
1180A 1E4E 0E 22 06  1E57         BRSET   MNS,FLAG2,MNTSK1 THEN SET POINTER TO
1181A 1E51 B6   58     A          LDA     MNB        AND SET MNS=1
1182A 1E53 B7   57     A          STA     MNP
1183A 1E55 1E   22     A          BSET    MNS,FLAG2
1184A 1E57 0D 21 14  1E6E MNTSK1  BRCLR   TDRE,FLAG1,MNTSKX IF (MNF=1)&(MNS=1)
1185A 1E5A BE   57     A          LDX     MNP        THEN OUTPUT CONTENTS OF REGI
1186A 1E5C B3   59     A          CPX     MNE        . POINTED TO BY MNP
1187A 1E5E 23   06   1E66         BLS     MNTSK2     UNTIL END REGISTER IS REACHE
1188A 1E60 1D   22     A  MNTSK3  BCLR    MNF,FLAG2 THEN CLR MNF AND MNS
1189A 1E62 1F   22     A          BCLR    MNS,FLAG2
1190A 1E64 20   08   1E6E         BRA     MNTSKX
1191A 1E66 F6           A  MNTSK2 LDA     0,X
1192A 1E67 B7   14     A          STA     TDR
1193A 1E69 1D   21     A          BCLR    TDRE,FLAG1
1194A 1E6B 5C           A          INCX
1195A 1E6C BF   57     A          STX     MNP
1196             1E6E    A  MNTSKX EQU    *
1197                        *
1198A 1E6E CC   1852    A          JMP     RSTSK
1199                        *
```

```
1201                        *
1202                        *
1203A 1E71 A6  0A       A SETIM  LDA   #%00001010 TCLK,UNMASK,TSRST,/4
1204A 1E73 B7  09       A         STA   TMCR
1205A 1E75 A6  A2       A         LDA   #TOS
1206A 1E77 B7  09       A         STA   TMDR
1207A 1E79 81                     RTS
1208                        *
1209                        *
1210                        *[WATSK] INTERRUPT AND TIMING TASK
1211                        *
1212A 1E7A AD  F5    1E71 WATSK  BSR   SETIM
1213A 1E7C 11  20       A         BCLR  T1B,FLAG0 CLEAR TIMING FLAGS
1214A 1E7E 13  20       A         BCLR  T2B,FLAG0
1215A 1E80 15  20       A         BCLR  T3B,FLAG0
1216A 1E82 3A  1D       A         DEC   T1
1217A 1E84 26  1A    1EA0         BNE   WATSKX
1218A 1E86 10  20       A         BSET  T1B,FLAG0 1/8 SEC TIME UP
1219A 1E88 A6  96       A         LDA   #T1S
1220A 1E8A B7  1D       A         STA   T1
1221A 1E8C 3A  1E       A         DEC   T2
1222A 1E8E 26  10    1EA0         BNE   WATSKX
1223A 1E90 12  20       A         BSET  T2B,FLAG0 15 SEC TIME UP
1224A 1E92 A6  78       A         LDA   #T2S
1225A 1E94 B7  1E       A         STA   T2
1226A 1E96 3A  1F       A         DEC   T3
1227A 1E98 26  06    1EA0         BNE   WATSKX
1228A 1E9A 14  20       A         BSET  T3B,FLAG0 30 MIN TIME UP
1229A 1E9C A6  78       A         LDA   #T3S
1230A 1E9E B7  1F       A         STA   T3
1231A 1EA0 80              WATSKX RTI
1232                        *
1234A 1EA1 8F              WAITIN WAIT         WAIT FOR TIMER INTERRUPT
1235                        *
1236                        *[IOTSK] INPUT/OUTPUT TASK
1237                        *
1238                        *RECEIVE FUNCTION
1239                        *
1240A 1EA2 3D  10       A IOTSK  TST   RBZ
1241A 1EA4 27  1D    1EC3         BEQ   IOTSK2
1242A 1EA6 3C  10       A         INC   RBZ
1243A 1EA8 B6  10       A         LDA   RBZ
1244A 1EAA A5  03       A         BIT   #$03
1245A 1EAC 26  1C    1ECA         BNE   IOTSK3
1246A 1EAE A1  2C       A         CMP   #$2C
1247A 1EB0 24  09    1EBB         BHS   IOTSK1
1248A 1EB2 98                     CLC
1249A 1EB3 0F  01  01 1EB7        BRCLR RXB,PBDR,IOTSK0 NEG LOGIC
1250A 1EB6 99                     SEC
1251A 1EB7 36  12       A IOTSK0 ROR   RWR
1252A 1EB9 20  0F    1ECA         BRA   IOTSK3
1253A 1EBB 3F  10       A IOTSK1 CLR   RBZ
1254A 1EBD 1E  21       A         BSET  RDRF,FLAG1
1255A 1EBF B6  12       A         LDA   RWR
1256A 1EC1 B7  11       A         STA   RDR
1257A 1EC3 0E  01  04 1ECA IOTSK2 BRSET RXB,PBDR,IOTSK3 NEG LOGIC
1258A 1EC6 A6  06       A         LDA   #$06
1259A 1EC8 B7  10       A         STA   RBZ
1260                        *
1261                        *TRANSMIT FUNCTION
1262                        *
1263A 1ECA 3D  13       A IOTSK3 TST   TBZ
1264A 1ECC 27  20    1EEE         BEQ   IOTSK6
1265A 1ECE 3C  13       A IOTSK8 INC   TBZ
1266A 1ED0 B6  13       A         LDA   TBZ
1267A 1ED2 A5  03       A         BIT   #$03
1268A 1ED4 27  05    1EDB         BEQ   IOTSK7
1269A 1ED6 00  23  F5 1ECE        BRSET BAUD,FLAG2,IOTSK8
```

```
1270A 1ED9 20   22          BRA    IOTSKX
1271A 1EDB A1   30    A IOTSK7 CMP  #$30
1272A 1EDD 24   0D  1EEC     BHS    IOTSK5
1273A 1EDF 99               SEC
1274A 1EE0 36   15    A      ROR    TWR
1275A 1EE2 25   04  1EE8     BCS    IOTSK4
1276A 1EE4 1A   01    A      BSET   TXB,PBDR NEG LOGIC
1277A 1EE6 20   15  1EFD     BRA    IOTSKX
1278A 1EE8 1B   01    A IOTSK4 BCLR TXB,PBDR NEG LOGIC
1279A 1EEA 20   11  1EFD     BRA    IOTSKX
1280A 1EEC 3F   13    A IOTSK5 CLR  TBZ
1281A 1EEE 0C 21 0C 1EFD IOTSK6 BRSET TDRE,FLAG1,IOTSKX
1282A 1EF1 A6   04    A      LDA    #$04
1283A 1EF3 B7   13    A      STA    TBZ
1284A 1EF5 1A   01    A      BSET   TXB,PBDR NEG LOGIC
1285A 1EF7 B6   14    A      LDA    TDR
1286A 1EF9 B7   15    A      STA    TWR
1287A 1EFB 1C   21    A      BSET   TDRE,FLAG1
1288A 1EFD 81         IOTSKX RTS
1289                    *
1291                    *
1292                    * A MINIMUM MONITOR FOR MOTOROLA MC146805 CMOS MICR
1293                    *
1294A 1EFE AD   A1  1EA1 MWAIT  BSR  WAITIN
1295A 1F00 12   00    A      BSET   ADC0,PADR PULSE FAILSAFE
1296A 1F02 13   00    A      BCLR   ADC0,PADR
1297A 1F04 03 20 F6 1EFD     BRCLR  T2B,FLAG0,IOTSKX
1298A 1F07 CC 1F85    A MWAITR JMP  RSTSKX
1299                    *
1300                    *
1301A 1F0A 9C         BUGCTL RSP             MONITOR ENTRY POINT
1302A 1F0B 3F   11    A      CLR    RDR
1303A 1F0D AD   43  1F52     BSR    TORST
1304A 1F0F A6   C6    A      LDA    #$C6       LDA OP CODE FOR DOIT
1305A 1F11 B7   19    A      STA    DOIT
1306A 1F13 A6   81    A      LDA    #$81       RTS OP CODE
1307A 1F15 B7   1C    A      STA    DOIT+3
1308A 1F17 A6   3D    A      LDA    #'=        PROMPT SIGN
1309A 1F19 AD   3E  1F59     BSR    OUTCH      PRINT IT
1310A 1F1B AD   30  1F4D     BSR    INCH       GET A CHARACTER AND ECHO IT
1311A 1F1D A1   43    A      CMP    #'C
1312A 1F1F 26   03  1F24     BNE    NOTC
1313A 1F21 CC 1FA8    A      JMP    MEM        MEM EXAMINE/CHANGE
1314A 1F24 A1   47    A NOTC CMP    #'G
1315A 1F26 27   DF  1F07     BEQ    MWAITR
1316A 1F28 A1   4D    A      CMP    #'M
1317A 1F2A 27   12  1F3E     BEQ    MODE       CHANGE MODE
1318A 1F2C A1   53    A      CMP    #'S
1319A 1F2E 26   DA  1F0A     BNE    BUGCTL
1320                    *
1321A 1F30 AD   1B  1F4D SEND BSR   INCH       SET MONITOR PARAMETERS
1322A 1F32 B7   4E    A      STA    TEMP1
1323A 1F34 AD   17  1F4D     BSR    INCH
1324A 1F36 B7   59    A      STA    MNE
1325A 1F38 B6   4E    A      LDA    TEMP1
1326A 1F3A B7   58    A      STA    MNB
1327A 1F3C 20   C9  1F07 SENDX BRA  MWAITR
1328                    *
1329A 1F3E AD   0D  1F4D MODE BSR   INCH       CHANGE THERMO MODE
1330A 1F40 B7   4E    A      STA    TEMP1
1331A 1F42 AD   09  1F4D     BSR    INCH
1332A 1F44 B7   39    A      STA    TCO
1333A 1F46 B6   4E    A      LDA    TEMP1
1334A 1F48 CC 1860    A      JMP    RSTMC
1335                    *
1336                    *INPUT ROUTINE (8 BITS)
1337                    *
1338A 1F4B AD   B1  1EFE INCH0 BSR  MWAIT
```

```
1339A 1F4D OF 21 FB  1F4B INCH   BRCLR  RDRF,FLAG1,INCH0 WAIT FOR RDRF
1340A 1F50 1F 21      A         BCLR   RDRF,FLAG1  CLEAR RDRF
1341A 1F52 A6 78      A   TORST LDA    #T2S
1342A 1F54 B7 1E      A         STA    T2
1343A 1F56 B6 11      A         LDA    RDR         GET INPUT BYTE
1344A 1F58 81                    RTS
1345                        *
1346                        *
1347                        *OUTPUT ROUTINE (8 BITS)
1348                        *
1349A 1F59 B7 14      A  OUTCH  STA    TDR         PUT OUTPUT BYTE
1350A 1F5B 1D 21      A         BCLR   TDRE,FLAG1  CLEAR TDRE
1351A 1F5D AD 9F   1EFE OUTCH0 BSR    MWAIT
1352A 1F5F 0D 21 FB  1F5D        BRCLR  TDRE,FLAG1,OUTCH0 WAIT FOR TDRE
1353A 1F62 B6 14      A         LDA    TDR
1354A 1F64 81                    RTS
1356                        *INPUT/OUTPUT UTILITIES
1357                        *
1358A 1F65 AD E6   1F4D INHEX  BSR    INCH        INPUT HEX CHARACTER
1359A 1F67 A0 30      A         SUB    #'0         AND CONVERT TO HEX
1360A 1F69 2B 9F   1F0A        BMI    BUGCTL
1361A 1F6B A1 0A      A         CMP    #$A
1362A 1F6D 2B 0A   1F79        BMI    IHRTS
1363A 1F6F A0 07      A         SUB    #$7
1364A 1F71 A1 0A      A         CMP    #$A
1365A 1F73 2B 95   1F0A        BMI    BUGCTL
1366A 1F75 A1 0F      A         CMP    #$F
1367A 1F77 22 91   1F0A        BHI    BUGCTL
1368A 1F79 81              IHRTS RTS
1369                        *
1370A 1F7A AD 05   1F81 BADDR  BSR    BYTE        INPUT ADDRESS (2 HEX VALUES)
1371A 1F7C B7 1B      A         STA    TADDR+1     INTO TADDR
1372A 1F7E 3F 1A      A         CLR    TADDR
1373A 1F80 81                    RTS
1374                        *
1375A 1F81 AD E2   1F65 BYTE   BSR    INHEX       INPUT BYTE (2 HEX VALUES)
1376A 1F83 48                    ASLA              INTO ACC AND TEMPO
1377A 1F84 48                    ASLA
1378A 1F85 48                    ASLA
1379A 1F86 48                    ASLA
1380A 1F87 B7 16      A         STA    TEMPO
1381A 1F89 AD DA   1F65        BSR    INHEX
1382A 1F8B BB 16      A         ADD    TEMPO
1383A 1F8D B7 16      A         STA    TEMPO
1384A 1F8F 81                    RTS
1385                        *
1386A 1F90 B7 16      A  OUT2H  STA    TEMPO       OUTPUT BYTE (2 HEX VALUES)
1387A 1F92 A4 F0      A         AND    #$F0        IN ACC
1388A 1F94 44                    LSRA              CONVERT HEX TO CHARACTER
1389A 1F95 44                    LSRA
1390A 1F96 44                    LSRA
1391A 1F97 44                    LSRA
1392A 1F98 AD 04   1F9E        BSR    OUT2H1
1393A 1F9A B6 16      A         LDA    TEMPO
1394A 1F9C A4 0F      A         AND    #$0F
1395A 1F9E AB 30      A  OUT2H1 ADD    #'0
1396A 1FA0 A1 39      A         CMP    #'9
1397A 1FA2 23 02   1FA6        BLS    OUTCH2
1398A 1FA4 AB 07      A         ADD    #$7
1399A 1FA6 20 B1   1F59 OUTCH2 BRA    OUTCH
1400                        *
1402                        * MEMORY EXAMINE/CHANGE D<ADDR>
1403                        * /=CHANGE
1404                        * D<ADDR(LSB)><ADDR(MSB)> YIELDS MEMORY DUMP
1405                        *
1406A 1FA8 AD D0   1F7A MEM    BSR    BADDR       GET ADDRESS
1407A 1FAA BD 19      A  MEM2   JSR    DOIT        GET MEMORY VALUE IN ACC
1408A 1FAC AD E2   1F90        BSR    OUT2H       AND OUTPUT IT
```

```
1409A 1FAE AD    9D    1F4D MEM6    BSR    INCH      GET COMMAND
1410A 1FB0 A1    2F         A MEM4  CMP    #'/       TEST FOR /
1411A 1FB2 26    08    1FBC        BNE    MEM5
1412A 1FB4 3C    19         A      INC    DOIT      TO STA OP CODE
1413A 1FB6 AD    C9    1F81        BSR    BYTE      GET NEW VALUE
1414A 1FB8 BD    19         A      JSR    DOIT      AND STORE IT
1415A 1FBA 20    24    1FE0        BRA    JBUGCT    GET NEXT COMMAND
1416A 1FBC A1    44         A MEM5 CMP    #'D
1417A 1FBE 26    20    1FE0        BNE    JBUGCT
1418A 1FC0 AD    BF    1F81        BSR    BYTE
1419A 1FC2 B7    1A         A      STA    TADDR
1420A 1FC4 3F    1D         A      CLR    T1
1421A 1FC6 CD    1EFE       A DELAY JSR   MWAIT
1422A 1FC9 01 20 FA    1FC6        BRCLR  T1B,FLAG0,DELAY
1423A 1FCC 18    23         A      BSET   BAUD,FLAG3
1424A 1FCE BD    19         A DUMP JSR    DOIT      GET BYTE
1425A 1FD0 AD    D4    1FA6        BSR    OUTCH2    SEND IT
1426A 1FD2 B6    17         A      LDA    ADDR      TEST FOR END ADDRESS
1427A 1FD4 B1    1A         A      CMP    TADDR
1428A 1FD6 26    0B    1FE3        BNE    DUMP1     NO
1429A 1FD8 B6    18         A      LDA    ADDR+1
1430A 1FDA B1    1B         A      CMP    TADDR+1
1431A 1FDC 26    05    1FE3        BNE    DUMP1     NO
1432A 1FDE 11    23         A      BCLR   BAUD,FLAG3
1433A 1FE0 CC    1F0A       A JBUGCT JMP  BUGCTL    AND EXIT
1434A 1FE3 3C    1B         A DUMP1 INC   TADDR+1   INCREMENT ADDRESS
1435A 1FE5 26    E7    1FCE        BNE    DUMP
1436A 1FE7 3C    1A         A      INC    TADDR
1437A 1FE9 CD    1F52       A      JSR    TORST
1438A 1FEC 20    E0    1FCE        BRA    DUMP      DO IT AGAIN
1439                                *
1440          1FEE       A PRGEND EQU     *
1441                                *
1442                                *
1443                                *
1444                                *
1445                                *
1446                                *
1447                                *
1448                                *
1449                                *
1450                                *
1451                                *
1452                                *
1453                                *
1454                                *
1455                                * SET UP START-UP AND INTERRUPT VECTORS
1456A 1FF6                          ORG    $1FF6
1457A 1FF6      1E7A       A TIWS  FDB    WATSK     WAIT FOR TIMER
1458A 1FF8      1E7A       A TIRQ  FDB    WATSK     TIMER INTERRUPT
1459A 1FFA      1800       A IRQ   FDB    INITSK    IRQ INTERRUPT
1460A 1FFC      1800       A SWI   FDB    INITSK    SOFTWARE INTERRUPT
1461A 1FFE      1800       A RSET  FDB    INITSK    RESET AND POWER UP
1462                                *
1463                                *
1464                                       END
```

No Errors detected during this assembly
No Warnings noted during this assembly

I claim:

1. Temperature sensing apparatus for modulating air heating and cooling apparatus connected to a space within a building, including sensor means sensitive to air temperature in said space and connected through a thermal condition measuring means having an output to a control means and proportional to said air temperature, said control means comprising:
 a power source;
 a cycle selector assembly including a temperature sensor unit, a logic unit assembly, and a series of electrical units each sensitive to the output of said temperature sensor unit;
 a temperature control assembly including a resistor bank assembly, a resistor control unit, and a temperature range control unit, the temperature range control unit being a 555 integrated circuit timer, said resistor bank assembly including a series of resistor unit assemblies, each of said resistor unit assemblies including electric resistors having a different value of electrical resistance than other resistor unit assemblies in the resistor bank assembly, said resistor control unit including a drive means for providing progressive changes of resistance values of said resistor unit assemblies, different portions of each of said resistor unit assemblies connected between different pairs of resistor terminal wires connected to an input of the temperature range control unit;
 first programming means to actuate said heating and cooling apparatus to bring said air in said space to thermal comfort conditions and maintain said air at said thermal comfort conditions; and
 second programming means to progressively change at a predetermined ramp rate conditions to which said control means reacts for permitting the temperature in said space to change at a controlled rate and in an energy conserving direction from said thermal comfort conditions within a preselected dead-band range.

2. Apparatus as in claim 1 wherein the resistor control unit comprises a stepping circuit which provides timed and stepped increments of change of resistance value of the resistors of the resistor bank assembly connected to the input of the temperature range control unit.

3. Apparatus as in claim 1 wherein the resistor control unit comprises a drive means providing continuous change of values of electrical resistances connected to the input of the temperature range control unit.

4. Temperature and humidity sensing apparatus for modulating air heating and cooling apparatus connected to a space within a building, including sensor means sensitive to air temperature and to humidity in said space and connected through a thermal condition measuring means having an output to a control means and proportional to said air temperature and humidity, said control means comprising:
 a power source;
 a cycle selector assembly including a temperature sensor unit, a logic unit assembly, and a series of electrical units each sensitive to the output of said temperature sensor unit;
 a temperature control assembly including a resistor bank assembly, a resistor control unit, a temperature range control unit, the temperature range control unit being a 555 integrated circuit timer, said resistor bank assembly including a series of resistor unit assemblies, each of said resistor unit assemblies comprising electric resistors having a different value of electrical resistance than other resistor unit assemblies in the resistor bank assembly, said resistor control unit including a drive means for providing progressive changes of resistance values of said resistor unit assemblies, different portions of each of said resistor unit assemblies connected between different pairs of resistor terminal wires connected to an input of the temperature range control unit;
 first programming means to actuate said heating and cooling apparatus to bring said air in said space to thermal comfort conditions and maintain said air at said thermal comfort conditions; and
 second programming means to progressively change at a predetermined ramp rate conditions to which said control unit reacts for permitting the temperature in said space to change at a controlled rate and in an energy conservation direction from said thermal comfort conditions within a preselected dead-band range.

5. Apparatus as in claim 4 wherein the resistor control unit comprises a stepping circuit which provides timed and stepped increments of change of resistance value of the resistors of the resistor bank assembly connected to the input of the temperature range control unit.

6. Apparatus as in claim 4 wherein the resistor control unit comprises a drive means providing continuous change of values of electrical resistances connected to the input of the temperature range control unit.

7. Apparatus as in claim 4 comprising a humidity transducer located within a wall mounted housing in said building and control rheostats in said effective temperature sensor unit and in said range control unit, the humidity transducer operatively connected to said rheostats through a rheostat actuating means.

8. Apparatus as in claim 7 wherein one of said rheostats connected to said humidity transducer is serially connected to a thermistor in an electric circuit of said range control unit and another of said rheostats is serially connected to a thermistor in an electric circuit of said effective temperature sensor unit whereby to add the effects of measurements by said humidity transducer and by said thermistors.

9. Apparatus as in claim 8 wherein said humidity transducer and said thermistor both have positive temperature coefficients of resistance.

10. Apparatus as in claim 9 wherein said humidity transducer and said thermistor both have negative temperature coefficients of resistance.

11. Apparatus as in claim 10 wherein said rheostats are connected to provide changes in the electrical resistances in the temperature sensor circuit and in the temperature range control unit that change in the same direction on increase in said air humidity and in said air temperature.

12. A system for temperature control of an inhabited space including heating means, cooling means, fan means, temperature sensing means operatively connected to said space, and control means operatively connected to said heating means, said cooling means, said fan means, and said temperature sensing means, said control means comprising:
 temperature setting means for setting temperature variation limits at which one of said heating and cooling means is activated and deactivated,
 time setting means for setting a time period during which one of said heating and cooling means is automatically activated for maintaining temperature within said space within said variation limits;

limit change means for automatically changing said variation limits at which one of said heating and cooling means is activated and deactivated, said changing of said variation limits being in an energy conserving direction and said changing being at a rate of no more than approximately 1 deg. F. per hour; and control means controlling said upper and lower limits in response to the length of time since said temperature setting means is actuated.

13. System as in claim 12 wherein said temperature sensing means comprises a temperature sensitive electrical element in contact with a thermally conductive metallic plate directly exposed to said space, said thermally conductive metallic plate having a surface to mass ratio of between 1.2 and 1.3 square centimeters per gram.

14. System as in claim 13 wherein said plate has a surface area of 15 to 17 square centimeters.

15. System as in claim 14 wherein said thermally conductive metallic plate has an exterior gold surface.

16. System as in claim 14 and comprising also signaling means responsive to the period of time for which said heating and cooling means are set to be activated and to the actuation of said heating and cooling means.

17. System as in claim 14 wherein the time after which change of the setting temperatures is initiated is responsive to a number of touches applied to said plate.

18. System as in claim 17 wherein said temperature at which one of said heating and cooling means is activated and deactivated is set by the number of touches applied to said plate.

19. Apparatus as in claim 13 wherein the change of temperature at which said heating means and cooling means are activated and deactivated is reset to a predetermined value is determined by the number of touches applied to set plate.

20. A sensing and control unit for a system for temperature control of an inhabited space, including heating means, cooling means, fan means, and temperature sensing means operatively connected to said space, said sensing and control unit operatively connected to said heating means, said cooling means, said fan means, and said temperature sensing means, said sensing and control unit comprising:

a support assembly adapted to be fixed to a habitation enclosure wall;

a control and programming unit including a thermally sensitive element;

temperature setting means for setting temperature variations limits at which signals are sent to one of said heating and cooling means for activation and deactivation thereof;

time setting means for setting a time period during which said control signals are sent by said control and programming unit to one of said heating and cooling means;

limit change means for automatically changing said variation limits at which signals are sent to one of said heating and cooling means, said changing of said variation limits being in an energy conserving direction and at a predetermined rate; and control means for automatically controlling said upper and lower limits in response to the length of time since said control unit sends control signals to said one of heating and cooling means.

21. A sensing and control unit as in claim 20 wherein said temperature sensing means comprises a temperature sensitive electrical element in contact with a thermally conductive metallic plate on an external surface of said sensing and control unit, said thermally conductive metallic plate having a surface to mass ratio of between 1.2 and 1.3 square centimeters per gram.

22. Apparatus as in claim 21 wherein said plate has a surface area of 15 to 17 square centimeters.

23. Apparatus as in claim 22 wherein said thermally conductive metallic plate has an exterior gold surface.

24. Apparatus as in claim 20 and comprising also signaling means on the exterior surface of said sensing and control unit responsive to the period of time for which said heating and cooling means are set to be activated and to the actuation of said heating and cooling means.

25. Apparatus as in claim 20 comprising timing means setting the time periods at which changes of the temperature settings initiated are responsive to the number of touches applied to said plate.

26. As in claim 25 comprising means whereby the temperature at which said heating and cooling means are activated and deactivated is responsive to the number of touches applied to said plate.

27. Apparatus as in claim 25 comprising means whereby the temperature at which said sensing and control unit sends control signals to said heating means and cooling means is reset to a value relative to sensed temperature, said reset in response to the number of touches applied to said plate.

28. Apparatus as in claim 20 where each of said heating means and said cooling means and said fan means has a relay control therefor and said relay control is operatively connected to said control unit whereby to provide power thereto.

29. A temperature control process for controlling space temperature within an occupied building uitilizing heating and/or cooling units, comprising:

selectively setting a desired initial comfort temperature setting and a desired final comfort temperature setting for said space temperature;

sensing said space temperature and providing an output signal functionally related to dry bulb temperature, ambient mean radiant temperature, and air velocity;

automatically activating said heating and/or cooling units in response to said output signal and said initial comfort temperature setting to maintain said space temperature at approximately said desired initial comfort temperature setting during at least a predetermined first period of time;

thereafter repeatedly and automatically altering desired temperature settings as a function of time in an energy conserving direction during a second period of time of a duration of at least several hours and at a predetermined temperature ramp rate equal to or less than approximately 1° F. per hour;

automaticaly activating said heating and/or cooling units in response to said output signal and said altered temperature settings to maintain said space temperature at approximately said altered temperature settings during at least said second period of time;

automatically prohibiting alteration of said space temperature settings beyond said desired final comfort temperature setting; and thereafter automatically actuating said heating and/or colling units in response to said output signal and said final comfort temperature setting to maintain said space temperature at approximately said desired final comfort temperature setting.

30. The process as defined in claim 29, further comprising:
maintaining said space temperature at approximately said desired final comfort temperature setting until selectively resetting a comfort temperature setting.

31. The process as defined in claim 30, when said comfort temperature setting is selectively reset automatically to said desired initial comfort temperature setting.

32. The process as defined in claim 30, wherein said comfort temperature setting is reset by a randomly timed operator input command.

33. The process as defined in claim 32, wherein said operator input command occurs substantially simultaneously with said resetting of said comfort temperature setting.

34. The process as defined in claim 32, wherein said desired temperature settings are altered during said second period of time in accordance with pre-programmed commands.

35. The process as defined in claim 29, wherein said first period of time is one-half hour or more.

36. The process as defined in claim 29, wherein said first period of time is selectively adjustable by occupants within said building.

37. The process as defined in claim 29, wherein said temperature ramp rate is selectively adjustable by occupants within said building.

38. The process as defined in claim 29, wherein said first period of time commences when said space temperature reaches said desired initial comfort temperature setting.

39. The process as defined in claim 29, wherein said first period of time commences when heating and/or cooling units are activated.

40. Temperature control apparatus for controlling space temperature for occupants within a building utilizing heating and/or cooling units, comprising:
temperature setting means responsive to occupant interaction for selectively setting a desired initial comfort temperature setting and a desired final comfort temperature setting;
thermal sensing means for sensing said space temperature and providing an output signal functionally related to dry bulb temperature, ambient mean radiant temperature, and air velocity;
control means for automatically activating said heating and/or cooling units in response to said output signal to maintain said space temperature at approximately said desired initial comfort temperature setting during at least a predetermined first period of time;
programming means for repeatedly and automatically altering desired temperature settings as a function of time in an energy conserving direction during a second period of time of a duration of at least several hours and at a predetermined temperature ramp rate equal to or less than approximately 1° F. per hour;
limit means for automatically prohibiting alteration of said space temperature settings beyond said desired final comfort temperature setting; and
said control means automatically activating said heating and/or cooling units in response to said output signal and said altered temperature settings to maintain said space temperature at approximately said altered temperature settings during at least said second period of time.

41. The apparatus as defined in claim 40, further comprising:
reset means for automatically resetting a comfort temperature setting at said initial comfort temperature setting.

42. The apparatus as defined in claim 41, wherein said reset means is responsive to randomly timed operator input commands.

43. The apparatus as defined in claim 40, further comprising:
means for selectively adjusting said first period of time in response to interaction by occupants within said building.

44. The apparatus as defined in claim 40, further comprising:
means for selectively adjusting said temperature ramp rate in response to interaction by occupants within said building.

45. Apparatus for space temperature control of an occupied building including heating means and control means for actuating said heating means, said control means comprising:
thermal sensing means operatively connected to said space to provide an output signal functionally related to dry bulb temperature, ambient mean radiant temperature, and air velocity;
temperature setting means for setting a desired initial comfort temperature setting and a desired final comfort temperature setting at which said heating means is activated and deactivated;
setting change means for automatically changing temperature settings at which said heating means is activated and deactivated during a period of time of at least several hours, said changing of said temperature settings from said desired initial comfort temperature setting being in an energy conserving direction and said changing being at a temperature ramp rate of no more than approximately 1° F. per hour;
limit means for limiting said changing temperature settings to a value representative of said desired final comfort temperature setting; and
said control means automatically activating said heating means in response to said thermal sensing means ouput signal and said temperature settings.

46. The apparatus as defined in claim 45, further comprising:
reset means for automatically resetting said space temperature setting at said initial comfort temperature setting.

47. The apparatus as defined in claim 46, wherein said reset means is responsive to randomly timed operator input commands.

48. The apparatus as defined in claim 45, further comprising:
time set means for setting a first period of time during which said heating means is automatically activated for maintaining said space temperature at approximately said initial comfort temperature setting.

49. The apparatus as defined in claim 48, further comprising:

means for selectively adjusting said first period of time in response to interaction by occupants within said building.

50. The apparatus as defined in claim 49, wherein said first period of time is one-half hour or more.

51. The apparatus as defined in claim 45, further comprising:
means for selectively adjusting said temperature ramp rate in response to interaction by occupants within said building.

52. The apparatus as defined in claim 45, wherein said first period of time ccommences when said space temperature reaches said desired initial comfort temperature setting.

53. The apparatus as defined in claim 52, further comprising:
reset means for automatically resetting said space temperature setting at said initial comfort temperature setting.

* * * * *

UNITED STATES PATENT AND TRADEMARK OFFICE
CERTIFICATE OF CORRECTION

PATENT NO. : 4,557,317
DATED : 12/10/85
INVENTOR(S) : Kermit S. Harmon, Jr.

It is certified that error appears in the above-identified patent and that said Letters Patent are hereby corrected as shown below:

Column 1, line 58, change "VIII" to -VII-.

Column 3, line 33, change "diagarams" to -diagrams-.

Column 4, line 34, change "Temperatare" to -Temperature-.

Column 4, line 44, change "resiston" to -resistor-.

Column 7, line 57, change "Normaly" to -Normally-.

Column 7, line 61, change "triggar" to --trigger-.

Column 19, line 10, change "p When" to -When-.

Column 19, line 13, change "A/Bx1/2" to -A/B=1/2-.

Column 19, line 15, change "(]" to -)]-.

UNITED STATES PATENT AND TRADEMARK OFFICE
CERTIFICATE OF CORRECTION

PATENT NO. : 4,557,317
DATED : 12/10/85
INVENTOR(S) : Kermit S. Harmon, Jr.

It is certified that error appears in the above-identified patent and that said Letters Patent are hereby corrected as shown below:

Column 25, line 51, change "XI" to -XL-.

Column 30, line 48, change "420 77K" to -420 47K-.

Column 31, line 18, change "461 1uf" to -461 .1uf-.

Claim 17, line 1, change "claim 14" to -claim 12-.

Claim 29, last line in column 80, change "colling" to -cooling-.

Claim 45, last line, change "ouput" to -output-.

UNITED STATES PATENT AND TRADEMARK OFFICE
CERTIFICATE OF CORRECTION

PATENT NO. : 4,557,317
DATED : 12/10/85
INVENTOR(S) : Kermit S. Harmon, Jr.

It is certified that error appears in the above-identified patent and that said Letters Patent are hereby corrected as shown below:

IN THE DRAWINGS

Sheet 2, Figure 2, change "XIVA" to -XIVB-.

Sheet 7, Figure 9, change "109" to -100-.

Sheet 8, Figure 11, change "20" to -21- and "21" to -30-.

Sheet 17, Figure 41, delete "798".

Sheet 20, Figure 21, change "XL11A" to -XX11A-.

Column 3, line 45, change "XXVIX" to -XXIX-.

Column 5, line 24, change "109" to -100-.

Column 7, line 33, change "192" to -92-.

Column 8, line 28, change "VI" to -VI.-.

UNITED STATES PATENT AND TRADEMARK OFFICE
CERTIFICATE OF CORRECTION

PATENT NO. : 4,557,317
DATED : 12/10/85
INVENTOR(S) : Kermit S. Harmon, Jr.

It is certified that error appears in the above-identified patent and that said Letters Patent are hereby corrected as shown below:

Column 9, line 43, change "304" to -303-.

Column 12, line 44, change "upwards" to -downwards-.

Column 12, line 63, change "180" to -190-.

Column 12, line 67, change "falls" to -rises-.

Column 14, line 31, change "272" to -273-.

Column 14, line 42, change "XVII" to -XVI-.

Column 15, line 31, change "28" to -208-.

Column 16, line 25, change "referce" to -reference-.

Column 17, line 1, change "208" to -206-.

Column 23, line 38, change "is" to -as-.

Column 13, lines 49, 52, and 55, change "To" to -Td-, each instance.

UNITED STATES PATENT AND TRADEMARK OFFICE
CERTIFICATE OF CORRECTION

PATENT NO. : 4,557,317
DATED : 12/10/85
INVENTOR(S) : Kermit S. Harmon, Jr.

It is certified that error appears in the above-identified patent and that said Letters Patent are hereby corrected as shown below:

Column 29, line 35, change "B.T.V." to -B.T.U.-.

Column 31, line 24, change "Camparator" to -Comparator-.

Column 31, line 63, change "N4002" to -1N4002-.

Column 32, line 6, change "Opptional" to -Optional-.

Column 32, line 35, change "9 Quad" to -Quad-.

Column 32, line 41, change "Comparator - 9" to -Comparator-.

Column 34, line 20, Part II, change "duration is equal is equal" to -duration is equal-.

UNITED STATES PATENT AND TRADEMARK OFFICE
CERTIFICATE OF CORRECTION

PATENT NO. : 4,557,317
DATED : 12/10/85
INVENTOR(S) : Kermit S. Harmon, Jr.

It is certified that error appears in the above-identified patent and that said Letters Patent are hereby corrected as shown below:

Claim 7, line 1, change "claim 4" to --claim 4, further--.

Claim 7, line 3, delete "effective".

Claim 11, line 3, change "temperature sensor" to --temperature sensor unit--.

Claim 12, third line from the bottom, change "upper and lower" to --variation--.

Claim 19, line 4, change "is determined" to --as determined--.

Claim 19, line 5, change "set plate" to --said plate--.

UNITED STATES PATENT AND TRADEMARK OFFICE
CERTIFICATE OF CORRECTION

PATENT NO. : 4,557,317
DATED : 12/10/85
INVENTOR(S) : Kermit S. Harmon, Jr.

It is certified that error appears in the above-identified patent and that said Letters Patent are hereby corrected as shown below:

Claim 20, line 14, reference column 79, line 54, change "which signals" to -which control signals-.

Claim 20, third line from the bottom, change "upper and lower" to -variation-.

Claim 20, second line from the bottom, change "control unit" to -control and programming unit-.

Claim 25, line 1, change "claim 20" to -claim 20, further-.

Signed and Sealed this

First Day of July 1986

[SEAL]

Attest:

DONALD J. QUIGG

Attesting Officer

Commissioner of Patents and Trademarks